(12) United States Patent
Herrington et al.

(10) Patent No.: US 6,558,537 B1
(45) Date of Patent: May 6, 2003

(54) PORTABLE HYDRATION SYSTEM

(75) Inventors: Rodney E. Herrington, Albuquerque, NM (US); Wesley L. Bradford, Los Alamos, NM (US); Kevin Schwartz, Albuquerque, NM (US); Allen D. Clement, Albuquerque, NM (US); Curtis M. Mitchke, Albuquerque, NM (US); John K. Hickerson, Albuquerque, NM (US); Timothy A. Cushman, Sandia Park, NM (US); John F. White, Rio Rancho, NM (US)

(73) Assignee: Miox Corporation, Albuquerque, NM (US)

( * ) Notice: Subject to any disclaimer, the term of this patent is extended or adjusted under 35 U.S.C. 154(b) by 0 days.

(21) Appl. No.: 09/686,214

(22) Filed: Oct. 10, 2000

Related U.S. Application Data

(63) Continuation-in-part of application No. PCT/US00/14513, filed on May 25, 2000, and a continuation-in-part of application No. 09/579,178, filed on May 24, 2000, and a continuation-in-part of application No. 09/514,431, filed on Feb. 28, 2000, now abandoned, and a continuation-in-part of application No. 09/318,468, filed on May 25, 1999, now Pat. No. 6,261,464, and a continuation-in-part of application No. 09/318,469, filed on May 25, 1999, now abandoned

(60) Provisional application No. 60/230,895, filed on Sep. 5, 2000.

(51) Int. Cl.[7] .............................................. C02F 1/461
(52) U.S. Cl. ................. 210/192; 210/321.6; 210/323.1; 210/416.1; 205/747; 205/751
(58) Field of Search ............................. 210/192, 198.1, 210/205, 206, 416.1, 321.6, 323.1; 205/742, 747, 751

(56) References Cited

U.S. PATENT DOCUMENTS

| | | | |
|---|---|---|---|
| 1,029,580 A | 6/1912 | Bane | |
| 1,160,528 A | 11/1915 | Pilkington | |
| 1,200,165 A | 10/1916 | Burgess | |
| 2,473,986 A | 6/1949 | Booth | 210/185 |
| 3,222,269 A | 12/1965 | Stanton | 204/270 |
| 3,365,061 A | 1/1968 | Bray | 210/130 |
| 3,505,215 A | 4/1970 | Bray | 210/22 |
| 3,622,479 A | 11/1971 | Schneider | 204/149 |
| 3,654,148 A | 4/1972 | Bradley | 210/23 |
| 3,749,524 A | 7/1973 | Jordan | 417/323 |
| 3,791,768 A | 2/1974 | Wanner | 417/393 |
| 3,825,122 A | 7/1974 | Taylor | 210/134 |
| 4,000,065 A | 12/1976 | Ladha et al. | 210/23 H |
| 4,070,280 A | 1/1978 | Bray | 210/23 H |
| 4,077,883 A | 3/1978 | Bray | 210/136 |
| 4,124,488 A | 11/1978 | Wilson | 210/124 |
| 4,151,092 A | * 4/1979 | Grimm et al. | |

(List continued on next page.)

OTHER PUBLICATIONS

B.B. Gupta et al. "Permeate flux enhancement by pressure and flow pulsations in microfiltration with mineral membranes." Journal of Membrane Science, 70 (1992) 257–266.

Internet advertisement for "Steri–Pen" by Hydro–Photon, Inc. www.hydro–photon.com May 9, 2000.

L.V. Venczel et al. "Inactivation of Cryptosporidium parvum Oocysts and Clostridium perfringens Spores by a Mixed–Oxidant Disinfectant and by Free Chlorine." Applied and Environmental Microbiology, vol. 63, No. 4, Apr., 1997, p. 1598–1601.

*Primary Examiner*—Betsey Morrison Hoey
(74) *Attorney, Agent, or Firm*—Deborah A. Peacock; Katy C. Fain

(57) ABSTRACT

A portable hydration system comprising water disinfection, filtration and pump features. The system comprises an electrolytic oxidant generating cell which utilizes a salt to create oxidants for disinfecting liquids such as water.

11 Claims, 23 Drawing Sheets

U.S. PATENT DOCUMENTS

| | | | |
|---|---|---|---|
| 4,187,173 A | 2/1980 | Keefer | 210/23 H |
| 4,288,326 A | 9/1981 | Keefer | 210/637 |
| 4,290,873 A | 9/1981 | Weaver | 204/228 |
| 4,306,952 A | 12/1981 | Jansen | 204/149 |
| 4,321,137 A | 3/1982 | Kohler | 210/137 |
| 4,367,140 A | 1/1983 | Wilson | 210/110 |
| 4,389,311 A * | 6/1983 | La Freniere | |
| 4,432,876 A | 2/1984 | Keefer | 210/652 |
| 4,434,056 A | 2/1984 | Keefer | 210/637 |
| 4,496,443 A | 1/1985 | Mack et al. | 204/130 |
| 4,534,713 A | 8/1985 | Wanner | 417/377 |
| 4,560,455 A | 12/1985 | Porta et al. | 204/130 |
| RE32,144 E | 5/1986 | Keefer | 210/637 |
| 4,632,754 A | 12/1986 | Wood | 210/257.2 |
| 4,722,263 A | 2/1988 | Valentin | 92/13.7 |
| 4,724,079 A | 2/1988 | Sale et al. | 210/638 |
| 4,744,877 A | 5/1988 | Maddock | 204/266 |
| 4,756,830 A | 7/1988 | Fredkin | 210/321.66 |
| 4,759,844 A | 7/1988 | Lipschultz et al. | 210/257.2 |
| 4,761,208 A | 8/1988 | Gram et al. | 204/95 |
| 4,786,380 A | 11/1988 | Van Duin et al. | 204/95 |
| 4,790,923 A | 12/1988 | Stillman | 204/268 |
| 4,790,946 A | 12/1988 | Jansen | 210/748 |
| 4,836,924 A | 6/1989 | Solomon | 210/321.87 |
| RE33,135 E | 12/1989 | Wanner, Sr. et al. | 417/377 |
| 4,973,408 A | 11/1990 | Keefer | 210/652 |
| 4,976,842 A | 12/1990 | Fowler | 204/252 |
| 5,085,753 A | 2/1992 | Sherman | 204/267 |
| 5,207,916 A | 5/1993 | Goheen et al. | 210/637 |
| 5,244,579 A | 9/1993 | Horner et al. | 210/652 |
| 5,306,428 A | 4/1994 | Tonner | 210/652 |
| 5,320,718 A | 6/1994 | Molter et al. | 204/101 |
| 5,358,635 A | 10/1994 | Frank et al. | 210/90 |
| 5,480,386 A * | 1/1996 | Broyh et al. | |
| 5,492,534 A * | 2/1996 | Athayde et al. | |
| 5,496,466 A | 3/1996 | Gray | 210/137 |
| 5,503,736 A | 4/1996 | Schoenmeyr | 210/91 |
| 5,531,887 A | 7/1996 | Miers | 210/135 |
| 5,534,145 A * | 7/1996 | Platter et al. | |
| 5,540,848 A * | 7/1996 | Engelhard | |
| 5,558,762 A | 9/1996 | Fife et al. | 210/130 |
| 5,581,189 A | 12/1996 | Brenn | 324/439 |
| 5,597,482 A * | 1/1997 | Melyon | |
| 5,685,980 A | 11/1997 | Patapoff et al. | 210/244 |
| 5,725,758 A | 3/1998 | Chace et al. | 210/85 |
| 5,795,459 A | 8/1998 | Sweeney | 205/701 |
| 5,928,490 A * | 7/1999 | Sweeney | |
| 5,958,229 A | 9/1999 | Filiopoulos et al. | 210/206 |
| 5,989,396 A | 11/1999 | Prasnikar et al. | 204/290 F |
| 6,007,686 A | 12/1999 | Welch et al. | 204/230.2 |
| 6,203,696 B1 * | 3/2001 | Pearson | |

* cited by examiner

PORTABLE HYDRATION SYSTEM

CROSS-REFERENCE TO RELATED APPLICATIONS

This application is a continuation-in-part and claims priority to U.S. patent application Ser. No. 09/318,468, entitled "Portable Water Disinfection System", filed on May 25, 1999, now U.S. Pat. No. 6,261,464, issued Jul. 17, 2001; co-pending U.S. patent application Ser. No. 09/318,469, entitled "Portable Water Filtration and Pump System", filed on May 25, 1999; continuation-in-part U.S. patent application Ser. No. 09/514,431, entitled "Portable Disinfection and Filtration System", filed on Feb. 28, 2000; continuation-in-part U.S. patent application Ser. No. 09/579,178, entitled "Portable Water Disinfection System", filed May 24, 2000; and U.S. Provisional Patent Application Serial No. 60/230,895, entitled "Reverse Osmosis Membrane and Process for Making Same," filed Sep. 5, 2000. This application is a Continuation-in-Part of International Application No. PCT/US00/14513 entitled "Portable Disinfection and Filtration System," filed May 25, 2000. The specifications of each application listed are incorporated herein by reference.

GOVERNMENT RIGHTS

The U.S. Government has a paid-up license in this invention and the right in limited circumstances to require the patent owner to license others on reasonable terms as provided for in the terms of Contract No. DABT63-98-C-0052 awarded by U.S. Defense Advanced Research Projects Agency.

BACKGROUND OF THE INVENTION

1. Field of the Invention (Technical Field)

The filtration system of the present invention relates to a water treatment system that includes filtration as well as reverse osmosis for removal of total dissolved solids (TDS) from water to render the water potable.

The oxidant generating apparatus and method of the present invention relates to water disinfecting systems, and more particularly, to an apparatus for generating disinfecting solutions to be added to potentially contaminated water to render that water potable.

2. Background Art

Removing impurities from drinking water supplies is a major factor in reducing the health risks to the human population. High levels of total dissolved solids (TDS) in water, such as dissolved salts in seawater, make the water unfit for drinking because of the ion imbalance in the human system. Most drinking water in the world today comes from ground or surface water sources and potable water from these sources is produced at small and large municipal drinking water treatment plants. A very small percentage of drinking water is produced from de-salination facilities. There are many settings in which these large systems are not practical. For example, campers, military personnel, and disaster relief situations require small man-portable systems that can treat water from just about any water source to produce potable water. To be effective in such remote settings, a system must be capable of repeated operation with little operator skill, no external power sources, and very little maintenance.

To be fully comprehensive, water filtration must include the capability for both conventional filtration as well as desalination. Conventional filtration can remove particulates that cause turbidity such as dirt, silt, sand, and larger organisms such as Giardia and Cryptosporidium. Reverse osmosis (RO) technology must also be included to remove ions from such sources as seawater. At sea water concentrations of 35,000 milligrams per liter (mg/L), the system must be effective enough to remove ions to levels less than 1000 mg/L. While sodium and chloride are the two ions of concern in seawater, the system must be able to remove other ions as well. All of these ions are collectively known as TDS.

Existing technology removes TDS utilizing RO technology. The pressure required to drive the RO process utilizes a pressure recovery feature to reduce the applied force. U.S. Pat. No. 3,749,524 to Jordan, entitled Manually Operated Pump Utilizing Backpressure for Easement of Pump Stroke, discloses a pressure recovery feature for a pneumatic application. This system does not apply to fluids such as water, and lacks a simplified valve system for retentate discharge, as well as a valve system for isolating the RO element in the event that TDS removal is not required. U.S. Pat. No. 4,124,488 to Wilson, entitled Water Purification by Reverse Osmosis, and U.S. Pat. No. RE033135 to Wanner, Sr. et al, entitled Pump Apparatus, discloses a reverse osmosis pump mechanism with pressure recovery feature. The present invention addresses the current problems by incorporating a simple valve mechanism integral to the piston and shaft for retentate discharge, as well as incorporating a valve switching mechanism to isolate the RO element for conventional filtration, thereby providing maximum efficiency for either reverse osmosis pumping and/or sweet water pumping by two different modes of operation. U.S. Pat. No. RE032144 to Keefer entitled Reverse Osmosis Method and Apparatus, discloses a pump mechanism with pressure recovery and accumulator for reverse osmosis. The mechanism does not incorporate a simple pressure relief and retentate discharge mechanism integral to the piston and rod assembly, nor does the device incorporate a valve switching mechanism to isolate the RO element for conventional filtration.

While filtration presents one manner by which a substance can be rendered potable, and/or free of contaminants and/or fouling agents, chemical and/or radiative methods and devices are also suitable for destroying contaminants and/or fouling agents. In addition, such chemical and/or radiative methods and devices have more widespread use in, for example, bleaching and/or degrading material.

In general, maintaining the sterility of drinking water supplies is a major factor in reducing the health risks to human populations. While large metropolitan water systems can make use of highly toxic chlorine gas for sterilizing drinking water, such systems are impractical in remote locations, which lack highly trained personnel and the equipment to maintain the systems. There are many settings in which sophisticated systems are not practical. For example, campers or military personnel in the field cannot be expected to operate such a system to provide potable drinking water from streams or other potentially contaminated water sources. To be effective in such rural settings, a system must be capable of running for long periods of time with little or no maintenance. In addition, the raw materials required by the system should be readily available.

Systems based on the electrolytic production of chlorine and/or other chlor-oxygen species based germicidal agents are useful for decontamination. These systems require electricity and common salt as raw materials. One such system is described in U.S. Pat. No. 4,761,208 to Gram, et al. entitled Electrolytic Method and Cell for Sterilizing Water, which is incorporated herein by reference. The oxidant generating system of the present invention uses, in a preferred embodiment, an electrolytic cell to generate an oxidant solution including, for example, chlorine in the form of hypochlorous acid and other chlor-oxygen species. Other embodiments of the present invention produce an oxidant solution that is predominantly sodium hypochlorite. The oxidant solution is preferably produced from a brine solution using common salt. This oxidant solution may be added directly to the drinking water at a dilution ratio compatible with the concentration of the oxidant produced in the device and the demand of the water. In general, the oxidant produced by apparatus and/or methods of the present invention is more effective at inactivation of microorganisms than is conventional chlorination technology, including chlorine gas, sodium hypochlorite, and calcium hypochlorite. At adequate dilution ratios, the water is sterilized without causing the water to become unpalatable. This technology is particularly attractive because of its simplicity and long maintenance free operation time. Studies have been conducted to demonstrate the microorganism inactivation effectiveness of the oxidant, commonly referred to as mixed-oxidant solution. Linda V. Venczel, Michael Arrowood, Margaret Hurd, and Mark D. Sobsey with the University of North Carolina at Chapel Hill, North Carolina have conducted research and published a paper entitled, Inactivation of *Cryptosporidium parvum* Oocysts and *Clostridium perfringens* Spores by a Mixed-Oxidant Disinfectant and by Free Chlorine, published in *Applied and Environmental Microbiology*, April 1997, p. 1598–1601.

The systems based on mixed-oxidant production have been used successfully in rural communities with small water supplies to larger municipal water systems treating millions of gallons per day. These larger systems are not well suited for use by individual campers and personnel in the field who must treat small quantities of water on a daily basis. The mixed oxidant systems designed to date are applicable to large quantities of water and are large and heavy. In addition, these systems require quantities of electrical power that are not practical at the mesoscale, or individual person level.

SUMMARY OF THE INVENTION
(DISCLOSURE OF THE INVENTION)

A preferred embodiment of the present invention is an apparatus for treating and disinfecting a substance, the apparatus comprising at least one filter, and a portable electrolytic cell for generating oxidation/reduction products, the products to be subsequently added to the substance. Preferably, the filter comprises at least one filter selected from a roughing filter and a reverse osmosis filter; the apparatus providing for use of the roughing filter separately from the reverse osmosis filter, and use of the reverse osmosis filter separate from the roughing filter, and use of both the roughing filter and the reverse osmosis filter in sequence. Preferably, the roughing filter comprises a pressure relief mechanism. A preferred embodiment further comprises at least one mechanism selected from the group consisting of a spring mechanism to assist in pressure generation and energy storage on a suction stroke to allocate force between suction and pressure strokes, and a pulsing mechanism to allow enhanced permeate flux of the reverse osmosis filter. The apparatus additionally preferably comprises a pressure recovery mechanism comprising a piston, and a pump-jack mechanism.

The electrolytic cell preferably comprises an anode disposed proximal to a cathode, and additionally preferably comprises at least one power source selected from the group consisting of an electrical, solar, electro-mechanical or chemical generator, the power source for generating oxidants. Preferably, the apparatus further comprises at least one reservoir selected from the group consisting of a refillable and a disposable reservoir, the reservoir for containing a salt. Preferably, the apparatus further comprises an electrolyte storage compartment, and additionally comprises a deposit-removing apparatus. Preferably, the apparatus further comprises a circuit for measuring total dissolved solids.

In a preferred embodiment, the present invention comprises an apparatus for treating and/or disinfecting a substance, the apparatus comprising: at least one filter wherein the filter optionally comprises at least one filter selected from the group consisting of roughing filters, optionally comprising at least one pressure relief mechanism, and reverse osmosis filters; the apparatus optionally providing for use of the roughing filter separately from the reverse osmosis filter, and optionally use of the reverse osmosis filter separate from the roughing filter, and optionally use of both the roughing filter and the reverse osmosis filter in sequence; and a portable electrolytic cell for generating oxidants, the oxidants for addition to the substance.

In a preferred embodiment, the inventive filtration apparatus comprises at least one pressure relief mechanism selected from the group consisting of a spring mechanism to assist in pressure generation and energy storage on a suction stroke to allocate force between suction and pressure strokes, and a pulsing mechanism to allow enhanced permeate flux of an optional reverse osmosis filter. Embodiments of the invention filtration apparatus optionally comprise a pressure recovery mechanism comprising a piston; a pump-jack mechanism; and an electrolytic cell comprising at least two electrodes, preferably at least one anode and at least one cathode wherein an energy source provides for at least one electrical potential between at least one anode and at least one cathode, the energy source optionally comprising a source selected from the group consisting of an electrical, solar, electro-mechanical, magnetic, heat, pressure, and chemical generator.

The invention is also a method of purifying a substance comprising the steps of filtering the water in a portable filtering mechanism comprising at least one filter selected from the group consisting of a roughing filter and a reverse osmosis filter, and disinfecting with a portable disinfecting mechanism. Preferably, the substance is passed through at least one filter selected from the group consisting of only the roughing filter, only the reverse osmosis filter, and both the roughing and the reverse filter. Preferably, the step of disinfecting with a portable disinfecting mechanism comprises disinfecting by creating oxidation/reduction products in a portable electrolytic cell for holding an electrolyte, preferably by passing water through a porous salt chamber within the disinfecting mechanism, and preferably by passing an electric current through an electrolyte. Preferably, the oxidation reduction products are released into the substance to be treated. The electric current is preferably generated in an apparatus comprising a syringe-like configuration. Preferably, the oxidation/reduction products are created in a reservoir. Preferably, the method further comprises the step of measuring the total dissolved solids of the substance.

In a preferred embodiment comprising an inventive method of purifying a substance, the steps of the method comprise: filtering the substance in a portable filtering mechanism comprising at least one filter selected from the group consisting of a roughing filter and a reverse osmosis filter; and disinfecting the substance with a portable disinfecting mechanism; and preferably wherein the step of filtering the substance comprises passing through at least one filter selected from the group consisting of only the roughing filter, only the reverse osmosis filter, and both the roughing and the reverse filter.

A primary object of the filtration system of the present invention is to provide an improved filtration system for turbidity (optical clarity) reduction and TDS reduction that will provide potable water.

Another object of the filtration system of the present invention is to provide an improved filtration system that is compact in size for one person to easily carry.

A further object of the filtration system of the present invention is to provide an improved filtration system that can be operated purely with manual power as the only energy source.

Still a further object of the filtration system of the present invention is to provide an improved filtration device that utilizes the same pump for both conventional filtration and reverse osmosis.

A primary advantage of the filtration system of the present invention is that the valve system on the apparatus allows the same pump mechanism to be optimally configured for operation of the sweet water filter only (no pressure recovery and full volume flow), or sweet water and RO filtration together utilizing pressure recovery to minimize the applied driving force.

Another advantage of the filtration system of the present invention is a pressure recovery feature in the pump that utilizes a simplified valve mechanism that is integral to the piston rod and piston, with retentate discharge through ports in the piston, and out the side of the pump housing.

Still a further advantage of the filtration system apparatus is a pulsing mechanism in the pump that minimizes polarization concentration in the RO membrane thereby significantly reducing the applied pressure and improving the permeate flux produced for a given amount of power applied to the pump.

Disinfection apparatus of the present invention are for use alone or in combination with filtration systems of the present invention. For example, disinfection apparatus optionally comprise features of the inventive filtration systems and/or the filtration system apparatus optionally comprise features of the inventive disinfection systems. The disinfection apparatus also comprise a novel method of use and/or method of performing oxidation and/or generating and/or applying oxidant to a substance, such as, but not limited to, water. Methods of filtration and oxidant generation and/or use also optionally comprise mutually beneficial features. A summary of the inventive disinfection apparatus and methods of oxidant generation and/or use appear below along with relevant objectives and advantages.

The present invention optionally comprises a portable oxidant generator comprising a housing, the housing comprising at least one shape selected from the group consisting of tubular shapes and cap shapes, the tubular shapes comprising at least one cross section selected from the group consisting of circular, ellipsoidal and polygonal cross sections, a maximum length comprising a length between approximately 3 cm and approximately 60 cm and a maximum width comprising a width between approximately 0.5 cm and approximately 30 cm and the cap shapes optionally comprising at least one set of threads and optionally comprising at least one aperture for insertion of a drinking utensil; at least one cell positioned within the housing wherein the at least one cell comprises at least two electrodes wherein at least one electrode comprises at least one cathode and at least one anode; a circuit for providing an electrical potential between at least one of the at least one cathode and at least one of the at least one anode, the circuit comprising electricity wherein the electricity originates from an energy source, the energy source comprising at least one source selected from the group consisting of mechanical sources, chemical sources, magnetic sources, pressure sources and electromagnetic radiation sources; and an electrolyte, optionally comprising an electrolyte solution, for placement in the cell wherein the electrical potential causes electrical charge to pass to the electrolyte thereby generating at least one oxidant; and preferably further comprising an annular cell, the annular cell comprising an inner annular surface and an outer annular surface, wherein the annular cell preferably comprises at least one electrode positioned on the inner annular surface and at least one electrode positioned on the outer annular surface; and preferably wherein at least one of the at least two electrodes comprises at least one catalyst and wherein the at least one catalyst preferably comprises at least one Group VIIIB element of the Periodic Table of Elements and most preferably comprises ruthenium oxide.

In a preferred embodiment, the circuit optionally delivers a controlled electrical charge passed to the electrolyte solution, wherein the circuit optionally measures the electrical charge passed to the electrolyte solution and wherein the circuit, or optionally at least one additional circuit, measures at least one condition selected from the group consisting of temperature, total dissolved solids, conductivity, pH, ion concentration, residual oxidant, and oxidation-reduction potential and wherein the circuit, or optionally at least one additional circuit, for measuring provides information to the circuit for providing an electrical potential.

In a preferred embodiment, the generator optionally comprises an output device for outputting information wherein the output device for outputting information optionally comprises an output selected from the group consisting of tactile, auditory, olfactory and visual and optionally outputs at least one piece of information selected from the group consisting of electrical charge, energy level, remaining energy, electrolyte level, remaining electrolyte, integrity of the portable generator, temperature, total dissolved solids, conductivity, pH, ion concentration, residual oxidant, and oxidation-reduction potential.

In a preferred embodiment, the generator optionally comprises at least one reservoir wherein the at least one reservoir optionally comprises a refillable reservoir and optionally comprises an electrolyte reservoir wherein the electrolyte reservoir optionally comprises a salt reservoir.

In a preferred embodiment, the generator comprises at least one cell wherein the cell comprises at least two electrodes wherein at least one electrode comprises at least one cathode and at least one anode. In a preferred embodiment, the oxidant generator comprises a circuit for providing an electrical potential between at least one of the at least one cathode and at least one of the at least one anode. In such an embodiment, the circuit comprises electricity that originates from an energy source, such as, but not limited to, energy sources comprising mechanical sources, chemical sources, magnetic sources, pressure sources and/or electromagnetic radiation sources. In a preferred embodiment, oxidant generation relies on an electrolyte solution that is placed in a cell wherein an applied electrical potential causes electrical charge to pass to the electrolyte solution thereby generating at least one oxidant in the electrolyte solution. According to the present invention, electrolyte and/or electrolyte solution resides in a cell that generates oxidant in a batch mode and/or electrolyte and/or electrolyte solution passes through a cell that generates oxidant in a continuous mode. In a preferred embodiment, an electrolyte solution resides in a cell that generates oxidant in a batch mode. In such a preferred embodiment, individual aliquots of batch mode generated oxidants are added to a liquid in an effort to disinfect the liquid. Of course, oxidants generated by the apparatus and method of the present invention are suitable for disinfecting, bleaching and/or degrading liquid as well as other material, such as, but not limited to, human and/or animal body parts and food and material contained in a liquid. Oxidants generally comprise chemically reactive species capable of oxidizing a substance by, for example, accepting electrons. Therefore, the oxidants generated by the apparatus of the present invention comprise many uses.

In a preferred embodiment, the portable generator comprises an annular cell comprising an inner annular surface and an outer annular surface. In a preferred embodiment, the annular cell comprises at least one electrode positioned on the inner annular surface and/or at least one electrode positioned on the outer annular surface. Such electrodes optionally comprise the surface and/or electrodes in contact with the surface, for example, pins and/or plates. In a preferred embodiment, the at least one of the at least two electrodes comprises at least one catalyst. For example, in embodiments comprising a catalyst, a catalyst optionally comprises at least one Group VIIIB element of the Periodic Table of Elements and/or compounds thereof and preferably, at least one catalyst comprises ruthenium oxide.

According to the present invention, an electrical charge is delivered to a solution and/or substance comprising, for example, electrolyte. In a preferred embodiment, the circuit delivers a controlled electrical charge to an electrolyte solution. In an alternative embodiment, the oxidant generating apparatus measures and/or signals a characteristic of oxidant generation that terminates electrical charge delivery and/or notifies a user to terminate electrical charge delivery. In a preferred embodiment, the portable oxidant generator comprises a circuit that measures the electrical charge passed to an electrolyte solution and/or other electrolytic substance, for example, but not limited to, a gel and/or a solid.

In a preferred embodiment, the portable generator further comprises an output device for outputting information. For example, an output device for outputting information optionally comprises at least one output such as tactile, auditory, olfactory and visual outputs. Alternatively, the output comprises an electromagnetic output comprising, for example, electromagnetic radiation. According to a preferred embodiment of the present invention, information comprises at least one type of information selected from the group consisting of electrical charge, energy level, remaining energy, electrolyte level, remaining electrolyte, integrity of the portable generator, temperature, total dissolved solids, conductivity, pH, ion concentration, residual oxidant, and oxidation-reduction potential. The generator of the present invention optionally comprises a circuit for measuring at least one condition selected from the group consisting of temperature, total dissolved solids, conductivity, pH, ion concentration, residual oxidant, and oxidation-reduction potential. Such information is optionally provided to the same and/or a different circuit for providing at least one electrical potential for oxidant generation and/or other use.

In a preferred embodiment, the cell of the inventive generator comprises a reservoir, for example, but not limited to, a reservoir for holding a batch for batch mode operation. The generator optionally comprises at least one reservoir, which optionally comprises the cell, an additional cell, and/or a reservoir other than a cell. In embodiments comprising at least one reservoir, the reservoir optionally comprises an electrolyte reservoir, for example, but not limited to, a salt reservoir, a refillable reservoir, a disposable reservoir, and/or a self-sealing reservoir wherein the self-sealing reservoir optionally comprises a seal selected from the group consisting of an elastomer and a mechanical check valve.

In some embodiments, depending on use, deposits form on, or within, the portable generator. In such embodiments, the portable generator optionally comprises at least one deposit removing apparatus optionally comprising a scraper and/or a shaft comprising break-away segments.

In a preferred embodiment, the portable generator comprising a clip for clipping the generator to an object and wherein the embodiment comprises a housing, the housing optionally comprises a clip for clipping the housing to an object.

According to a preferred embodiment of the present invention, the portable oxidant generator comprises a housing. In a preferred embodiment comprising a housing, the housing optionally comprises a tube comprising at least one cross-section selected from the group consisting of circular, ellipsoidal, and polygonal cross-sections. In tube embodiments, the tube preferably comprises a length between approximately 3 cm and approximately 60 cm and preferably comprises a width between approximately 0.5 cm and approximately 30 cm. In several preferred embodiments, described herein, embodiments comprising a tube are referred to generally as "pen" embodiments of the present invention. Alternatively, the housing comprises a different shape, such as, but not limited to, a "cap" or "lid" shape suitable for opening, closing and/or sealing a container; thereby the apparatus is optionally capable performing a cap or lid function in addition to oxidant generation. In a preferred embodiment, a cap-shaped oxidant generator optionally comprises at least one set of threads and/or at least one aperture for insertion of a drinking utensil, such as, but not limited to, a straw. Of course, other cap or lid functions are within the scope of the present invention including those that do not rely on threads for attaching to and/or opening, closing and/or sealing a container, for example, but not limited to, snap closure mechanisms. Alternatively, the oxidant generating apparatus resides within and/or on a surface of a container, such as, within a canteen and/or attached to a side of canteen (e.g., inner and/or outer surface).

The present invention also comprises an inventive method for treating a substance using an oxidant generator. In a preferred embodiment, the method comprises the following steps: creating oxidation/reduction products in a portable electrolytic cell for holding an electrolyte; and releasing the products onto or into a substance for treating the substance. In a preferred embodiment, the step of releasing the products onto a substance for treating comprises releasing oxidants to a liquid (fluid) and/or other substance. Accordingly, the step of releasing the products to a substance for treating optionally comprises releasing the oxidants to a substance for decontaminating the substance.

In general, generation of oxidants also results in the generation of reductants, or reducing agents. In some instances, reducing agents comprise gas, such as, but not limited to, hydrogen gas. According to a preferred embodiment, at least some of the reducing agents comprising gas are optionally vented from the oxidant generator. It is understood that the oxidant generator of the present invention preferably comprises a generator that generates both oxidants (e.g., oxidizing agents) and reductants (e.g., reducing agents).

According to a preferred embodiment of the inventive method, the step of creating oxidation/reduction products in a portable electrolytic cell for holding an electrolyte comprises creating oxidation/reduction products by passing water through a porous electrolyte chamber to be collected in the cell. In a preferred embodiment, the step of creating oxidation/reduction products in a portable electrolytic cell for holding an electrolyte comprises creating oxidation/reduction products by passing an electrical charge to an electrolyte, preferably, the electrical charge passes to the electrolyte through an anode and/or cathode. In a preferred embodiment, the step of creating oxidation/reduction products in a portable electrolytic cell for holding an electrolyte comprises creating oxidation/reduction products by measuring the total dissolved solids of the substance. In a preferred embodiment, the step of creating oxidation/reduction products in a portable electrolytic cell for holding an electrolyte comprises creating oxidation/reduction products by pressing/pushing the end of the electrolytic cell comprising a self-sealing electrolyte storage compartment when electrolytic cell is inserted into the substance. In a preferred embodiment, the step of creating oxidation/reduction products in a portable electrolytic cell for holding an electrolyte comprises creating oxidation/reduction products by generating an electric current in an apparatus comprising a configuration selected from the group consisting of tube configurations and cap configurations.

In a preferred embodiment, the step of creating oxidation/reduction products in a portable electrolytic cell for holding an electrolyte optionally comprises creating oxidants by: generating an electrical charge in an electrolytic cell comprising at least two electrodes; and/or generating an electrical charge from an anode comprising at least one catalyst wherein the anode and/or cathode optionally comprise titanium and/or optionally comprise a metal oxide coating, such as, but not limited to, ruthenium oxide.

In a preferred embodiment, the step of creating oxidation/reduction products in a portable electrolytic cell for holding an electrolyte comprises creating oxidation/reduction products by generating an electrical charge from an anode comprising at least one metal selected from the group consisting of the Group VIIIB elements in the Periodic Table of the Elements and compounds thereof. According to a preferred embodiment, the step of creating oxidation/reduction products in a portable electrolytic cell for holding an electrolyte comprises creating oxidation/reduction products in a reservoir.

Preferred embodiments of the present invention comprise an apparatus to treat a substance, the apparatus comprising a portable electrolytic cell for generating oxidation/reduction products, the products to be subsequently added to the substance. The apparatus preferably comprises a hand-holdable configuration. Preferably, the electrolytic cell comprises a plurality of plates, more preferably an anode and a cathode. Preferably the anode comprises a catalytic material, more preferably a titanium substrate preferably with an oxide coating, more preferably at least one metal selected from the group VIII elements of the Periodic Table of the Elements, and most preferably wherein the oxide coating comprises ruthenium, for example, ruthenium oxide.

In a preferred embodiment of the present invention, the cathode is disposed within the anode, alternatively where the anode is disposed adjacent to the cathode and preferably comprises an outer housing for the anode, preferably wherein at least one of the anode or cathode comprises a metallic, plastic, ceramic, silicone, or a non-conducting material. A preferred embodiment also preferably comprises a pocket clip for attachment to the user's pocket. The electrolytic cell preferably comprises a delivery mechanism for adding oxidation/reduction products to the substance, and preferably comprises a power source comprising an electrical, electro-mechanical, or chemical generator. The power source preferably additionally comprises a generator to convert mechanical energy to electrical energy.

In a preferred embodiment of the present invention the apparatus comprises a reservoir, preferably a salt reservoir, and more preferably a refillable or disposable reservoir. Preferably, the chamber comprises a reservoir. A preferred embodiment further comprises an electrolyte storage compartment comprising a self-sealing cap. The cap comprises an elastomer or a mechanical check valve.

A preferred embodiment of the present invention further comprises a deposit-removing apparatus, preferably a scraper and/or a shaft comprising breakaway segments. The apparatus also preferably comprises a circuit for measuring total dissolved solids (TDS) in the substance to be treated, preferably an electrical circuit included in an integral circuit, and preferably further comprises a visually readable, audible, or tactile indicator for completion of electric charge in the substance, most preferably a vibratory indicator. The apparatus preferably additionally comprises a temperature measuring device.

Additionally, in a preferred embodiment, the present invention comprises a method for measuring chlorine, for example, residual chlorine in treated water, comprising an oxidation reduction potential (ORP) apparatus. In a preferred embodiment, the present invention comprises a pH measurement apparatus that optionally provides a signal for use in adjusting the ORP apparatus for variations in pH, for example, variations in treated water pH.

In a preferred embodiment, the method comprises a method for treating a substance using an oxidant generator, the method comprising the steps of: creating oxidation products in a portable cell comprising an electrolyte solution wherein the electrolyte solution optionally comprises salt; and releasing the products to a substance for treating the substance wherein the substance optionally comprises a fluid.

The present invention is also a method for treating a substance using an oxidant generator preferably comprising the steps of creating oxidation/reduction products in a portable electrolytic cell for holding an electrolyte, and releasing the products onto a substance for treating. Preferably, the oxidants are released onto a fluid, and more preferably the oxidants are released for decontaminating. The oxidants are preferably created by passing water through a porous salt chamber to be collected in the cell, preferably by passing an electric current through an electrolyte, and more preferably by generating an electric current from an anode to a cathode, and alternatively in an electrolytic cell comprising a plurality of plates. Preferably the anode comprises a catalytic material, preferably a titanium substrate. The anode preferably further comprises an oxide coating, and preferably comprises at least one metal selected from the Group VIII materials in the Periodic Table of the Elements, and more preferably comprises ruthenium oxide. In a preferred embodiment of the present invention, the oxidation/reduction products are created in a reservoir.

The present invention also comprises a portable hydration system comprising a pump for filtering water; a container for containing water; and a disinfection device for disinfecting water. In one embodiment, the disinfection device is removably attachable to the container and optionally comprises a cap. In another embodiment, the pump, container, and disinfection device are interconnectable. Interconnections are made, for example, but not limited to, through use of snaps, VELCRO®, straps, bands, and/or overall structural configuration of the elements. For ease of carriage, the portable hydration system optionally comprises a bag, wherein the bag optionally comprises at least one shoulder strap.

In one embodiment, the present invention comprises a hydration container comprising a disinfection apparatus or device. In such an embodiment, the disinfection device optionally generates mixed-oxidants and/or hypochlorite. The container optionally comprises at least one antimicrobial agent, for example, inhibiting microbial growth and/or attachment of microbes to the container. In one embodiment, the container comprises a material for inhibiting transmission of radiation, biological agents, and/or chemicals.

In one embodiment, the present invention comprises a portable pump comprising a housing, a piston, a filter, and a pressure recovery mechanism, as described herein (or variations thereof). In an embodiment of the portable pump, the housing comprises at least one substantially cylindrical cavity for housing the piston and/or the filter. The filter optionally comprises a reverse osmosis filter, such as, but not limited to, a reverse osmosis filter that comprises a printed membrane, as described herein and in a co-pending patent application. In an alternative embodiment, the portable pump comprises a disinfection device, which is optionally housed within the pump housing and/or positioned on said pump housing. The portable pump further optionally comprises a container for containing water. In such an embodiment, the container for containing water contains filtered, unfiltered, disinfected, and/or undisinfected water. In another embodiment, the hydration system is suitable for filtering and/or disinfecting urine and/or other bodily fluid. Attachments known in the art of catheters are also within the scope of the present invention, for example, to collect and/or replenish body fluids.

Broadly, it is the object of the disinfection apparatus of the present invention to provide an improved oxidant generator.

It is a further object of the disinfection apparatus of the present invention to provide an oxidant generator that may be carried conveniently by a single person and utilized to sterilize small quantities of drinking water.

A primary advantage of the disinfection apparatus of the present invention is the small size and light weight of the apparatus.

Another advantage of the disinfection apparatus of the present invention is the ability to measure total dissolved solids in the sample with the same apparatus to treat the water.

Yet another advantage of the disinfection apparatus of present invention is the ability to measure the oxidation reduction potential (ORP) of a substance, for example, but not limited to, treated water.

Yet another advantage of the disinfection apparatus of the present invention is the ability to treat a larger volume of water using a portable apparatus.

A further advantage of the disinfection apparatus of the present invention is the use of a safe-to-produce solution to disinfect a water supply.

A yet further advantage of the disinfection apparatus of the present invention is the ability to provide a hand-holdable and/or portable treatment apparatus comprising, for example, a pen-like and/or container cap configuration.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
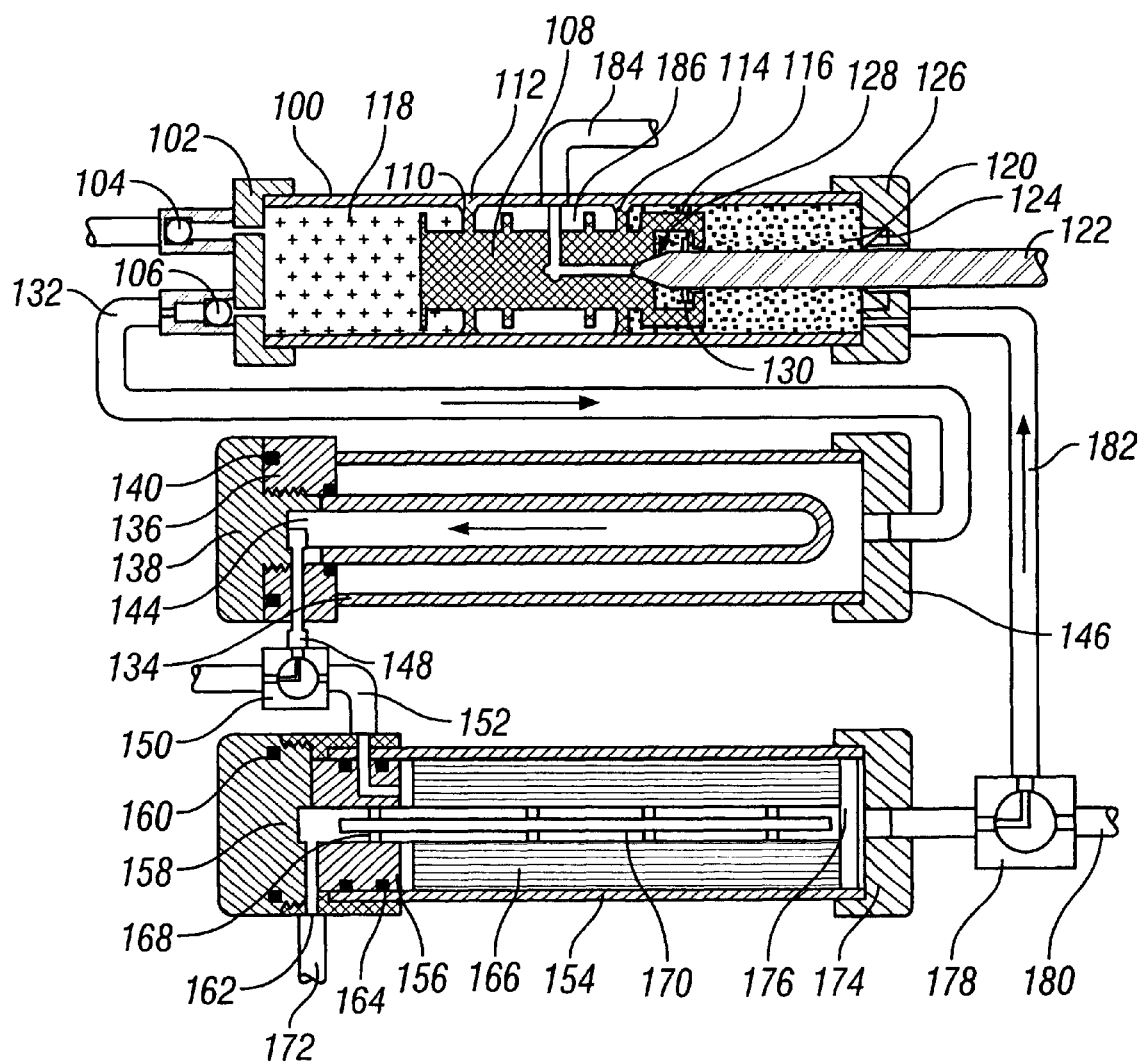
FIG. 1 is a section view of a preferred embodiment of the present invention that includes a pump mechanism, sweet water filter housing, reverse osmosis filter mechanism, and three-way valves for isolating flow to the reverse osmosis filter.

DESCRIPTION OF THE PREFERRED EMBODIMENTS (BEST MODES FOR CARRYING OUT THE INVENTION)

The present invention comprises an inventive filtration system and an inventive portable disinfection system. The inventive filtration system is described in further detail below followed by a description of the inventive disinfection system.

According to a preferred embodiment, the inventive filtration system comprises a three component system comprising a pump mechanism for pumping liquid, a conventional micron ($10^{-6}$ meters) level filtration system, and a reverse osmosis filter for reducing the level of total dissolved solids in the liquid so that the resulting liquid is potable. In a preferred embodiment, the pump mechanism optionally comprises a force recovery mode of operation, which, for example, reduces the total force required for at least one pump stroke. For example, such an embodiment optionally comprises a mechanism that stores energy from an upward pump stroke and then releases the stored energy to facilitate a downward pump stroke. The force recovery mechanism optionally comprises mechanisms that operate on rotational and/or translational pumping action. Thus, crank and/or knob-based mechanisms are within the scope of the present invention as well as arcuate mechanisms. Such force recovery mechanism embodiments are particularly useful to overcome osmotic pressure gradients experienced in reverse osmosis membrane filtration.

In a preferred embodiment, for low TDS water (sweet water) filtration, the force recovery mechanism comprises a pressure recovery mechanism that is optionally disengaged via a dual manual valve to more efficiently filter the sweet water. For reverse osmosis operation, a preferred embodiment of the pumping mechanism comprises a suction stroke and a pressure stroke wherein a spring device stores energy on the suction stroke and releases the stored energy on the pressure stroke. In such an embodiment, the overall force for operation is averaged over the suction and pressure stroke, thereby reducing an operator's applied force requirements on the pressure stroke. Such a mechanism, in effect, reduces the peak pump force nominally by half when applied to reducing the TDS of seawater.

In a preferred embodiment, the force recovery mechanism comprises at least one lever for creating leverage. Levers comprising adjustable levers are within the scope of the present invention as are levers comprising shapes other than that of a typical lever bar, e.g., other than a straight bar. According to a preferred embodiment, the lever comprises an adjustable folding and locking feature for significantly increasing the lever arm length and the resulting leverage, thereby facilitating RO filtration of liquids, such as, high TDS water including seawater. In general, the filtration apparatus when used with a lever, for example, must be placed on a surface capable of withstanding the force applied for performing filtration. Therefore, in instances where the underlying ground is unstable and/or not suitable for supporting the filtration apparatus, the apparatus optionally comprises a harness and/or support for attaching and/or supporting the inventive filtration apparatus to a substantially stable object, such as, but not limited to, a person's back, a tree, a vehicle, a rock, etc.

In a preferred embodiment, the inventive filtration system comprises a pulsing mechanism for pulsing liquid to significantly enhance efficiency of the RO filter. Pulsing liquid in a RO filter comprises one method of reducing concentration polarization effects that hinder filtration. Concentration polarization effects include, but are not limited to, particle build-up, solute concentration increase, and/or gel formation at, or near, the surface of a filter membrane.

In a preferred embodiment, the pulsing mechanism comprises a manual control whereby the stroke speed of the operator controls pulsing and/or pulsing control is provided by an ultrasonic source (greater than 20,000 hertz), a sonic source (20 hertz to 20,000 hertz), or a subsonic source (less than 20 hertz). Such sonic sources optionally comprise electrical drives; however, according to the present invention, pulsing optionally comprises a hydraulic oscillation circuit being mechanical in nature that is used in addition to or in lieu of a sonic source.

According to a preferred embodiment, the inventive filtration system comprises a configuration that allows for easy transport in the field, preferably by one person. In a preferred embodiment, the inventive filtration system comprises a use configuration and a storage configuration, preferably wherein the dimensions of the system in the storage configuration comprises approximately 15 centimeters in width by approximately 25 centimeters in length by approximately 5 centimeters in thickness, with a total weight of approximately 0.5 kilograms to approximately 3 kilograms, preferably approximately 1 kilogram.

According to a preferred embodiment, the inventive filtration system comprises three components, including a pump mechanism. Referring to FIG. 1, a pump mechanism including a housing 100 is shown. Such a housing comprises any of several materials known by one versed in the art of pump and cylinder manufacturing, such as, but not limited to, titanium materials. In the embodiment shown in FIG. 1, the cylinder comprises end caps 102 and 126 that are attached to the ends of the cylinder by conventional threads, welding and/or other suitable attachment means. In another embodiment of the pump, the housing comprises cast aluminum, titanium, steel, and/or other suitable material that is compatible with high TDS water and pressure encountered in filtration, for example, but not limited to, pressures required for RO of seawater. With castings, such a pump housing is, for example, bored from one end with appropriate seals and retaining rings as commonly known to one of ordinary skill in the filtration industry. As shown in FIG. 1, the pressure end of the pump, associated with the cap 102, incorporates a check valve 104 on the inlet stream, and a check valve 106 on the outlet stream comprising poppets, discs, or other sealing mechanisms. Alternative embodiments of the check valves comprise springs made of material compatible with the fluid being transferred, for example, but not limited to, stainless steel.

The springs provide positive sealing of the check valves in any orientation of the pump. The inlet check valve 104 allows fluid to enter a pump chamber 118 during the suction stroke and prevents water from exiting through the port on the compression stroke. The outlet check valve 106 allows water to flow out of the pump chamber 118 during the compression stroke and prevents water from flowing into the pump chamber 118 during the suction stroke. Entry to the inlet check valve 104 of the pump mechanism preferably comprises a flexible tube and strainer to filter large particles from the water stream prior to entry into the pump chamber 118. Moving in the pump housing 100 is a piston 108 comprising injection molded plastic, cast or machined metals, or any combinations thereof, whose materials are compatible with the fluid being pumped, such as water, with or without TDS. The piston 108 incorporates seals 110, 112, 114, and 116 which isolate the pump chamber 118 from a retentate chamber 120 and a retentate rejection annulus 186. The seals are oriented in the piston ring grooves in such a manner to ensure positive sealing of the different chambers. In an alternative embodiment, the seals comprise piston rings and/or other sealing technology commonly known by those versed in the art. The piston 108 is moved in and out of the pump housing 100 by means of a piston shaft 122. Force on the piston shaft 122 is applied by manual force applied by a pumping mechanism as described herein. An alternative embodiment of the present invention is a piston shaft force generating mechanism consisting of reciprocating motion driven by a power generating device such as petroleum based fuel driven engines, electric motors, or any other power generating device.

The piston shaft 122 is sealed to the retentate chamber 120 by means of a shaft seal 124 with sealing means previously discussed. The shaft seal 124 is housed in a cylinder cap 126 attached to the pump housing 100. Alternately, a quick-change cylinder cap 126 and the piston shaft 122 allow changes of the recovery ratio (permeate to feed water ratios). This is simply achieved by changing the piston shaft 122 diameter. Changing the piston shaft 122 diameter would necessitate changing the cylinder cap 126 housing so that the correct bore and the seal 124 match the piston shaft 122 diameter.

Referring to FIG. 1, as force is applied axially to the piston shaft 122 in the left direction, the left end of the piston shaft 122 forms a seal with the piston 108 via the seal ring 128. The seal ring 128 consists of an o-ring or plastic material. The purpose of the seal ring 128 is to isolate retentate in the retentate chamber 120 from escaping through ported holes in the piston 108, through a retentate annular chamber 186 and out a retentate discharge port 184 when the piston 108 is traveling leftward to compress water in the pump chamber 118. The piston seals 112, 114 are spaced on the piston 108 to eliminate interference with the retentate discharge port 184 when the piston 108 travels to both extremes of the pump housing 100.

Pressure recovery in the pump occurs as pressure is generated in the pump chamber 118, discharged through a filter housing 134, through a reverse osmosis element 166, and returns through a retentate return passage 182 to the retentate pump chamber 120. The difference in unit volume of the pump pressure chamber 118 to the retentate chamber 120 is uniquely defined by the volume of the pump shaft 122. The ratio of the diameter of the pump shaft 122 to the diameter of the housing 100 explicitly defines the recovery ratio of the reverse osmosis filter element 166. The recovery ratio of the reverse osmosis filter element 166 is defined as the ratio of the volume of permeate (finished water) that is expelled in a reverse osmosis chamber 170 to the feed water volume that is generated in one pump stroke in the pump chamber 118. Further, by the principal of conservation of mass, the feed water volume that enters the reverse osmosis element generated in one pump stroke is the sum of the permeate volume expelled in the chamber 170 plus the retentate volume 176 expelled from the right end of the reverse osmosis element. By further explanation, the RO element 166 operates by applying a pressure exceeding the osmotic pressure across the membrane. As the high TDS feed water moves from left to right across the RO element 166, permeate (low TDS) water is expelled in the RO chamber 170. As low TDS permeate is forced through the osmotic membrane, the TDS concentration of the feed water increases toward the right end of the RO element 166. At the right end of the RO element 166, the high TDS solution is referred to as retentate. There is effectively very little flow resistance from the left end of the RO membrane (feed side) to the retentate side, thereby, very little pressure drop from the feed side to the retentate side. Pressure recovery in the pump occurs because the high retentate pressure in the retentate chamber 120 acting on the annular area (the piston 108 cross section area minus the shaft 122 cross section area) on the back side of the piston 108 offsets the pressure in the pump chamber 118. Due to conservation of mass, the permeate volume produced in one stroke of the pump is equivalent to the volume of the pump shaft 122 as it enters the fixed volume of the pump housing.

When piston 108 has traveled to the most extreme left position of pump cylinder 100, force on the piston shaft 122 is applied in the opposite direction to move the piston 108 to the right. With the piston 108 moving to the right, new feed water is drawn into the pump chamber 118 via the inlet port 104. As force on the piston shaft 122 is applied axially to the right, the left end of the piston shaft 122 is lifted off of the shaft seal 128. Opening the shaft seal 128 causes retentate in the retentate chamber 120 to be expelled through at least one central port in the piston 108 to the retentate annular chamber 186 and out the retentate port 184. The piston shaft 122 is retained in the piston 108 via locking pins 130. Adequate space is provided in right retaining end of the piston 108 to allow the piston shaft 122 to be lifted off of the piston seal 128 thereby allowing retentate to escape while captivating the piston 108 to the piston shaft 122 via the locking retaining pins 130.

The filter system is two-fold. The first portion, which is the second component of the present invention, comprises a filter 144 with a micron rating of between approximately 0.1 microns and approximately 10 microns. The filter 144 serves the purpose of filtering all of the water that will be treated by the system, irrespective of the TDS of the source water. If the TDS is less than 1000 mg/L, then the micron rated filter 144 can be the only method used to filter the water. Water that has a TDS of less than 1000 mg/L is broadly classified as sweet water. A conventional low micron sweet water filter 144 is either integrated in the cylinder 100 with the pump mechanism, or incorporated in a separate chamber dedicated to sweet water filtration. If the TDS is greater than 1000 mg/L, then water is first filtered with the filter 144 comprising a micron rating and then with a second portion of the filter system preferably comprising the reverse osmosis filter 166.

FIG. 1 illustrates the mechanism of action of the micron filter system in the present invention. Water pumped from the pump chamber 118 of the pump mechanism travels through the pump discharge port and the check valve 106 through a fluid transport passage 132 to the inlet of the conventional micron filter housing. The filter housing consists of a cylindrical tube 134 with end caps 146 and 138. The preferred embodiment comprises a pressure relief device for the sweet water filter and reverse osmosis filter element. The pressure relief device for the sweet water filter is preferably housed in the filter end cap 138 and/or alternatively in the rear end cap 146 depending on filter element configuration. Likewise, the pressure relief device for the reverse osmosis filter is preferably housed in a filter cap 158, 174.

Figure 2:
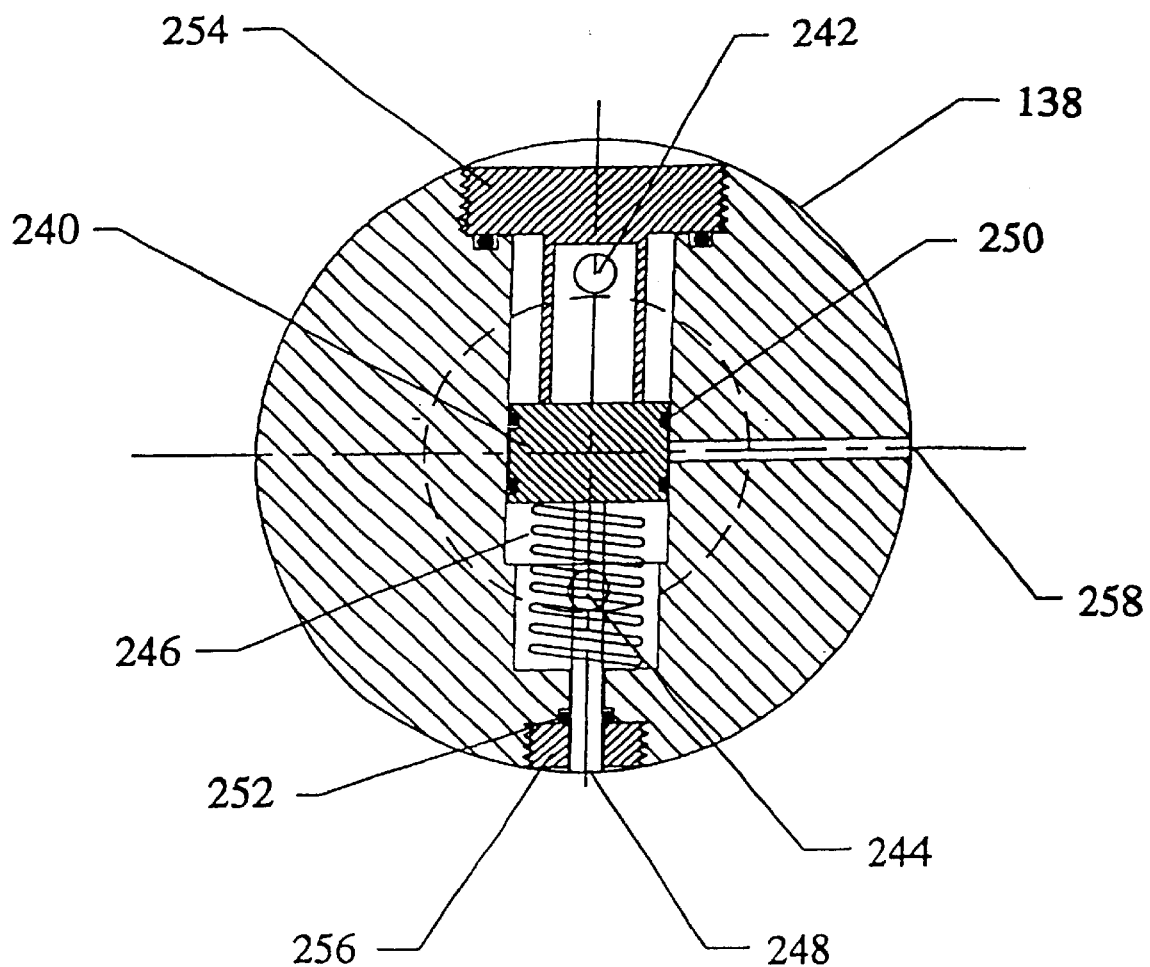
FIG. 2 is a cut-away view of the pressure relief device in the cap of the sweet water filter.

Subsequent discussion will address the pressure relief device for the sweet water, but works in similar fashion for the reverse osmosis filter element. Referring to FIGS. 1 and 2, the pressure relief device senses the differential pressure across the filter element 144 by sensing the pressure on the inlet side of the filter element 144 via a port 242 in the end cap 138 and the pressure inside the filter element 144 via a port 244. As shown in FIG. 2, the pressure across the two ports acts on a cylindrical piston 240 inside a bore on the end cap 138. The piston is sealed to the bore via seals 250. The piston 240 is sealed in the bore with an end cap 254 that is sealed to the end cap 138 via an o-ring or other appropriate seal. As the differential pressure across the filter increases due to particulate loading, force is applied to one side of the piston 240 via the port 242, in excess to that developed on the opposite side of the piston 240 via the port 244 which compresses a spring 246. Preload on the spring 246 is established at a desired force that maximizes the differential pressure across filter (not shown). In a preferred embodiment of the present invention, maximum differential pressure across the filter element is indicated by discharge of water via a port 258. Discharge of water via the port 258 occurs when the differential pressure across the piston 240 increases sufficiently to compress the spring 246 so that the seal 250 crosses the port 258 thereby allowing water to escape out of the port 258. Visible discharge of water out of the port 258 alerts the operator that it is time to clean or change the filter. Water relief through the port 258 ensures that no unfiltered water passes on to the RO cartridge 166 shown in FIG. 1. In an alternative embodiment of the present invention, maximum differential pressure across the filter is indicated by a rod 248 extending out of the filter end cap 138. The rod 248 is coated with a color that is visually noticed by the operator. The rod 248 is sealed to the filter end cap 138 via the seal 252 which is retained in the filter end cap 138 via a retainer 256.

The conventional filter housing alternately comprises other pressure vessel design approaches including thread or welded ends, cast housings, filament wound pressure vessels, and other techniques known to those versed in the art of filter housing design. The filter element 144 comprises any material adequate for filtration of water sources, preferably pleated cartridge elements, and alternately porous ceramic filters, compressed carbon filters, sintered metal and plastic, and other techniques well known by those versed in the art of filter manufacturing. The filter element 144 preferably comprises a closed end element as shown in FIG. 1.

Another embodiment of the filter element comprises a cylinder configuration with both ends open, whereby one end of the filter is the inlet port and water flows from the inside of the filter element to the outside of the element. Yet another embodiment of the present invention comprises a cylindrical filter element whereby water flows from the outside of the filter element 144 to the inside chamber of the filter element. The filter element 144 is sealed to the filter housing 134 by means of a sealing device such as an o-ring, face seal, or other known sealing mechanisms. Referring to FIG. 1, water enters the right end of the filter housing 134, flows around the outer surface of the filter element 144, through the element where particulates are precluded from passing, and then to the inside portion of the filter element 144. Water then proceeds out the discharge port 148. The filter element 144 is designed for easy change-out via filter the housing cap 138 that can be un-sealed and removed via threaded captivation with the filter housing 136. In another embodiment of the current invention, the filter housing cap 138 can be any type of quick release mechanism known to those versed in the art of filter system manufacturing. The seal between the filter cap 138 and the housing 136 comprises a face seal o-ring gland 140 integral to the filter housing 136. Another embodiment of the present invention comprises a cylindrical type o-ring seal which is mounted to a thread relief area on the filter housing cap.

The third major element of the present invention (and the second portion of the two-fold filter system) is a reverse osmosis filter system. Reverse osmosis filters are very efficient filter systems removing very small particles including ions such as sodium and chloride. In order to drive high TDS water through the RO membrane, the osmotic pressure of the water must be overcome. In a preferred embodiment, this system comprises a spiral wound design RO filter element with a membrane separator that is optimized to reduce polarization concentration under pulsing flow conditions. Other embodiments of the RO filter element comprise a ceramic membrane, carbon membrane monotubes, or other RO elements known to those versed in the design of RO elements. High TDS feed water at a pressure exceeding the osmotic pressure flows in to one end of the cylindrical filter element. As the water flows longitudinally through the length of the filter element, the water runs across the surface of the spiral wrapped membrane to the other end of the filter element. As the water flows across the membrane surface, the ions are rejected and water molecules flow through the membrane. As the water flows longitudinally through the filter element, the water on the feed water side of the membrane surface increases in ion concentration (higher TDS). The higher TDS water coming out of the far end of the RO element is referred to as retentate. The purified water going through the membrane element is referred to as permeate. The ratio of permeate out of the RO element to the feed water into the RO element is referred to as recovery ratio.

The reverse osmosis filter assembly as shown in FIG. 1 comprises a separate pressure chamber with o-ring sealed porting to isolate the inlet feed stream from the retentate rejection stream and the permeate product stream. Like the sweet water filter, the reverse osmosis filter element 166 can easily be changed by means of an o-ring sealed threaded connection, or twist and lock detent type engaging mechanism. A fluid connection 152 with the pump and sweet water components is accomplished by integral porting in the pump housing and/or external fluid pressure tubing. When the TDS is below 1000 ppm, the reverse osmosis assembly can be isolated from the remainder of the system by two mechanically ganged three-way diversion valves 150, 178. One diversion valve 150 directs water from the discharge of the sweet water filter away from the inlet to the reverse osmosis element. The filtered water is then collected for further treatment and consumption. The second half of the dual three-way valve isolates the RO filter retentate discharge stream and opens the back side of the pump piston to atmosphere to eliminate pressure recovery and provide full pumping capacity for the sweet water filter.

After the water, or other liquid, is filtered by sweet water the filter element 144, the water is discharged from the filter housing via the port 148 where it passes through the three-way valve 150 to the RO filter housing. The RO filter housing consists of a cylindrical tube 154 with end caps 158, 174. Construction methods for the other elements of the system have been previously discussed and also apply to the RO filter chamber. As high TDS water enters the RO filter housing via the inlet port 152, the water enters the left end of the RO membrane cartridge 166 and travels to the right end of the membrane cartridge 166. Again, by conservation of mass, the volume of the feed stream is equivalent to the volume of the permeate and retentate. A circular seal on the outside of the RO element 166 and inside the cylindrical tube 154 prevents retentate water from returning to the feed side of the RO filter element. Permeate that is driven under pressure across the RO membrane is collected in a central chamber 170 where it is discharged to the outside of the filter mechanism through a port 172 in, for example, the filter housing cap 158. The central collection chamber 170 of the RO membrane element 166 is sealed to the filter housing cap 158 by an o-ring 168. The feed water entering the port 152 is sealed in the filter housing via o-ring seals 162, 164. These o-rings are captivated in o-ring grooves in the filter housing cap 158. The filter housing cap 158 is sealed via an o-ring 160 to the filter housing end fitting 156 via an o-ring groove at the base of the threads in the filter housing cap 158. A permeate water passage 172 in the filter housing cap 158 is sealed to the filter housing by the o-rings 160 and 162. Water entering at the port 152 and exiting at the port 172 is channeled around annular grooves in the filter housing cap 158 so that the rotational orientation of the filter housing cap 158 with respect to the filter housing end fitting 156 is not critical. For instance, the port openings 152 and 172 in the filter housing cap 158 do not need to line up directly with the port openings in filter housing end fitting 156.

Retentate water 176 exiting from the right side of the reverse osmosis membrane element 166 exits a filter element end cap 174 through the three-way valve 178 through a retentate passage 182 and enters pressure recovery side of pump into the annular chamber 120.

When source water TDS is less than 1000 mg/L concentration, reverse osmosis treatment is not required to reduce TDS. Under these conditions, several advantages accrue when not processing all of the water through the reverse osmosis filter element 166. Adequate water treatment can be achieved by filtering the water with the micron filter 144. The advantages for isolating the reverse osmosis process from the treatment system include lower manual operating pressure, increased volume throughput in a given time, and extended life of the reverse osmosis filter element. To isolate the reverse osmosis filter, two mechanically ganged three-way valves 150, 178 are manually rotated so that the reverse osmosis element is isolated from the treatment process. The three-way valve 150 is rotated so that water is diverted from the micron filter passage 148 and exits to the left out of the three-way valve 150. In this configuration, the passage 152 to the reverse osmosis filter 166 is blocked off. Likewise, on the right side of the reverse osmosis filter housing, the three-way valve 178 is rotated so that flow is blocked from the reverse osmosis retentate chamber 176. The valve is rotated so that the passage 180 is connected to another passage (shown as element 182). In a preferred embodiment of the present invention, the two three-way valves 150 and 178 are stacked together and manually operated with a common shaft. With the passage (shown as element 182) connected to the discharge port passage 180, retentate can be expelled from the pump annular chamber 120. Likewise, air can be introduced to the chamber 120 through the passages 180, 182, thereby allowing full travel of the piston 108 in the pump housing 100. In this manner the full volume of the feed water in the chamber 118 can be discharged into the micron filter housing, filtered through the filter element 144 and expelled from the port 148 and diverted through the left port of the three-way valve (shown as element 150) as filtered water. Since the pressure drop across the micron filter 144 is low compared to the pressure required to overcome the osmotic pressure of the reverse osmosis membrane 166, the applied force on the pump mechanism will be much less than the force required for reverse osmosis filtration with pressure recovery.

Figure 3:
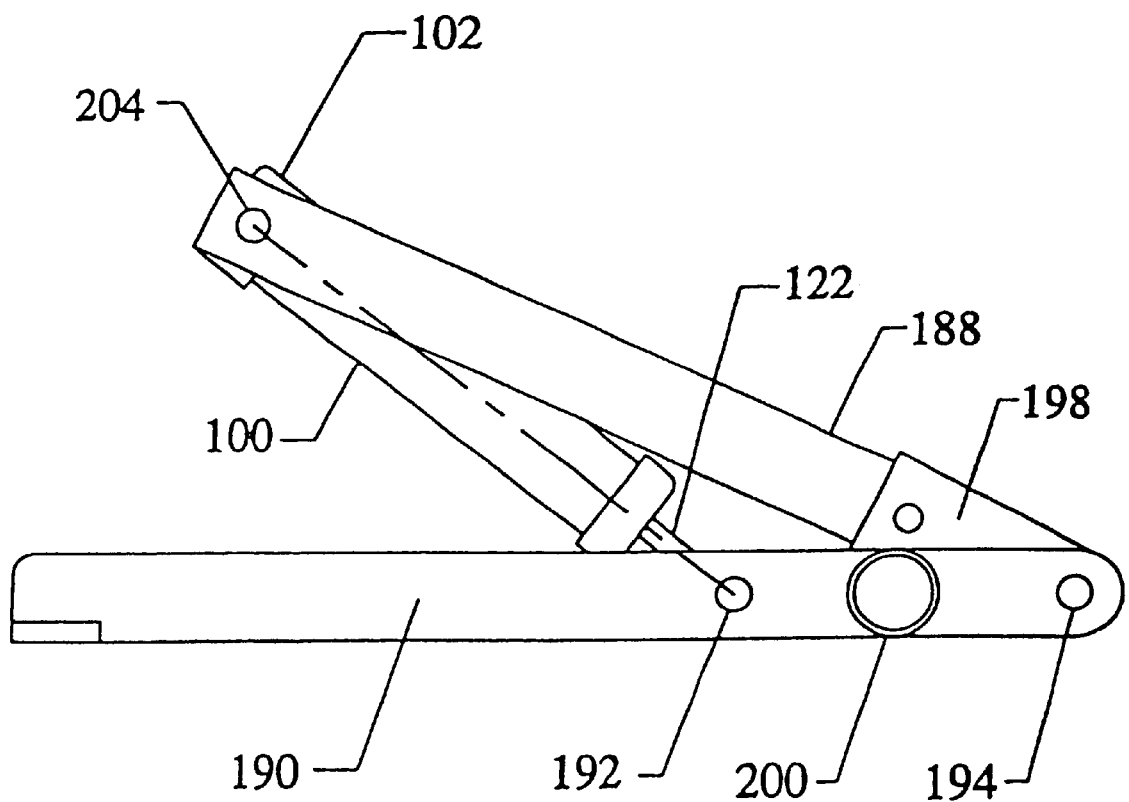
FIG. 3 is a side view of a preferred embodiment of the present invention showing the mechanical lever mechanism that creates a mechanical advantage to drive the operating shaft in and out of the pump mechanism.
Figure 4:
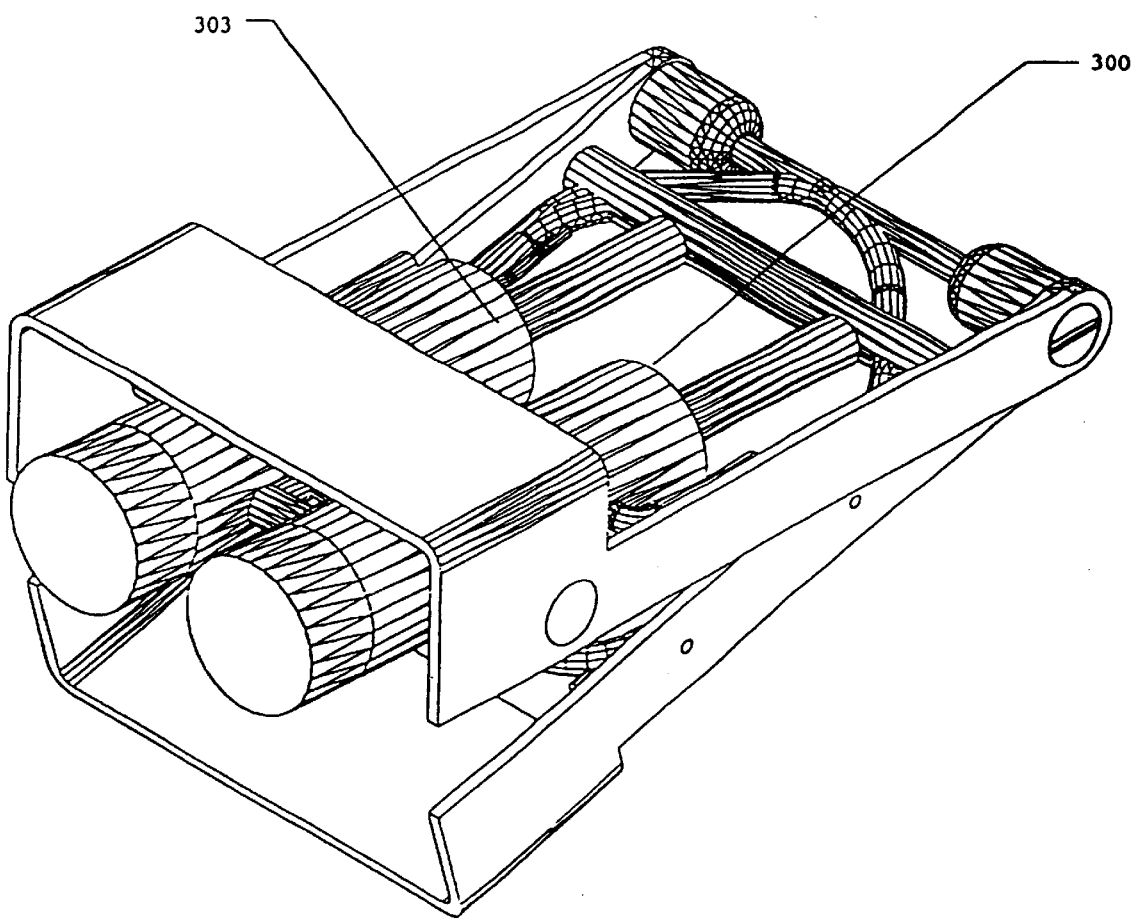
FIG. 4 is an isometric view of an alternative embodiment of the present invention showing the mechanical lever mechanism with two cylinders.

The mechanical action of the driving force is shown in FIG. 3. In order to provide the driving force for the pump, a preferred embodiment comprises a mechanical device (pump jack) to provide a large mechanical advantage to the pump shaft 122. In order to achieve the lightweight required for this device, the components of the system are manufactured from titanium in a preferred embodiment. Other embodiments of the present invention comprise aluminum, magnesium, or other lightweight materials. To achieve the mechanical advantage, a preferred embodiment comprises lever arms 190, 188 pinned together at a hinge pin 194. The pump housing is pinned at a hinge pin 204 and the pump shaft 122 is pinned and hinged at a pin 192. By opening the lever arm 188 relative to another lever arm (shown as element 190), the distance between the pump shaft hinge pin 192 and the pump housing hinge pin 204 becomes longer by the commonly know trigonometric laws. In other embodiments of the present invention, other commonly known pump jack mechanisms can be employed to force the pump shaft 122 in and out of the pump housing. As a further clarification of the present invention, refer to FIG. 4. In this drawing, this preferred embodiment of the present invention comprises two cylindrical components 300, 303. The cylindrical component (shown as element 300) comprises a pump mechanism and integral micron filter. The other cylindrical component (shown as element 303) comprises the reverse osmosis membrane element.

Figure 5:
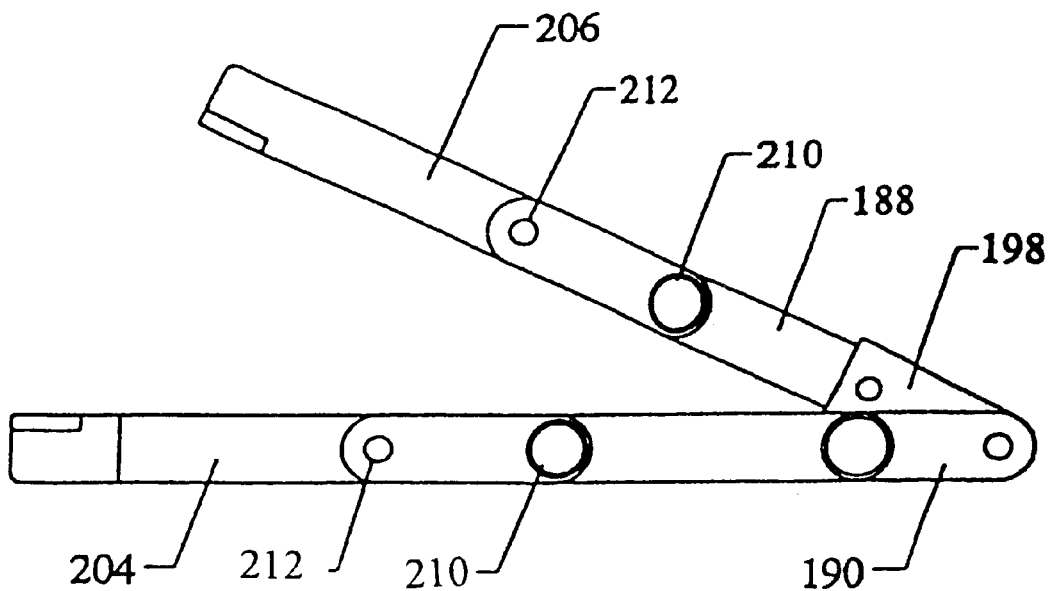
FIG. 5 is a side view of a preferred embodiment of the present invention showing the mechanical lever mechanism with the lever arms of the mechanism unfolded and extended.
Figure 6:
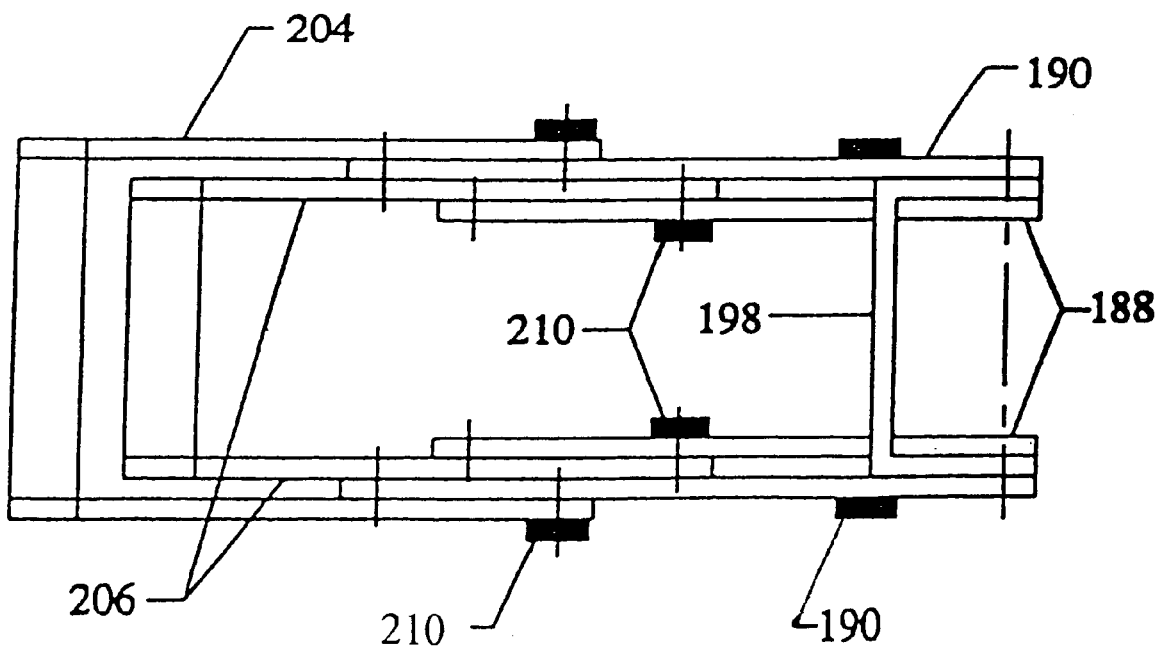
FIG. 6 is a top view of a preferred embodiment of the present invention showing the mechanical lever mechanism with the lever arms of the mechanism unfolded and extended.

Referring to FIG. 5 and FIG. 6, a preferred embodiment of the present invention comprises a pump jack extension mechanism that provides additional mechanical advantage for applying force to the pump shaft 122 of FIG. 3. The pump is removed from these views for clarity. In a preferred embodiment of the invention, the lever arms 188 and 190 are extended by additional arms (shown as elements 206 and 204, respectively). In the retracted position, one arm 206 is rotated 180 degrees about a pin 212 so that that arm 206 is folded back over another arm 188. In the extended position, one arm 206 is held in position by a locking knob 210. The locking knob 210 is a captivated shoulder bolt with threads that screw into the lever arm 188 to fix the arms (shown as elements 188 and 206) together in rigid fashion. Another embodiment of the present invention comprises a spring loaded knurled knob with shaft that slides in to one of the arms (e.g., element 188) to lock other arms 206, 188 together. The action of the pin 212 and the locking knob 210 cause a rigid connection between at least two of the arms (e.g., arms labeled as elements 206 and 188). Likewise, the same type locking mechanisms apply to the other arms (e.g., arms labeled as elements 190 and 204). In another embodiment of the present invention, the extension locking mechanism comprise slide plates that engage both inner arms 188, 190 and outer arms 204, 206 to lock the arms together. In another embodiment of the present invention, the extension mechanism comprises nested arm sections that slide over one another and extend to full length or slide together in the stowed position. This mechanism is commonly used in drawer guides on furniture. In yet another embodiment of the present invention, the extension mechanism comprises nested tubes that extend and collapse inside one another. A typical example is the telescoping aspect of an automotive electric radio antenna. Other extension mechanisms common to the mechanical industry may be used as the extension mechanism. Alternatively, the extension mechanism is absent, or there are more than two extension segments.

Figure 7:
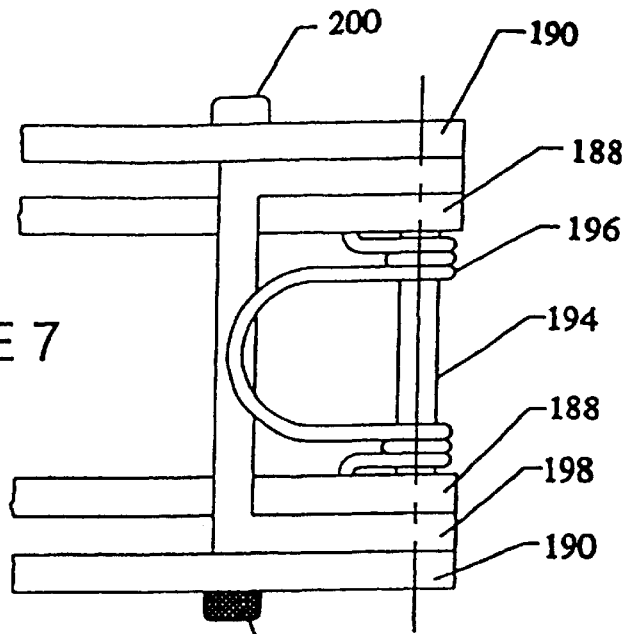
FIG. 7 is a top view of a preferred embodiment of the present invention that shows the spring and engage/disengage mechanism for the pump spring assist mechanism.

Conventional water filtration using a micron filter typically does not require significant differential pressure to force the water through the filter element. Typical pressures are less than 100 pounds per square inch (psi). However, for reverse osmosis membranes, the pressure to drive the water across the membrane is a function of the TDS in the water. The pressure force required can be significant and on the order of approximately several hundred psi. Most hydraulic jack mechanisms have a pressure stroke and a return stroke. The pressure stroke requires force and the return stroke is usually very low force that is associated with friction in the pump device. In a preferred embodiment of the present invention, the pump jack mechanism incorporates an energy storage device to store up energy in the return stroke. The stored energy is then released on the pressure stroke to ease the force required by the operator in the pressure stroke. Under ideal conditions at a given TDS level, the stored energy is approximately half of the total force required to drive water through the RO membrane. Likewise, the peak force required of the operator to operate the pump in the power (pressure) stroke is reduced by half. Referring to FIG. 7, the energy storage device comprises a spring 196 installed on a pivot pin 194 of the pump jack mechanism. In another embodiment of the invention, the spring is installed in the annular retentate chamber 120 of the pump housing. In another embodiment of the current invention, the energy storage device comprises a gas charged strut similar to those used to counterweight automobile hood and trunk hinges.

Figure 9:
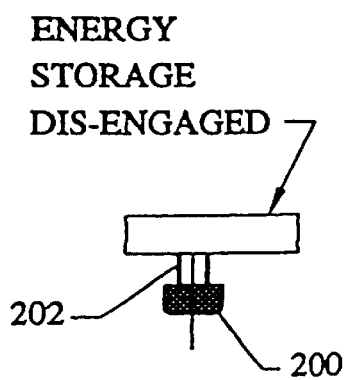
FIG. 9 is a top detail view of the pump jack mechanism showing the dis-engaging knob in the dis-engaged position.
Figure 8:
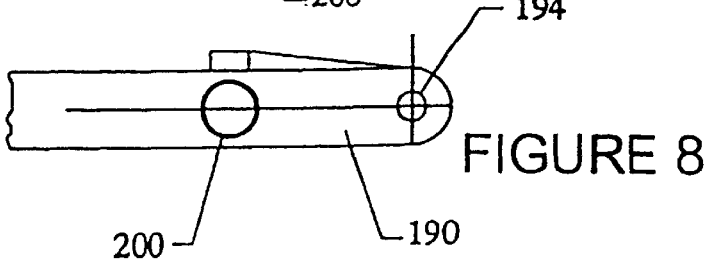
FIG. 8 is a side view of a preferred embodiment of the present invention that shows the spring and engage/disengage mechanism for the pump spring assist mechanism.
Figure 10:
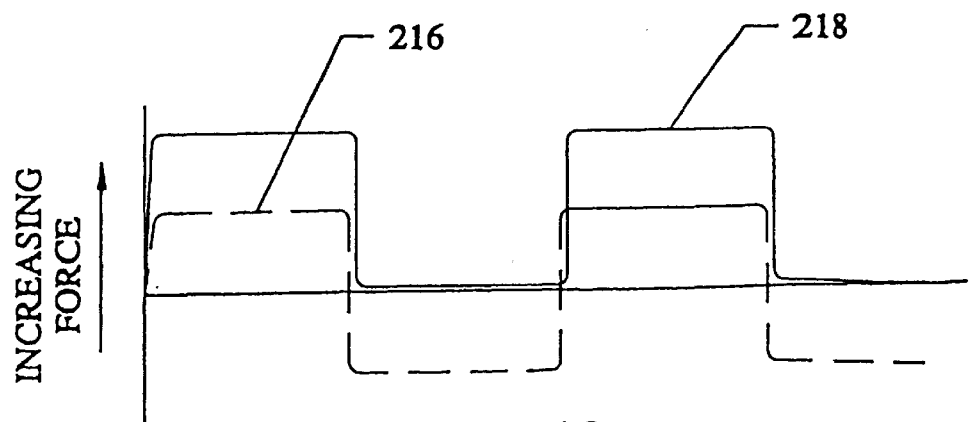
FIG. 10 is a force versus time curve that demonstrates the peak applied energy with and without the pump spring assist mechanism.

Referring to FIG. 7, FIG. 8, and FIG. 9, the energy storage device comprises the spring 196 wrapped around the pivot shaft 194 that creates a closure force between the jack arm 188 and the intermediate arm 198. To utilize the energy storage feature of the spring 196, a spring loaded engaging knob 200 is rotated to align a cam 202 in a matching cam slot in the arm 190 so that the shaft on the knob 200 engages a hole in the intermediate arm 198. With a matched pair of knobs 200, 200' engaged on each of the arms 190, 190' the energy storage feature is activated. To disengage the energy storage feature, the knobs 200, 200' are pulled away from the arms 190, 190' and rotated so that the cams 202, 202' will not allow the knob shaft to engage the holes in the intermediate arm 198. With the energy storage feature engaged, the force curve for operation of the pump mechanism generally follows the curve 216 of the force diagram of FIG. 10. With the energy storage device dis-engaged, the force follows the curve 218. In another embodiment of the present invention, the engaging knob device comprises a spring loaded threaded knob. The engaging mechanism can also be of any type device of engagement commonly known to those versed in the art of mechanical engineering.

In a preferred embodiment, the filtration system of the present invention optionally uses the reverse osmosis filter engaged or disengaged, and is optionally operated, for example, by hand and/or by foot action. With hand action using the RO filter, the energy storage feature benefits the operator by reducing the peak load in half, but energy is required by the operator in both directions of pump movement. With foot action, the filtration system is lying on the ground (or other suitable surface) and the operator powers the pump by foot. In this mode, it may not be beneficial to utilize the energy storage device because it would be difficult to power the pump by foot in both stroke directions. However, since body weight is available, more force can be applied in the power stroke. In a preferred embodiment of the present invention, a return spring is incorporated in the jack mechanism to open the jack arms 188, 190 during the return stroke so the jack will be ready for another power stroke from the foot of the operator.

Published studies by B. B. Gupta, et al, in the *Journal of Membrane Science,* 1992, pages 257 B 266, have shown that reverse osmosis efficiency can be improved by pressure and flow pulsations across reverse osmosis membranes. In a preferred embodiment of the present invention, the manual stroke rate of the operator on the pump mechanism provides enhanced permeate flux from the RO membrane element.

Figure 11:
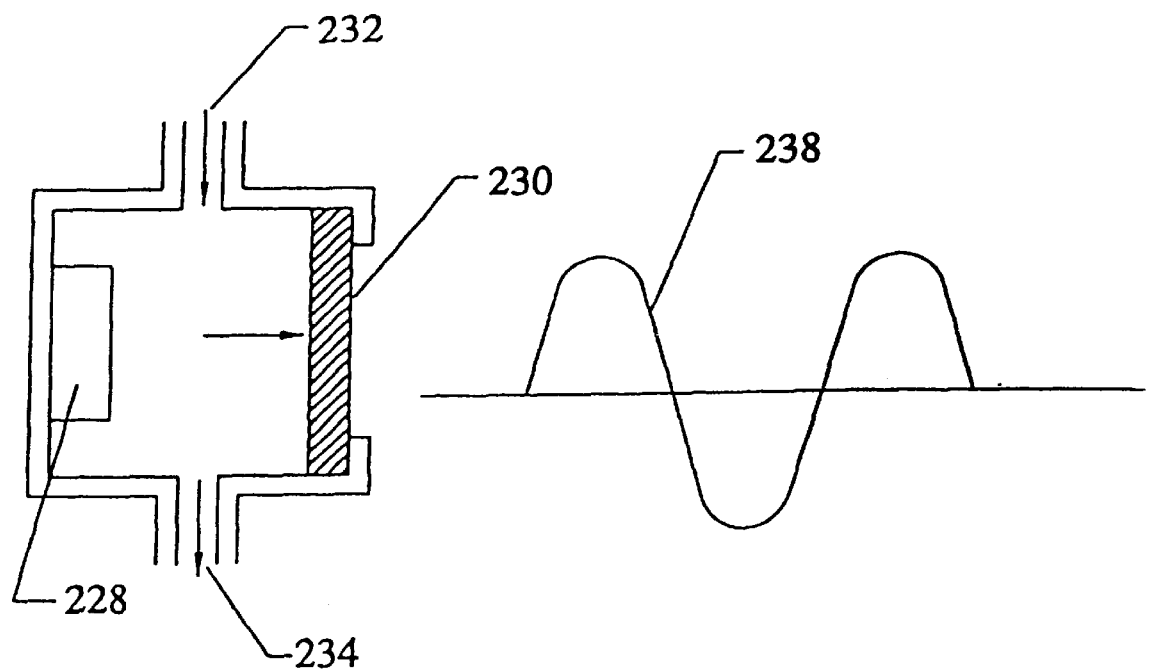
FIG. 11 is a schematic representation of the electrically driven pulsing mechanism for enhancing the efficiency of the reverse osmosis membrane.
Figure 12:
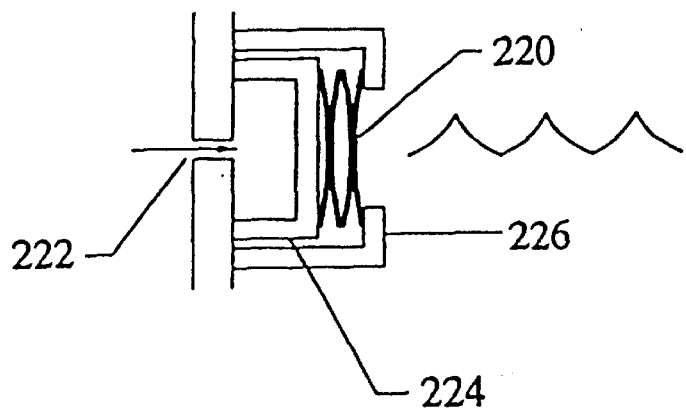
FIG. 12 is a schematic representation of the hydraulically driven pulsing mechanism for enhancing the efficiency of the reverse osmosis membrane.

In another embodiment of the present invention shown in FIG. 11, the pulsing mechanism comprises an electrical transducer 228 that creates an oscillating and/or controlled pulse in the fluid stream. The transducer preferably comprises an ultrasonic source (greater than 20,000 hertz), a sonic source (20 hertz to 20,000 hertz), or a subsonic source (less than 20 hertz). Because a pressure wave (labeled as element 238) would be a variable pressure wave, the mean pump pressure into the RO chamber could be lower than the osmotic pressure of the RO membrane and the peaks of the pressure wave would exceed the osmotic pressure and create a pulsing effect on the membrane. The pulsing effect disturbs the accumulated ion concentration that is near the surface of the membrane. The accumulated ion concentration is referred to as concentration polarization. By reducing concentration polarization, localized osmotic pressure (near the membrane surface) and/or fouling (e.g., cake and/or gel formation) is reduced and permeate flux is increased. Another embodiment of the RO membrane comprises a ceramic based RO membrane 230 that provides rigidity to avoid dampening the pressure wave and provides a firm support for receiving the pressure wave, such as that shown in FIG. 11 as element 238. Of course, other pressure profiles are suitable for improving operation and diminishing the effects of concentration polarization and/or fouling. In this embodiment of the invention, the permeate proceeds through the RO membrane 230, feed water 232 enters the RO chamber, and the retentate 234 exits the RO chamber.

Referring to FIG. 11, another embodiment of the present invention comprises a hydraulic circuit integrated into pump housing (not shown). The hydraulic circuit is designed to create a pressure oscillation in the fluid flow. As fluid enters at least one orifice 222, pressure is built up under a relief disc 224 that is being opposed by bellville springs 220. As the pressure increases under the relief disc, the spring pressure is overcome, and fluid exits around the perimeter of the relief disc 224. The assembly is captivated in the housing 226. The pulse rate is determined by the applied pressure, size of the at least one orifice 222, diameter of the relief disc 224, and the spring constant in the bellville springs 220.

The present invention may optionally be used in conjunction with a disinfecting mechanism. Preferred embodiments of a portable disinfection systems of the present invention are also described to varying degree in U.S. patent application Ser. No. 09/318,468, entitled "Portable Water Disinfection System", to Herrington et al., filed May 25, 1999; continuation-in-part U.S. patent application Ser. No. 09/514,431, entitled "Portable Disinfection and Filtration System," to Herrington, et al., filed Feb. 28, 2000; and continuation-in-part U.S. patent application Ser. No. 09/579,178, entitled "Portable Water Disinfection System," to Herrington, et al., filed May 24, 2000. Preferred embodiments of portable disinfection systems of the present invention are shown in FIGS. 13 through 24.

In the claims and specification of the present invention, the term decontaminate is used herein to describe a process whereby pathogenic micro-organisms are inactivated to render a source of water potable. Likewise, decontaminate also applies to a chemical process whereby the oxidant product of the disinfection apparatus can react chemically with other toxic chemicals so that the resulting reaction products are not harmful for human contact or consumption. Portability refers to a device that can physically be moved by one or more humans. In a preferred embodiment, the present invention comprises a portable, batch mode, oxidant generator that generates an aliquot of oxidant solution that can be added to water in a canteen or other storage container to provide drinking water. Alternative embodiments wherein oxidants are generated in a "continuous" manner are also within the scope of the present invention. In a preferred embodiment, the invention requires a source of salt, such as, but not limited to, sodium chloride. In preferred embodiments of the invention, shown generally in FIGS. 13A and 13B, a quantity of salt sufficient for several days of field use is optionally included. In another embodiment of the present invention, a salt solution pre-made to the correct concentration is stored in a capsule in the cap and is accessed by the apparatus through a re-sealable opening in the end of the capsule. Other embodiments that utilize conventional salt carried by back packers and military personnel may also be utilized as explained below.

The present invention is preferably based on the electrical chemical reactions that take place when a current is passed through a salt solution between at least one anode and at least one cathode in contact with the solution. According to the present invention, electrodes need not be necessarily "in" the solution but rather in electrical contact with the solution. The manner in which the present invention operates may be more easily understood with reference to FIG. 15, which is a schematic view of an oxidant generator 390. Salt solution 396 is subjected to electrolytic decomposition by passing a current from a power or energy source 399 between an anode 394 and a cathode 392. The chemical species generated, in general, depends on the material from which the anode 394 is constructed, as well as the electrical potential across the anode 394 and the cathode 392, and fluid conditions in the cell. The preferred anode materials comprise a titanium substrate with an oxide coating of Group VIII metals such as platinum, iridium, rhodium, or ruthenium, although other typical anode materials may be utilized in accordance with the present invention. In a preferred embodiment of the present invention, at least one anode comprises ruthenium, for example, ruthenium oxide. These particular Group VIII metals, in addition to being highly reactive catalytic compounds that produce products with good germicidal properties, resist corrosion to a high degree and do not dissolve easily. Coatings can be applied in a number of fashions including painting or spraying followed by oven baking. Coatings can also be applied by deposition and other methods known to those versed in the art and commonly applied in, for example, semiconductor and other industries.

The quantity of oxidant (or oxidants) generated depends primarily on the quantity of current (charge per unit time) that passes through the salt solution for a wide range of salt solution concentrations. The present invention optionally comprises observation of current to simplify the control of the quantity of oxidant generated. For the purposes of the explanation of the present invention, it is sufficient to observe that a switch 398 is closed for a period of time that is sufficient produce an electrical potential between the anode 394 and the cathode 392 and to allow a predetermined and/or a monitored amount of charge to flow to the solution 396 in contact with the anode 394 and the cathode 392. After this amount of charge has passed from one electrode to another the electrodes, the salt solution 396 contains a predetermined and/or determinable amount of oxidant or oxidants. This solution is then optionally added directly to a predetermined amount of drinking water, such as the water in a canteen, which provides a prescribed oxidant dose to the water. Alternatively, the volume or weight of the drinking water to be treated is not known. In this alternative situation, a preferred embodiment comprises measurement capabilities that allow for measurement of characteristics that infer potability, such as, but not limited to, measurements that determine whether residual oxidant is present.

According to a preferred embodiment, the oxidant solution generated by the present invention is highly concentrated. For example, concentrations optionally allow for a dilution ratio of approximately 4000:1 of water to be treated to oxidant solution. In such embodiments, only about 0.5 milliliter (ml) of salt needs to be processed to provide disinfectant for, e.g. a liter of drinking water. The salt solution 396 having a salt concentration of from fractions of a percent to fully saturated is sufficient for the purpose of the present invention. Of course, the solution optionally comprises more than one type of salt and/or other soluble material. According to a preferred embodiment, a few grams of salt are sufficient to provide an individual with potable water for several weeks. Since individuals such as hikers or military personnel typically carry salt, the present invention only requires that the individual carry extra salt, some or all of which may be integral to the salt compartment.

Since the amount of oxidant provided does not depend heavily on the salt concentration in the salt solution or brine, the present invention does not require a highly accurate measurement system for generating the salt solution. This reduces the complexity of the apparatus, which, in turn, reduces its costs and increases system reliability and functionality.

Furthermore, the current that passes through the salt solution can vary significantly, provided that a minimum amount of charge passes through the salt solution. Excess charge leads to excess oxidant or oxidants being generated, which the user can typically tolerate. Excess oxidant does not adversely affect the taste of the final drinking water. However, according to a preferred embodiment, the present invention limits excess oxidant.

Figure 13A:
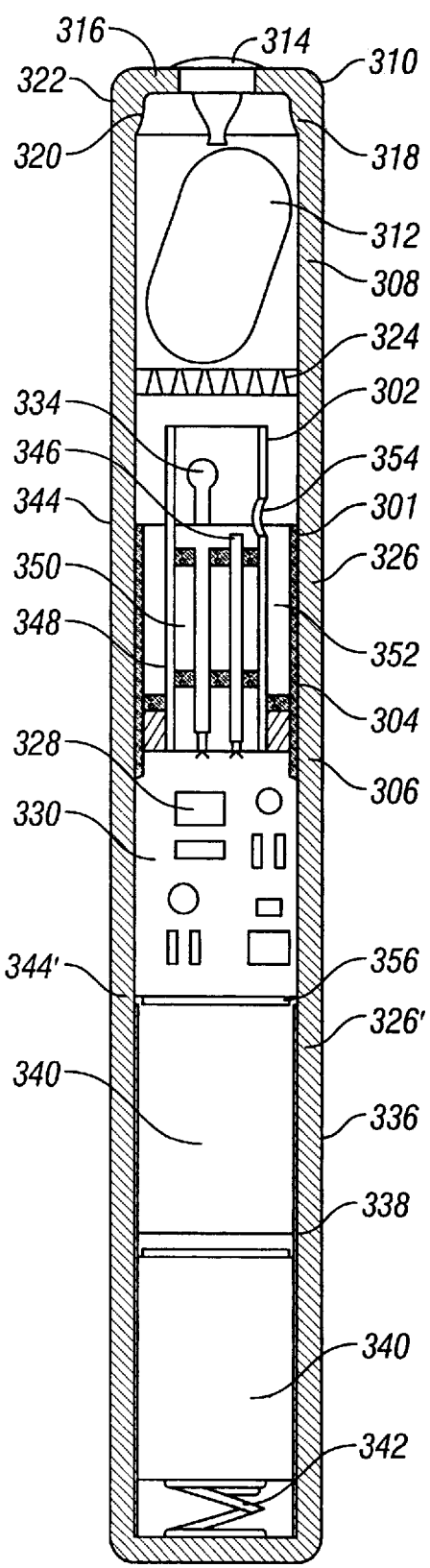
FIG. 13A is a cut-away view of a preferred embodiment of an oxidant generator according to the present invention.

In a preferred embodiment, referred to in FIG. 13A, the present invention comprises the following five elements: an electrolytic cell located in a housing 306, a brine (salt solution) generation compartment located within the housing 308, a power compartment located within the housing 306, a control circuit 330, and a fluid quality sensor package housed within a cathode 302. In this preferred embodiment, the electrolytic cell comprises an anode 301 concentrically surrounding the cathode 302. In this embodiment, the anode 301 comprises an outer annulus of an annular cell and the cathode 302 comprises an inner annulus of the annular cell. Of course, plate and/or other shaped electrodes are within the scope of the present invention as are cells comprising other shapes. The anode 301 and the cathode 302 are held concentrically in position by a spacer 304, which creates a liquid tight seal between the two elements. In this preferred embodiment, the anode 301 comprises a tube, optionally comprising titanium, sealed within the plastic cell housing 306. Further, the anode 301 is coated on the internal surface with at least one Group VIII catalyst in the form of, for example, a metal oxide. Preferably, the Group VIII catalyst metal oxide comprises ruthenium oxide. The annular space between the anode 301 and the cathode 302 comprises a cell chamber 352. Disinfectant solution, comprising at least one oxidant, is generated within the cell chamber 352 when brine (salt solution) is introduced into the cell chamber 352 and an electrical potential is applied between the anode 301 and the cathode 302 thereby allowing charge to flow to the salt solution in the cell chamber 352. The concentration of disinfectant solution, comprising at least one oxidant, generated within the cell chamber 352 is explicitly defined by the amount of electrical charge that flows to the brine (salt solution).

According to the embodiment shown in FIG. 13A, brine (salt solution) for electrolysis in the electrolytic cell 352 is produced in the brine housing 308. In the preferred embodiment shown in FIG. 13A, the brine housing 308 comprises a single piece injection molded plastic housing comprising at least one integral cap 310 attached to the housing 308 by at least one integral hinge 318, at least one integral salt filter 324, and at least one gas (e.g., hydrogen) vent valve 314. Operationally, the brine housing 308 is removed from the cell housing 306 by separating at threads 344. Water is introduced in to the cell chamber 352 and then the brine housing 308 is reconnected to the cell housing 306. Of course, if the water comprises a sufficient level of electrolyte, such as, salt, then addition of additional electrolyte (e.g., salt) is in some instances optional. In this preferred embodiment, the brine housing 308 is threaded to match the cell housing 306 via threads 344 and a water tight seal is created by a seal 326. The complete disinfection pen assembly identified by FIG. 13A is, for example, shaken by the operator to introduce water from the cell chamber 352 through the salt filter 324 in to the brine chamber 308. According to this preferred embodiment, the water comes in contact with salt to dissolve salt to form brine (salt solution). In this preferred embodiment, salt is in the form of a salt tablet 312, but may also consist of salt in granular and/or crystal form, of course, the salt optionally comprises pure salt or salt comprising impurities, including, but not limited to, other salts. Undissolved salt is precluded from entering the cell chamber 352 by the salt filter 324. In this preferred embodiment, the salt filter 324 is, for example, injection molded integrally with the brine housing 308. Alternatively, for example, but not limited to, the filter screen is ultrasonically welded into the brine housing 308. In this preferred embodiment shown in FIG. 13A, the brine housing 308 is sealed by the integral cap 310. The cap 310 provides an access port whereby the salt tablet 312 is introducable into the brine housing 308. In this embodiment, the cap 310 is integrally connected to the brine housing 308 via the hinge 318. In this preferred embodiment, the hinge 318 is categorized and known in the industry as a "living hinge" and it is integrally molded with the brine housing 308 and the cap 310. Of course, the present invention optionally comprises other types of hinges and/or access ports and/or ways to introduce salt and/or other electrolyte for generating oxidants. In this preferred embodiment, the cap 310 forms a water-tight seal 320 with the brine housing 308. At least one notch 322 provides a sharp edge for lifting and opening the cap 310 from the brine housing 308. A check valve 314 is preferably an elastomer "umbrella-type" check valve and it snaps in to place via a small central hole in the cap 310. During the electrolysis process that occurs in the cell chamber 352, gas, for example, hydrogen gas, is liberated due to chemical reactions. Liberated hydrogen gas is, for example, vented up through the salt filter 324 and out through the at least one vent hole 316 located underneath the check valve 314 and then to the atmosphere outside of the disinfection pen assembly.

In this preferred embodiment, electrical energy to power the electrolysis reaction in the cell chamber 352 is provided by at least one battery 340. In alternative embodiments, power is provided by a fuel cell, other electro-chemical reaction devices, electro-mechanical devices such as an inductive circuit, or other electrical energy producing devices, including, but not limited to, solar, heat-solar, etc. In this preferred embodiment, the at least one battery 340 is housed in the plastic housing 336. Of course, according to the present invention, the housing optionally comprises a material other than plastic. Electrical energy from the at least one battery 340 is transmitted to an electrical circuit 330 preferably via an electrically conductive metallic strip 338, optionally positioned in a slot molded in the housing 336 wherein the slot optionally comprises a tapered slot and/or a slot with tapered and/or angled walls.

In an alternative embodiment, electricity from the at least one battery 340 is transmitted to the electrical circuit 330 via a thermal sprayed copper coating on the inside of the plastic housing 336. In another alternative embodiment, electricity is transmitted between the at least one battery 340 and the electrical circuit 330 via a polymer-based grafted coating on the inside of the housing 336. In this particular preferred embodiment, energy is transmitted from the at least one battery 340 to the electrically conductive strip 338, or optionally a copper tube, via a compression spring 342. In an alternative embodiment, the electrically conductive strip 338 comprises a spring type characteristic that also compresses a spring tab at the base of the housing 336 in lieu of the compression spring 342. Essentially, in this embodiment, the base of the strip serves as a spring. The housing 336 is sealed with the cell housing 306 via a seal 326'. In this preferred embodiment, the housing 336 is attached to the cell housing 306 via threads 344'.

In this preferred embodiment, power and other functions are controlled via the circuit 330. The circuit 330 serves to control the flow of electrical charge to the cell chamber 352 as well as optionally controlling the operation of an oxidation reduction potential (ORP) sensor 334, a total dissolved solids (TDS) sensor 346, and other sensors, for example, but not limited to, sensors that help maintain the accuracy of the ORP sensor 334 and/or the TDS sensor 346. The primary function of the circuit 330 is to control energy input in to the cell chamber 352. Operationally, the initial concentration of brine in the cell chamber 352 can be variable. Brine concentration variability is, for example, a function of how vigorously the operator shakes the pen to generate the brine (salt solution), how much salt is located within the brine chamber 308, how much water ultimately gets in to the brine chamber 308, how much brine is in the water initially and how much brine returns to the cell chamber 352. Since many variables impact the concentration of the brine in the cell chamber 352 prior to application of electrical energy, it is useful for the electrical circuit 330 to measure and control the amount of electrical power that enters the cell chamber 352. The total mass of disinfecting oxidants produced in the cell chamber 352 during any given cycle is approximately in direct proportion to the amount of electrical charge that enters the brine. In order to provide consistent dosing from one application to the next, it is useful to consistently produce the same mass of disinfecting oxidants from one use to the next. In this preferred embodiment, the circuit 330 controls the mass of oxidants produced in one use and operates a tactile device (vibrator) and/or other notification means, such as visual, taste, heat, pressure and/or auditory, to indicate to the operator that the oxidant production process is complete. For example, oxidant generation may involve production of a gas, which may be related to oxidant generation, which in turn may trigger a pressure sensor thereby alerting the user that enough oxidant has been generated. In a preferred embodiment, the notification means is a vibratory signal produced by energizing a small electric motor with an eccentric cam attached to the motor shaft. This mechanism optionally provides for an auditory signal (e.g., whistle) or other types of signals generally known in the field of cellular phones. A cellular phone or other portable communication device comprising the disinfection apparatus of the present invention is within the scope of the present invention. In such an alternative embodiment, energy sources, circuitry and/or signaling means are optionally shared by the communication device and the disinfection apparatus.

In the process of producing brine within the housing 308, several conditions may occur that result in production of brine of insufficient concentration. Such situations may occur, for example, when there is no salt within the housing 308, during initial operation when a dry salt tablet absorbs all of the water that enters the housing 308, or when the operator does not sufficiently shake the disinfection pen to produce brine. In this preferred embodiment, the control circuit 330 notifies the operator that insufficient brine exists in the cell housing 352. In this preferred embodiment, the electrical circuit 330 measures the charge and/or current input to the cell chamber 352. If insufficient brine exists in the cell chamber 352, insufficient charge will flow to the cell chamber 352. In this preferred embodiment, insufficient brine concentration will result, for example, in immediate activation of the tactile (vibratory) circuit to advise the operator that insufficient brine exists in the cell chamber 352.

An insufficient source of electrical energy will result in poor, or no, production of disinfecting oxidant. In this preferred embodiment of the present invention, the control circuit 330 will measure the amount of electrical energy (and/or power) available from the energy source and will result in immediate activation of the tactile (vibratory) circuit to advise the operator that insufficient energy exists to operate to produce a minimum amount of disinfectant oxidant. As discussed herein, it is understood that most batteries are rated in volts, which is related to electrical potential energy. Power is often given in Watts as, for example, the product of current and voltage where current is the amount of electrical charge transferred per unit of time. According to the present invention, electrolysis depends on transfer of electrical charge; thus, any energy source capable of directly or indirectly providing for transfer of electrical charge is within the scope of the present invention.

In the preferred embodiment shown in FIG. 13A, the pen is activated by closing an electrical switch. The switch contacts comprise the electrically conductive metallic strip 338 and the anode 301. By rotating the circuit housing 306 relative to the plastic housing 336, the conductive strip 338 contacts the anode 301 at a gap 356 by virtue of the threads 344'. The seal 326' provides friction relative to the circuit housing 306 and the plastic housing 336, and prevents the pen from unscrewing and coming apart at the threads 344'.

Under some operational conditions, the operator may inadvertently leave the pen in the "on" position by failing to open the switch circuit. In this situation, the conductive strip 338 maintains contact with the anode 301 at the gap 356. Without a protection circuit, the at least one battery may stay energized and be damaged, and/or de-energize the at least one battery, and/or damage the pen. In this preferred embodiment, the circuit 330 will open the electrical circuit to the cell chamber 352 when oxidant preparation is complete.

Figure 13B:
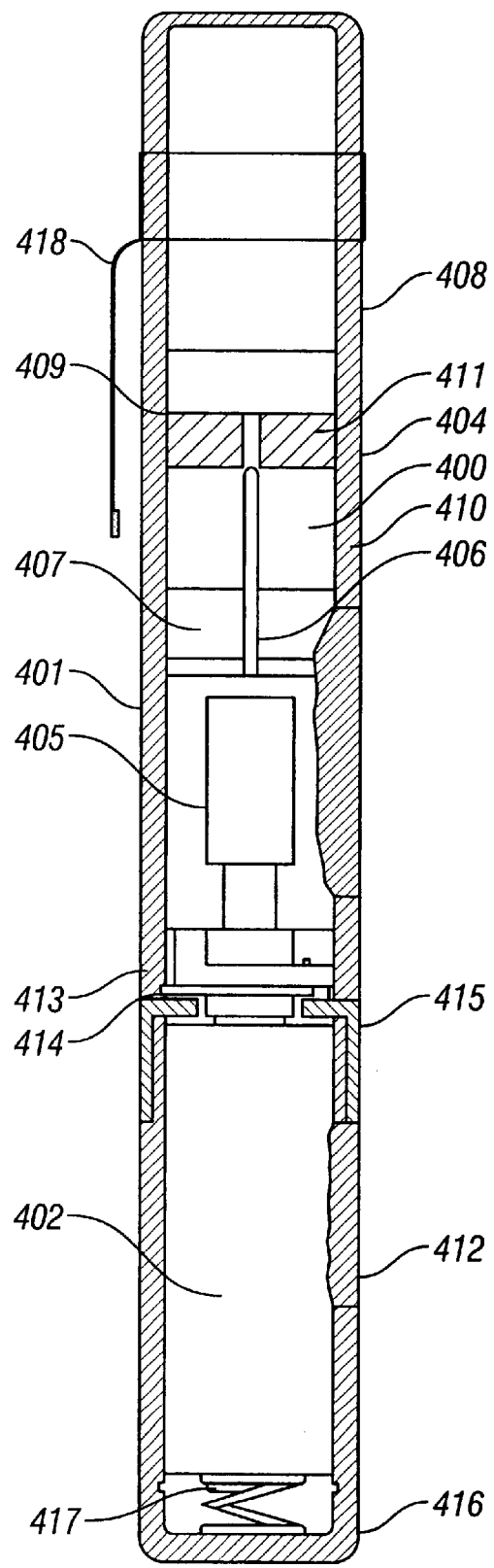
FIG. 13B is a cut-away view of a preferred embodiment of an oxidant generator according to the present invention.
Figure 13C:
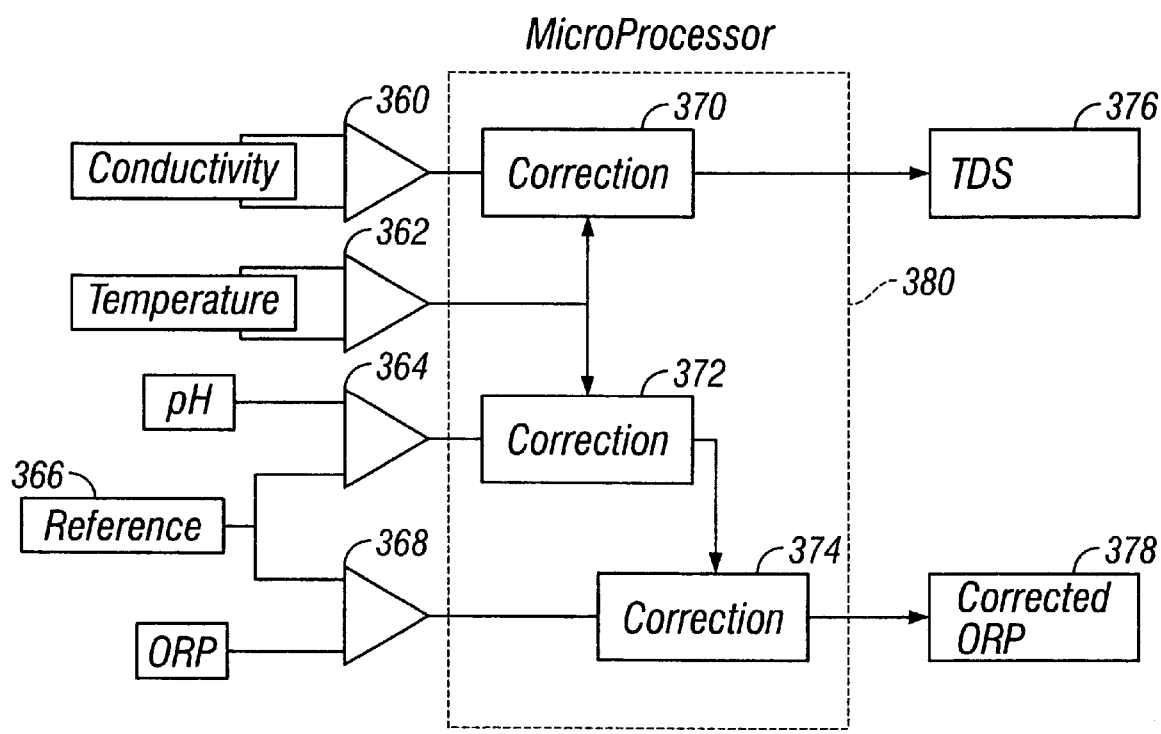
FIG. 13C is a schematic drawing of a sensor circuit according to a preferred embodiment of the present invention.

Referring to FIG. 13C, a sensor package is shown. The sensor package is, for example, located centrally within the cathode housing 302 of the embodiment shown in FIG. 13A. In a preferred embodiment, the sensor package comprises sensors for performing functions. For example, referring to FIG. 13C, four sensors are shown:

1) A pH sensor 364 comprising a cell, preferably a pH glass bulb 334 (as shown in FIG. 13A) or alternatively an Ion Selective Field Effect Transistor (ISFET), further comprising, for example, a reference cell.
2) A temperature sensor 362, preferably comprising a Resistance Temperature Detector, or alternatively a thermistor or thermocouple optionally comprising a thermal well.
3) An Oxidation Reduction Potential (ORP) probe 368 (shown as element 346 in FIG. 13A) preferably comprising a noble metal optionally comprising a reference cell. According to the present invention, the ORP probe 368 preferably comprises a platinum probe.
4) A metallic sensor housing 302 enclosing the aforementioned sensors. The sensor housing 302, optionally comprises an electrode, and preferably comprises a cathode. The 302 housing will afford physical protection of the sensors. The sensor housing 302 optionally comprises at least one aperture, slot and/or side port hole (element 354 in FIG. 13A), or the like, for preventing an air lock when the housing is immersed in a liquid medium. In a preferred embodiment the sensor housing 302 comprises titanium.

The metallic housing optionally functions as one of the electrodes of the electrolytic oxidant generating cell. In a preferred embodiment, a common reference cell 366 is used for both the pH and ORP sensors and is physically located within the confines of the sensor housing 302, optionally an electrode and preferably a cathode. In a preferred embodiment, the reference cell comprises a silver/silver chloride (Ag/AgCl) in, for example, an acrylamide gel. Antifreeze is optionally present to provide for low temperature operation. In a preferred embodiment, the sensors implement the following functions: pH, Temperature; ORP and/or Conductivity. The Conductivity sensor 360 performs a function that optionally employs the ORP probe and the sensor housing 302 as two electrodes and provides a measurement of Total Dissolved Solids (TDS).

In a preferred embodiment, various measurements are implemented as follows:

1) TDS is provided as an output 376 of the sensor package. In this embodiment, the TDS in solution is related to the conductivity of the solution and the temperature of the solution 370. This measurement is performed, for example, by impressing an alternating voltage potential across the ORP sensor 368 and the sensor housing 302 (e.g., electrode). The resulting alternating current is a function of the conductivity of the solution. This value is corrected for temperature. An alternating potential is used so as not to polarize the electrodes.

2) The pH of a solution is a measure of the hydrogen ion concentration. The pH measurement is performed by measuring the $H^+$ ions passing through a semipermeable $H^+$ barrier with respect to a reference cell for which a known pH exists 372, and optionally using the temperature of the solution to compensate this measurement.

3) ORP is provided as an output 378 of the sensor package. The ORP is a measure of the oxidizing ability of a solution (and/or presence of oxidant) and is dependent upon the pH and consequently the temperature of the solution. This measurement is made with respect to a reference cell for which a known ORP exists 374.

Oxidation reduction potential (ORP) is a good indicator of, for example, chlorine residual in water. The oxidant produced in the disinfection pen produces, among other things, a chlorine residual, or equivalent thereof. The ability to verify chlorine residual is important to verify that the treated water is safe to drink. In the aforementioned preferred embodiment of the present invention, the ORP sensor 346 is housed within the cathode 302. Because ORP is exponentially variable with pH, a pH sensor 334 is housed within the cathode 302. Operation of pH sensors are well known to those versed in the technology. Electrolyte gel 350 for operation of the a gel dependent sensor is located inside the cathode 302 and is confined between seals 348 at the upper and lower ends of the sensors within the cathode 302. Likewise, temperature is a linear variable with respect to ORP. To compensate, a temperature sensor is incorporated within the cathode 302. Conditioning and control electrical circuitry for all sensors is within, for example, the circuit 330.

Total dissolved solids (TDS) is acceptable in drinking water up to a maximum level of approximately 1000 milligrams per liter (mg/L). However, the generally accepted limit is 500 mg/L. Determination of TDS in water considered for drinking is important in order to determine if the TDS needs to be removed by reverse osmosis processes. In the aforementioned preferred embodiment of FIG. 13A, a TDS, or conductivity sensor is incorporated within the cathode 302. To preclude air from being trapped in the upper end of the sensor array within the cathode 302, at least one vent hole 354 (or slot, etc.) is present in a wall of the cathode 302.

In the aforementioned preferred embodiment of the present invention, the disinfection pen is controlled by the circuit 330 that optionally comprises an application specific integrated circuit (ASIC) 328 as well as other circuit components necessary to operate all control functions as well as the function of all sensors. In an alternative embodiment of the present invention, the control circuit comprises a printed circuit board (PCB) comprising electrical components. In another embodiment of the present invention, the control circuit comprises a PCB with industry standard micro-circuit as well as other discrete electrical components, including a microprocessor 380. In yet another embodiment of the present invention where the disinfection pen does not incorporate sensors or other the control features, the circuit comprises a simple switch that is activated by the operator for a specified period of time.

An alternative preferred embodiment is shown in FIG. 13B. This preferred embodiment of the present invention, comprises four primary components: electrolytic cell 400, power source 402, brine well 404, and integral circuit 405 for system control and measuring the total dissolved solids (TDS) in the source water to be treated. Alternatively, the system control circuit can be used for measuring the TDS of the brine, for example, if there is an insufficient amount of brine in the cell. An ORP sensor is optionally provided as well. In this preferred embodiment, cell 400 comprises outer housing 401 comprising cylindrical conducting wall that forms the anode of electrolytic cell 400. Cathode 406 is suspended inside outer housing 401 by spacer 407. In an alternative embodiment of the present invention, the cathode may be outer housing 401, and the anode may be central shaft 406. In a preferred embodiment of the present invention, the cell housing comprises a plastic, ceramic, silicone, or some other non-conducting material, and anode (as the outer electrode) comprises a titanium substrate (physically or chemically attached to the cell housing) with a Group VIII catalyst coating on the titanium substrate with conducting leads to the power source. Alternatively, the housing optionally comprises a metal comprising an integral or separate insulating material for insulating selective portions of the housing from internal operations. An aliquot of brine is held in electrolytic cell 400 during the time the current passes between the anode and cathode. The term "pen" is used throughout the specification and claims interchangeably to describe a hand-held device as shown in the drawings. The manner in which the aliquot of brine is generated and held in place is discussed in more detail below. After the current has passed through the brine, the aliquot of treated brine, now partially or completely converted to oxidant, is expelled from electrolytic cell 400 in to the fluid to be treated. Unconverted brine solution that is introduced into the drinking water source is at a very dilute ratio and typically will not be tasted due to the low concentration.

Figure 14:
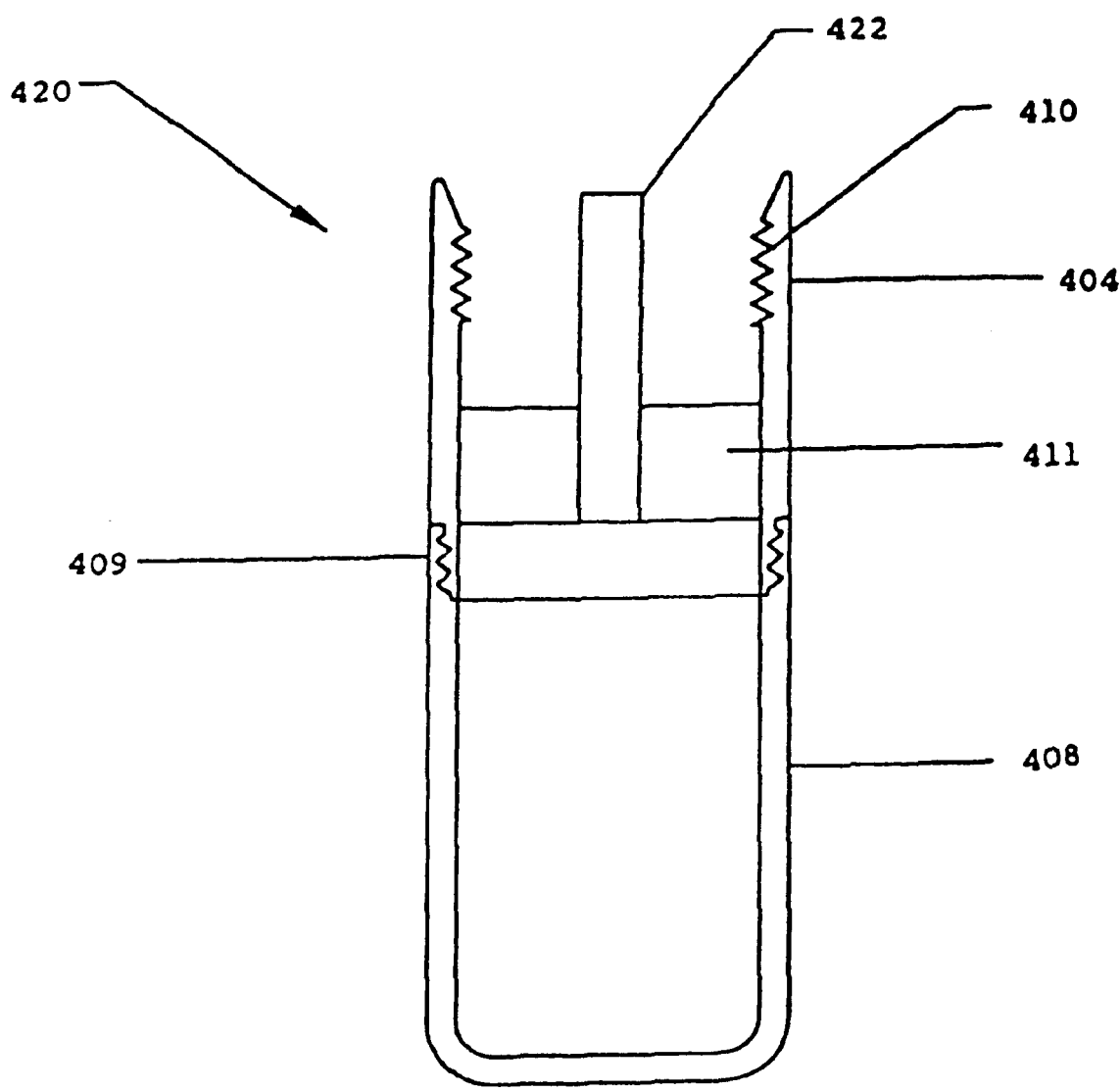
FIG. 14 is a cross-sectional view of a preferred embodiment of the present invention that incorporates a salt storage cap, salt strainer, brine mixing well, and cathode scraper.
Figure 15:
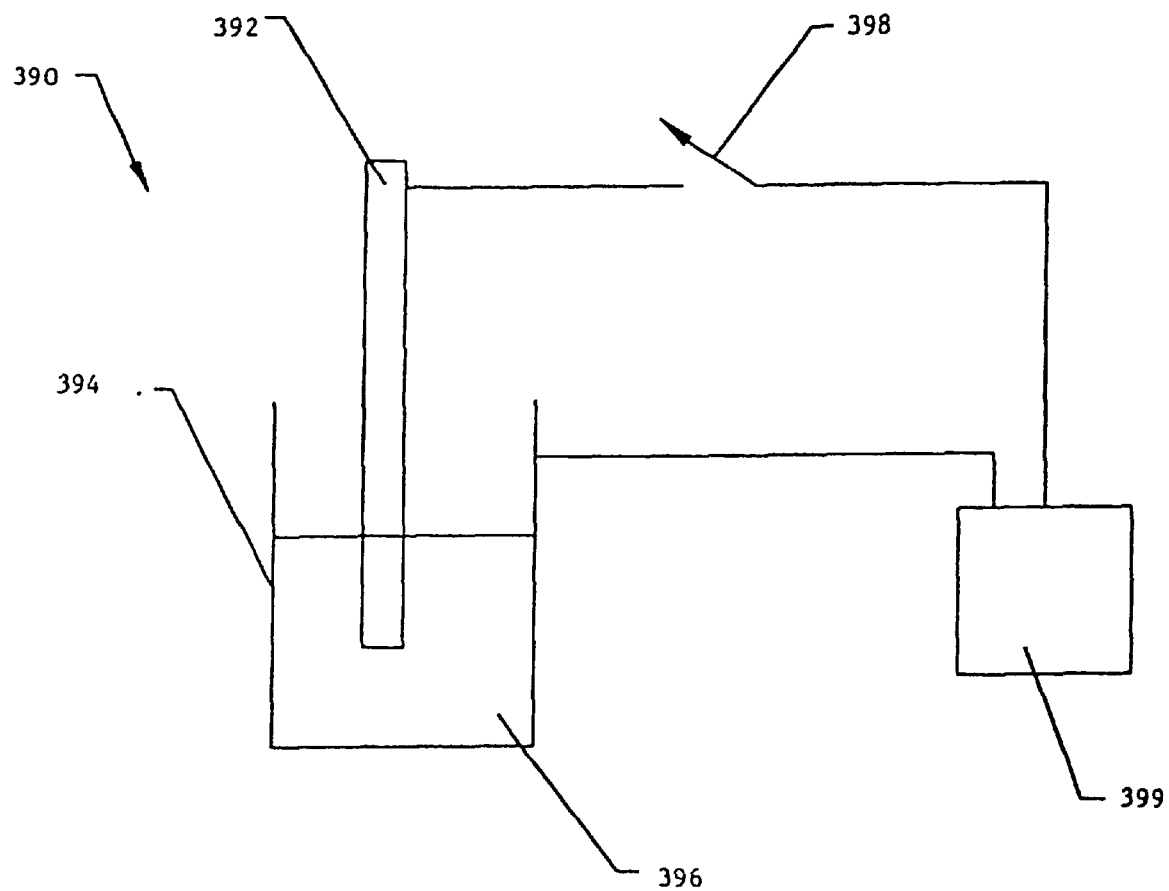
FIG. 15 is a schematic view of an oxidant generator according to the present invention.

In a preferred embodiment of the present invention, spacer 407 is also preferably a seal. Most preferably, cathode 406 is supported by spacer 407, which is sealed to outer housing 401. Further describing a preferred embodiment, brine generator assembly 420 of FIG. 14 comprises brine well 404 together with salt storage container 408 which are sealed together at joint 409 and are removed from "pen" via threaded joint 410. With brine generator assembly 420 removed, water is poured in electrolytic cell 400 (FIG. 13B). Referring again to FIG. 14, brine generator assembly 420 is re-installed on "pen" assembly. "Pen" assembly is shaken to allow water in electrolytic cell 400 to migrate through salt filter 411 so that water mixes with salt in salt storage container 408, thereby dissolving salt and making a salt brine solution. Holding "pen" upright, brine solution settles in electrolytic cell 400. "Pen" assembly is then ready for activation to produce oxidants via electrolysis. Activation occurs via electrical switch contact with integral circuit 405. In a preferred embodiment, switch activation occurs when power housing 412 is rotated relative to outer housing 401 at a rotation point 415. Alternate switch embodiments include other switch configurations known to those versed in electrical switches. Spring retention plate 413 is captivated via locking tabs with anode 401. Torsion spring 414 returns outer housing 401 to resting position relative to power housing 412. With switch closure, in a preferred embodiment, integral circuit 405 releases a prescribed amount of electrical energy from power source 402 to brine solution in electrolytic cell 400. When the prescribed amount of electrical power is applied to brine in electrolytic cell 400, integral circuit 405 preferably actives electrical device for creating an audible, visual, or tactile feedback to notify operator that electrolysis is complete. Alternate embodiments include manual or mechanical means to meter electrical energy to cell 400. Brine generator assembly 420 of FIG. 14 is removed from "pen" and contents of electrolytic cell 400 (FIG. 13B) are poured into container of fluid to be treated, such as a canteen, to provide disinfection. Referring again to FIG. 14, brine well 404 incorporates hollow cathode scraper 422 which serves to scrape contaminants off of cathode element (e.g. cathode 406 in FIG. 13B) when brine generator assembly 420 is installed on tip of "pen".

In a preferred embodiment, the power source 402 comprises an inductive coil device for generating electricity for storage in an energy storage device. In an alternative embodiment of the present invention, the power source 402 comprises at least one battery. The power source 402 is retained in the power housing 412 via a compression spring 417 and an end cap 416. To retain "pen" assembly in users pocket or other storage container, a pocket clip 418 is attached to "pen" assembly.

Water sources with high levels of total dissolved solids (TDS), e.g. sea water, can be detrimental to human health due to the ion imbalance set up in the human system. As discussed in reference to FIG. 13C, TDS can be measured by knowing the specific conductance of the solution. Because the disinfection "pen" apparatus of the present invention has at least one anode and at least one cathode in a cell chamber, the "pen" apparatus can incorporate an electrical circuit within an integral circuit to measure the specific conductance of the water to be treated. Again refer to discussion of FIG. 13C above for exemplary details of a sensor package. Of course, not all of the sensor features shown in FIG. 13C are required, but rather, comprise optional features for enhancing performance of the present invention. For example, select features allow for a means for the operator to know if the water collected for treatment is suitable for drinking. In practice, the operator purges the "pen" cell with the source water to remove any residual brine or oxidant. In a preferred embodiment of the present invention, water is then taken into the cell chamber and the TDS circuit is activated. The TDS circuit activates a display or unique vibrating mode that indicates to the operator the quality of the source water. For water that is nominally below 1000 milligrams per liter (mg/L) TDS, the water is safe to drink. Further processing of the water may be required if the TDS is greater than 1000 mg/L. In a preferred embodiment of this disinfection "pen" apparatus, a circuit is included in integral circuit for measuring the TDS of the source water. Because TDS measurement is dependent on the temperature of the source water, a temperature measuring device is also incorporated in the cell chamber of the "pen".

Figure 16:
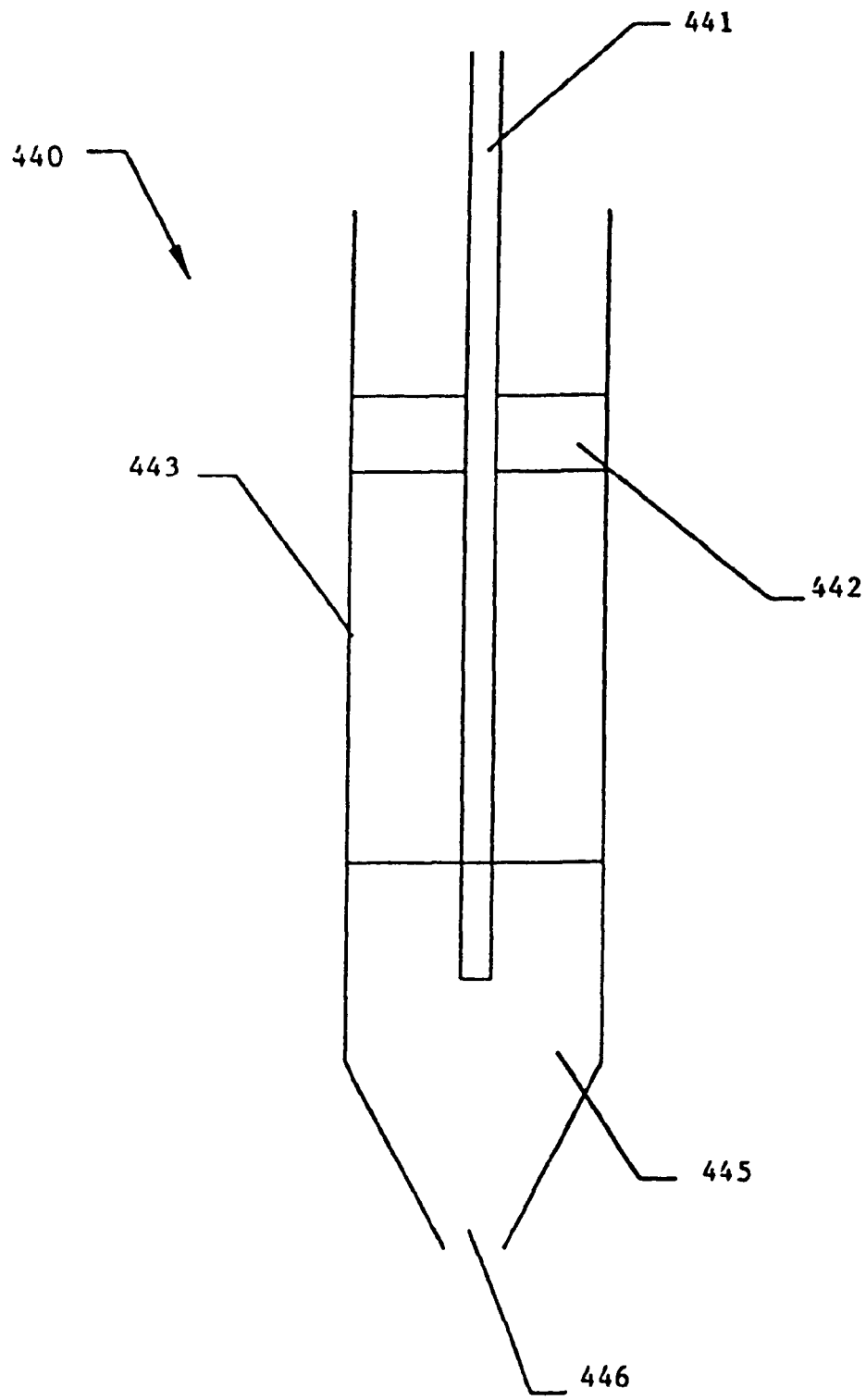
FIG. 16 is a cross-sectional view of another embodiment of the electrolytic cell used in the present invention.

In an alternative embodiment of the present invention, shown at 440 in FIG. 16, a cathode 441 is fixed relative to a seal 442, which together, move relative to an anode 443. Hence, when the cathode assembly comprising the cathode 441 and the seal 442 moves downward, the treated brine is forced out of this syringe-type embodiment 440 through an opening 446. The same mechanism can be used to draw an aliquot of brine from a brine container into a body 445 prior to passing current through the brine.

Figure 17:
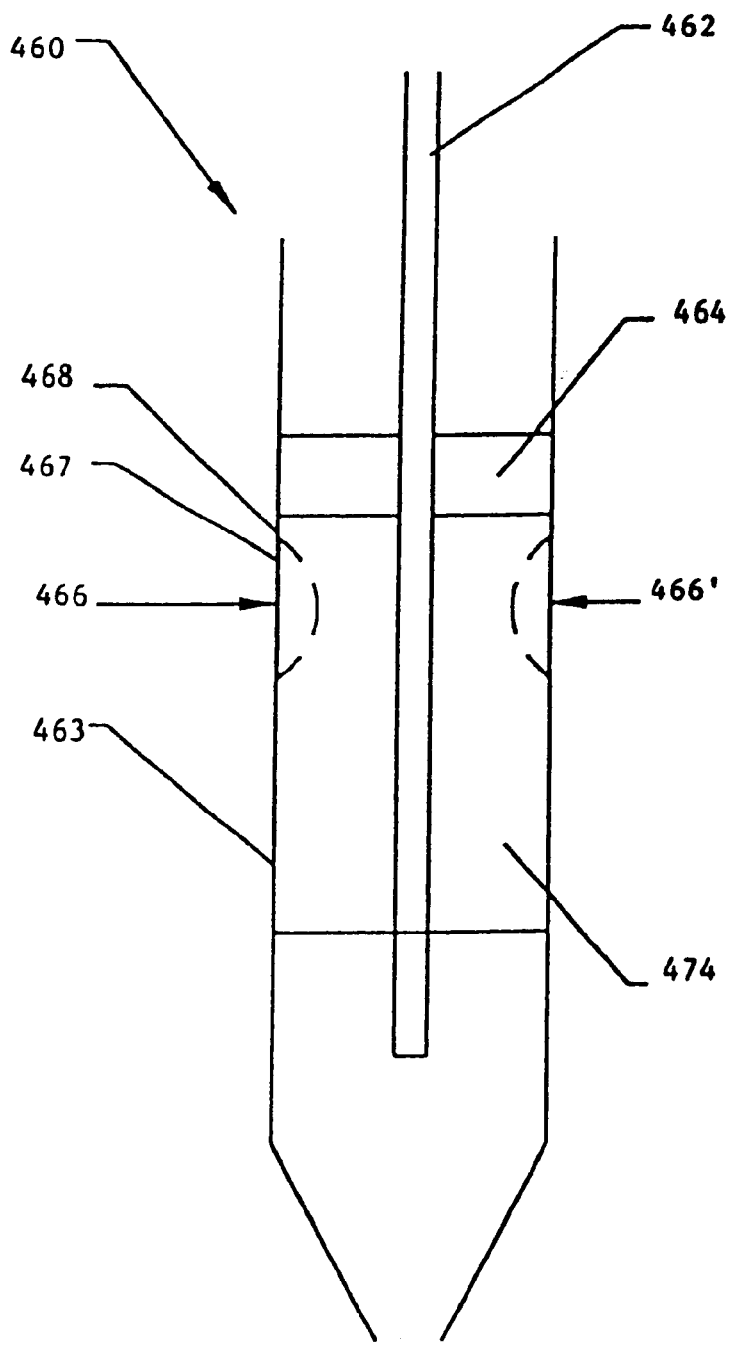
FIG. 17 is a cross-sectional view of another embodiment of the electrolytic cell used in the present invention.

In an alternative embodiment 460 of the present invention, shown in FIG. 17, a cathode 462 and a seal 464 remain fixed relative to an anode 463. A deformable member 467 is disposed in the wall of an anode 463. When pressure is applied to the member 467 in the direction shown 466, 466', the member 467 deforms inward at the location indicated by element 468 thereby forcing the contents of the anode 463 chamber out of the body 474. When the pressure is relieved, air or liquid is sucked back into the body 474.

As noted above, the amount of oxidant that is formed depends primarily on the total current that passes through the brine solution. Hence, the salt concentration and volume of brine treated do not directly determine the sterilization capacity of the treated brine. In a preferred embodiment of the present invention, the power source includes an energy storage device that is charged and then discharged through the brine solution. This arrangement assures reproducible oxidant generation.

Figure 18:
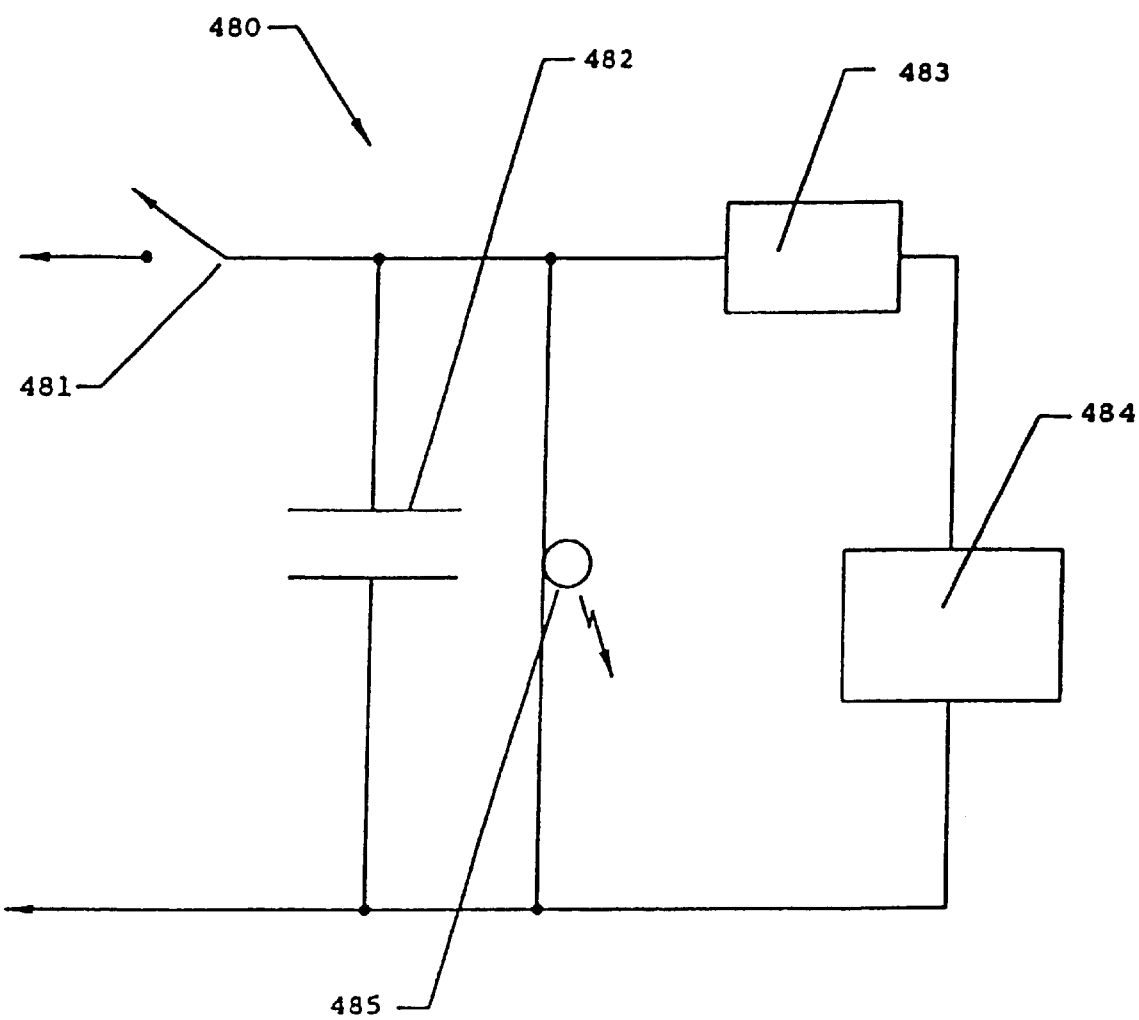
FIG. 18 is a schematic drawing of a power source for use in the present invention.

FIG. 18 is a schematic drawing of a preferred embodiment of a power source 480 according to the present invention. The power source 480 comprises an energy storage device 482, which is pumped to a predetermined voltage by a charge pump 484. A voltage regulator 483 can be utilized to assure that the energy storage device is properly charged. An indicator 485 signals the user when the desired charge has been obtained. At this point, the user closes a switch 481 thereby causing the energy storage device to discharge through the brine solution.

The charge pump 484 may utilize at least one battery. With battery power, a power conditioning circuit may be used to control power to the cell. In a preferred embodiment of the present invention, the power conditioning circuit includes a timing device such that once triggered by the operator, current is delivered to the cell. Once triggered, the circuit delivers energy to the cell until the proper amount of current is delivered. The circuit then activates a visual, audible, or tactile device, or other signaling device that notifies the operator that the oxidant is ready for introduction into the water to be treated. A mechanical device that converts mechanical motion to electricity is preferred. For example, the charge pump 484 may be constructed from a permanent magnet that is caused to pass back in forth through a coil when the user shakes the pen back and forth. Similarly, a piezoelectric based actuator may be utilized to pump charge when a piezoelectric member is deformed by mechanical forces applied by the user. In another embodiment of the present invention, the power source for the disinfection "pen" can be an external source such as batteries, solar panels, manually driven electric generator, or any other means of delivering electrical power to the apparatus.

Figure 19:
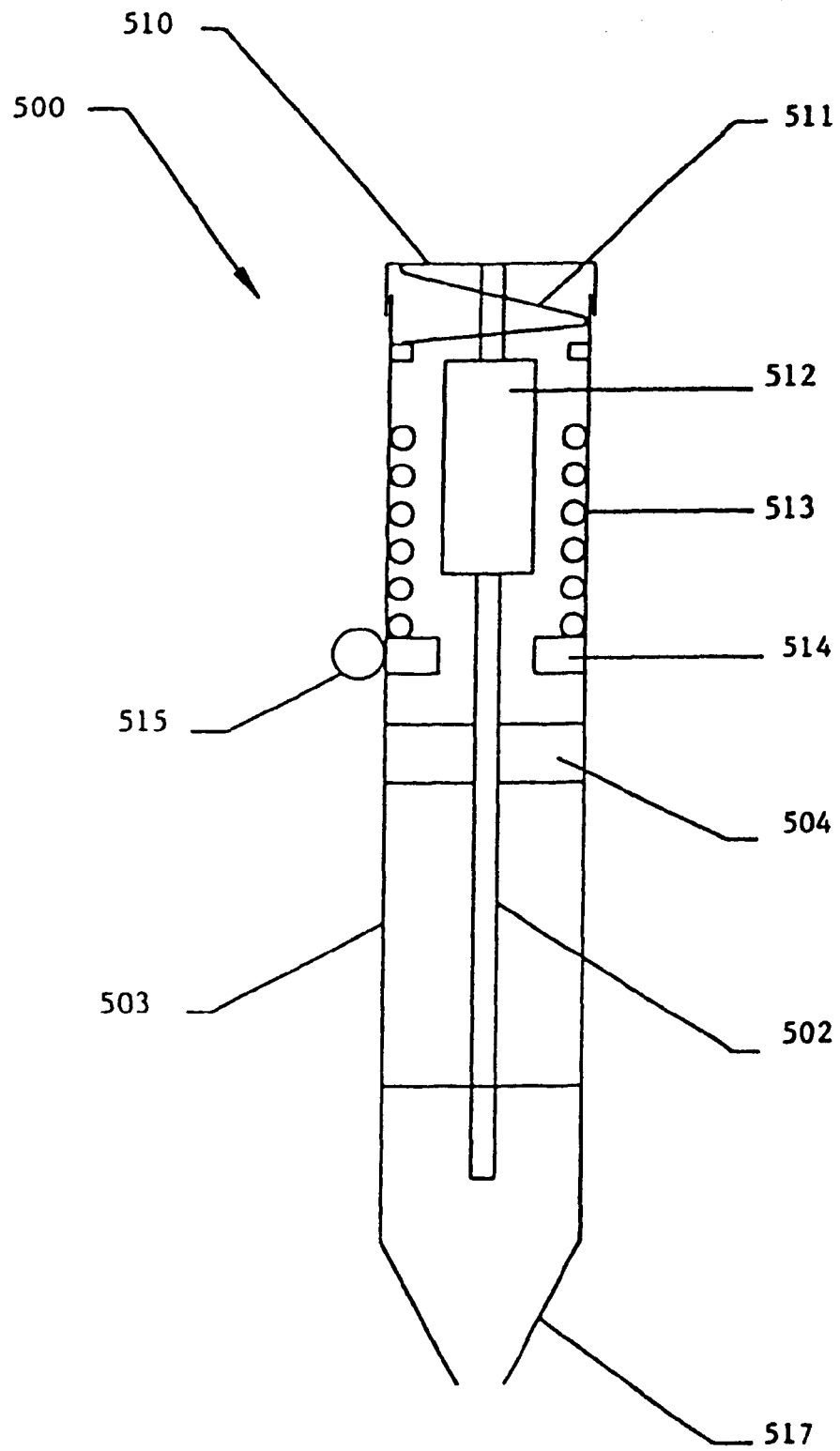
FIG. 19 is a cross-sectional view of an alternative embodiment of the present invention that utilizes a mechanical system for converting mechanical energy to charge an energy storage device shown in FIG. 18.

FIG. 19 is a cross-sectional view of an embodiment of the present invention that utilizes a mechanical system for converting mechanical energy to charge the energy storage device. An oxidant generator 500 comprises a cathode 502, which moves with a seal 504 within the body of the device. An upper portion of the cathode 502 is attached to a moveable cap 510, which slides relative to an anode 503 when pressure is applied to the cap 510. A return spring 511 causes the cap 510 to move in the opposite direction when pressure is released. A magnet 512 is located on the cathode 502 and moves therewith. Alternately, the magnet 512 may move relative to the cathode 502 via physical movement of the pen. The motion of the cap 510 causes the magnet 512 to move within the coil 513 thereby generating a flow of electricity for charging a circuit in an electronics assembly 514. When the energy storage device is fully charged, an indicator 515 activates. A salt solution is then drawn into the body of the oxidant generator by pressing on the cap 510, immersing an end 517 in the brine, and then releasing the cap 510. A switch on the generator 500 discharges the stored energy through the brine. The oxidants generated by the discharge of the electrical energy are then expelled into the container of drinking water by again depressing cap 510. Of course, other electromechanical devices for generating energy are also within the scope of the present invention, as well as, devices that transmit electro-magnetic energy to the inventive disinfection apparatus. Regarding electromechanical devices, such as that described herein in FIG. 19, at least one coil moving relative to at least one fixed magnet essentially accomplishes the same end result and is therefore within the scope of the present invention.

The simplest method for generating brine involves dissolving conventional salt or salt tablets in a small amount of water. As noted above, the individuals who are most likely to use the present invention typically carry salt to replace salt lost through perspiration. Salt can be placed in a suitable container with an amount of water. After the salt dissolves, an aliquot of the salt solution is then poured or drawn into the electrolytic cell described above. The remaining salt solution may be ingested by the user to replace salt lost by perspiration. If this procedure is followed, the present invention does not require the user to carry any additional salt.

The present invention may also include a salt reservoir. In such embodiments, a reservoir having solid salt and brine compartment therein is provided as part of the oxidant generator. As noted above, the amount of oxidant generated is independent of the salt concentration over a wide range of concentrations. Accordingly, the salt reservoir only needs to assure that sufficient salt is introduced into the water drawn into the generator to put the salt concentration in the useable range.

Figure 20:
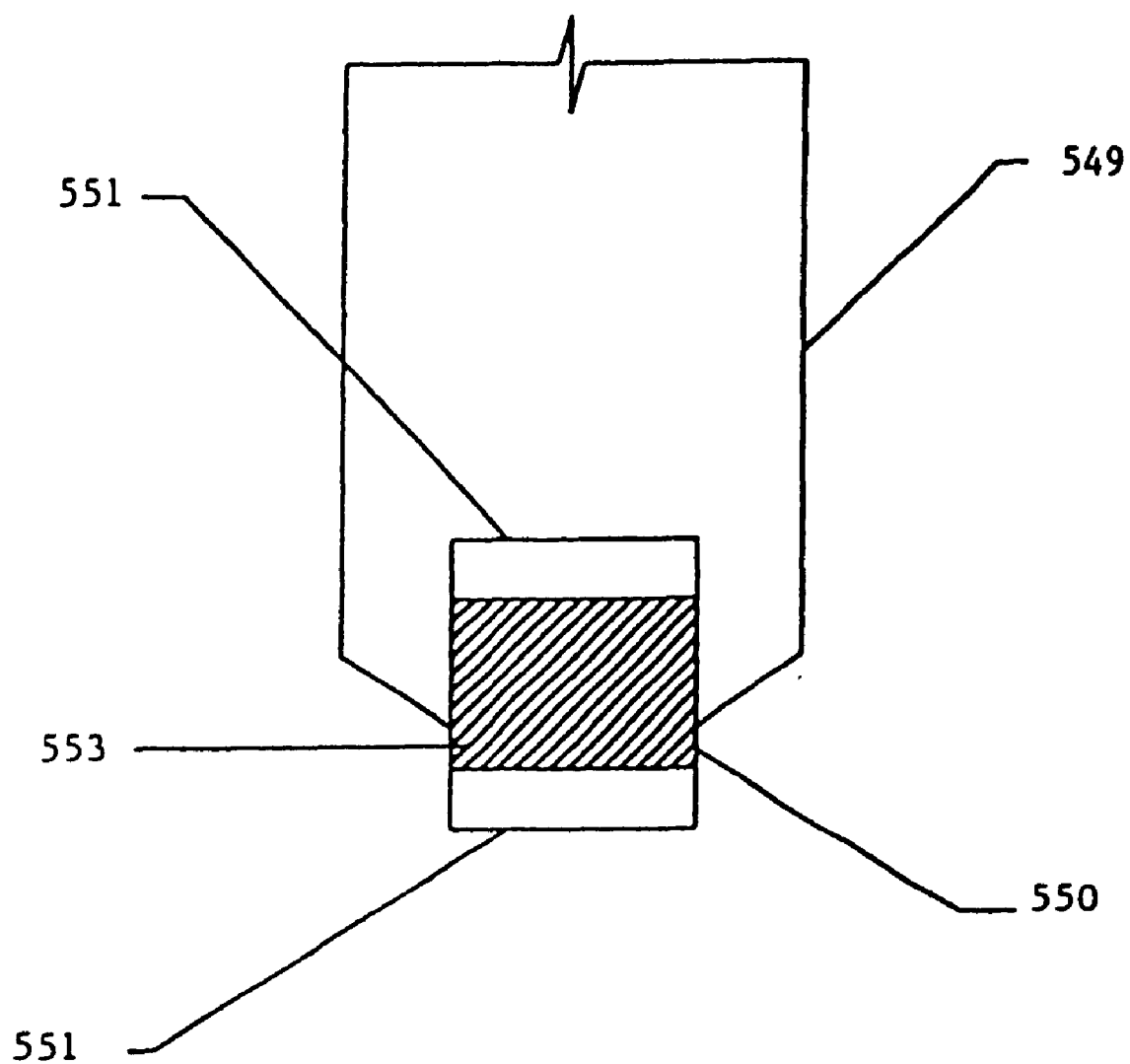
FIG. 20 is a cross-sectional view of an alternative embodiment of the present invention that utilizes a salt reservoir to generate the brine solution.

FIG. 20 illustrates an embodiment of the present invention, which includes a salt reservoir 549 which attaches at the end of cell chamber 553. The reservoir 549 has porous ends 551, which allow water to pass through the reservoir 549 into the cell body. The porous ends retain salt 553. A portion of the salt dissolves when water is drawn into the chamber. After the charge is passed through the salt solution, the oxidants are expelled through the reservoir into the drinking water. When the salt in reservoir 549 is exhausted, the reservoir can be replaced by another disposable reservoir, or the reservoir can be refilled by the operator.

Figure 21:
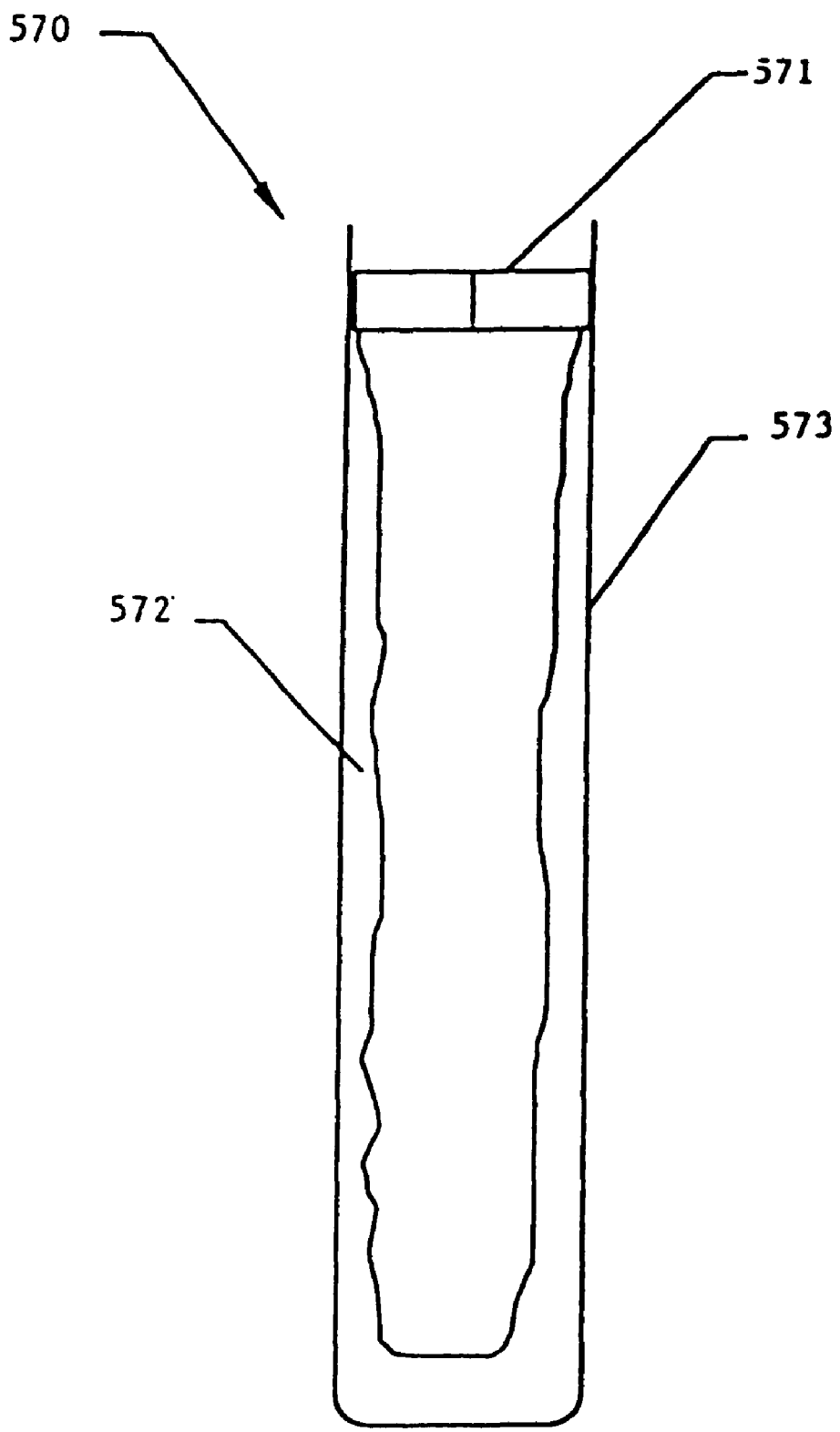
FIG. 21 is a cross-sectional view of an embodiment of the present invention that incorporates a brine capsule that is housed in the cap of the disinfection pen apparatus.
Figure 22:
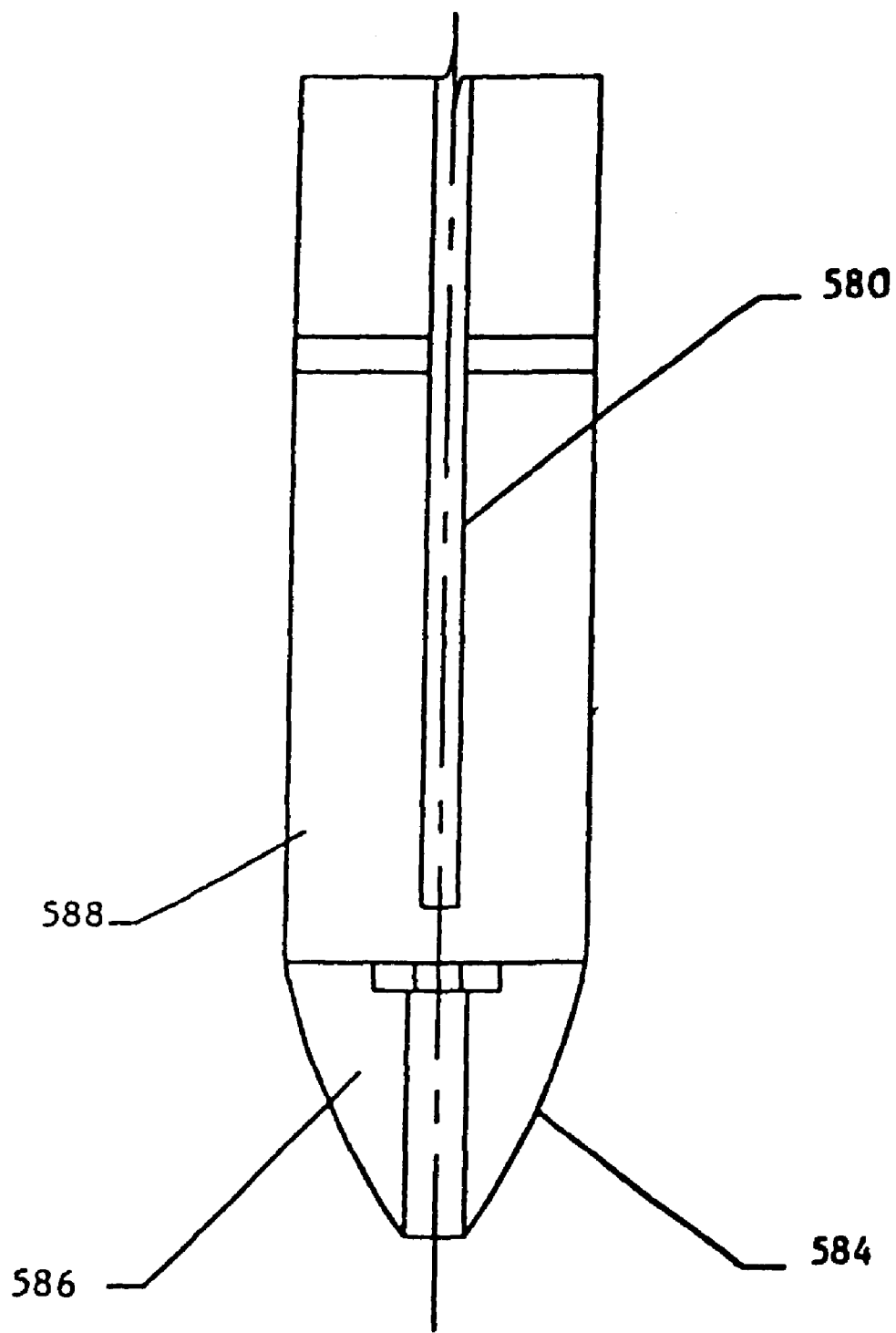
FIG. 22 is a cross-sectional view of an alternative embodiment of the present invention that shows a scraper mechanism in the tip of the disinfection pen to clean contaminants off of the cathode.

FIG. 21 shows an alternative embodiment at 570 which is otherwise attached to the body of the pen (e.g. see the anode 401 in FIG. 13B) in the normal storage configuration. A cap 573 may house a brine storage container 572 with a self-sealing cap 571. The self-sealing cap 571 can be an elastomer device, or mechanical check valve device or other device commonly known by those versed in the design of sealing mechanisms. The container 572 may be rigid or flexible. If rigid, the brine container may also be the cap 573.

To load the cell chamber 400 (FIG. 13B) the "pen" tip enters through self sealing cap 571 and brine is drawn in the "pen" by any number of mechanisms described herein, equivalents thereof and/or known in the art of injection mechanisms. When the "pen" is withdrawn, the cap 571 re-seals. The brine container 572, or 573 (depending on configuration) can be a replaceable element to the disinfection "pen" apparatus.

The above-described embodiments of the present invention refer to an arrangement in which the cathode is a solid or tubular electrode within an outer body that acts as the anode and reaction chamber. However, it is obvious to those skilled in the art and from the preceding discussion that the cathode and anode can be reversed. Likewise, there may be multiple anodes and/or cathodes utilized in accordance with the present invention. Electrodes, i.e., cathodes and/or anodes, optionally comprise plate, pin, and/or other configurations known to one of ordinary skill in the electrical arts.

The above-described embodiments of the present invention optionally utilize a circuit to fix, signal, measure and/or control the amount of charge that passes through the salt solution. An alternative embodiment requires the operator to press the discharge switch for a certain length of time rather than rely on a circuit. However, it is obvious to those skilled in the art and from the preceding discussion that any charge indicating and/or integrating device may be used to determine that the minimum charge has passed through the salt solution. Alternatively, another aspect of the process is used to signal and/or determine when oxidant generation should be terminated, for example, but not limited to, residual oxidant and/or pressure generated.

Embodiments shown in the Figures generally show a reaction chamber comprising a cylindrical outer body with a concentric cathode electrode placed therein. However, it is known to those skilled in the art and from the preceding discussion that any chamber arrangement, which guarantees that the charge passes to the salt solution, may be utilized. For example, plate, pin, surface and/or other electrodes are within the scope of the present invention.

In another embodiment of the present invention, the cell chamber comprises at least one plate and preferably two plates wherein one plate serves as an anode, and the other as a cathode. During generation of the oxidant, ions generated are selectively attracted to either the anode or cathode plates. This process is described in U.S. Pat. No. 4,761,208 to Gram, et al., entitled Electrolytic Method and Cell for Sterilizing Water, the teachings of which are incorporated herein by reference. By entering a flow dividing mechanism in the pen cell chamber between the anode and cathode plates, the anode and cathode product streams can be separated physically. By retaining the cathode stream from entering the water to be treated, the anode product only is used for disinfection. In a preferred embodiment, the anode product only has a lower pH concentration and stronger concentration of oxidants than that would provide enhanced disinfection effectiveness to the treated water source.

Because hardness, such as, but not limited to, calcium carbonate, is a common ingredient in most water sources, hardness is likely to be present in the water solution that is used to make the brine feed stock for the cell. During electrolysis, hardness comprising calcium carbonate is typically formed on the cathode of the cell due to the high pH conditions present at the cathode surface. Calcium carbonate buildup on the cathode surface coats the cathode and causes the electrolysis process to be ineffective in the production of oxidants. In larger disinfection systems, calcium is removed from the cell water feed stream with an ion exchange water softening system. This would be impractical for the size application of the present invention. In a preferred embodiment of the present invention, a "pen" tip 584, shown in FIG. 22 comprises an annular scraper mechanism 586 that wipes calcium carbonate off of the walls of a cathode shaft 580 as the syringe-type device is compressed to draw brine into a cell compartment 588.

Figure 23:
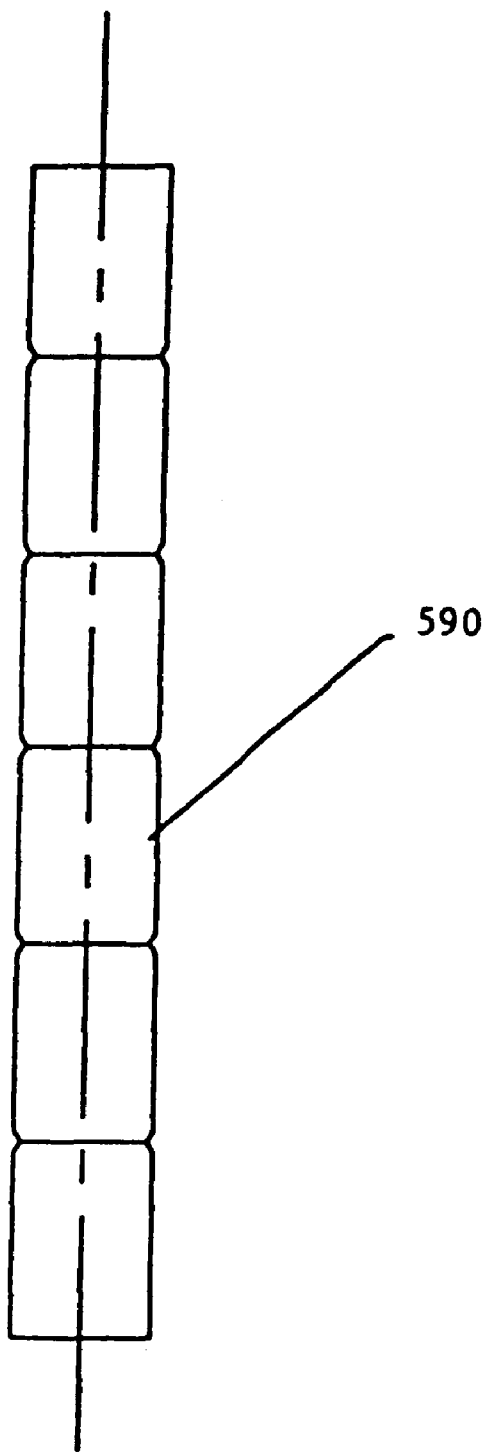
FIG. 23 is a cross-sectional view of an alternative embodiment of the present invention that shows the central cathode element of the apparatus with grooved segments.

In an alternative embodiment of the present invention, in order to eliminate calcium carbonate and/or other fouling, a cathode shaft 590, such as shown in FIG. 23, comprises a multi-grooved shaft that is designed to have break-away segments. As each segment is "snapped off" by the operator, the shaft can be extended out of the elements of the syringe to expose new area of the cathode that has not been contaminated with calcium carbonate.

Figure 24:
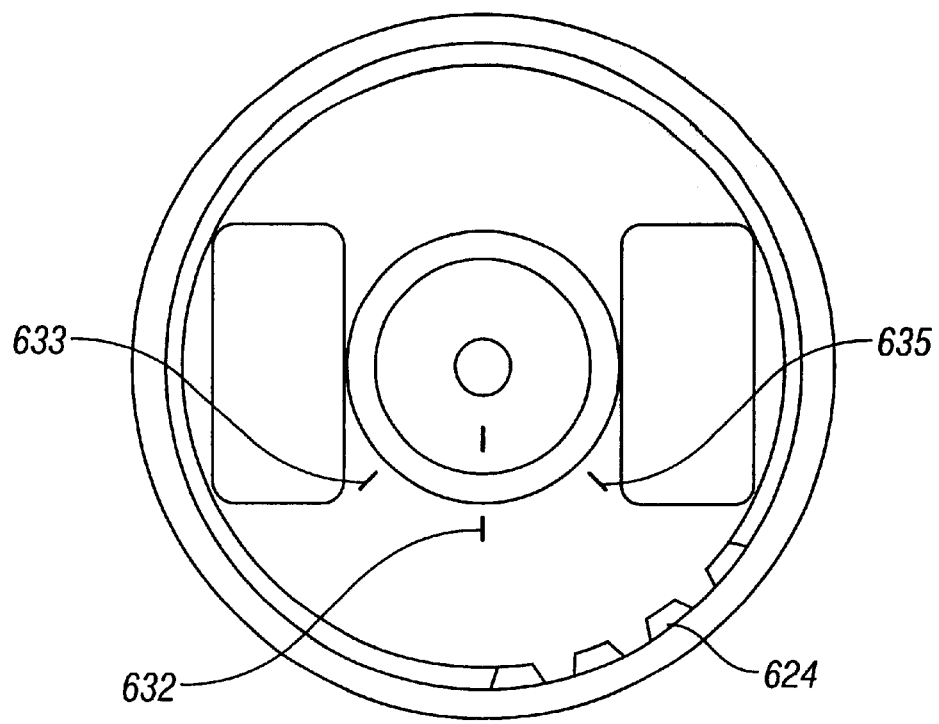
FIG. 24 is a cross-sectional view of an alternative embodiment of the present invention that shows the disinfection apparatus in the form of a cap.
Figure 24:
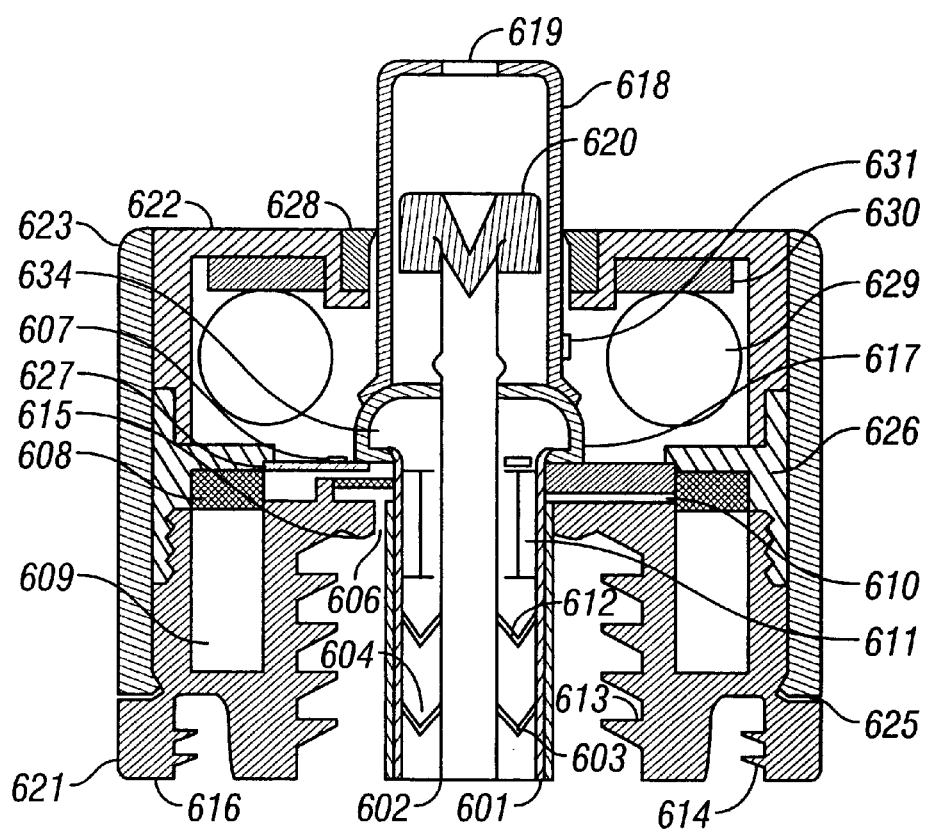

In an alternative embodiment of the disinfection apparatus of the present invention, shown in FIG. 24, the apparatus comprises a "cap" that fits on a container, water bottle, canteen, or other sealing device for a water container. Alternatively, the apparatus does not perform a typical cap function, but rather mounts on or resides within the container.

As shown in the cap embodiment of FIG. 24, an anode 601 comprises a tube, preferably comprising titanium, coated with an oxide material as described previously. A cathode 602 comprises an uncoated tube preferably constructed of titanium. Of course, alternative embodiments optionally comprise a plurality of anodes and/or a plurality of cathodes. A cell 604 comprising the annular space between the anode 601 and the cathode 602 is further bounded by one way seals 603, 612 which act as check valves to contain brine that is subsequently electrolyzed and converted to oxidant.

In this disinfection "cap" embodiment, shown in FIG. 24, the "cap" is attached to a standard military canteen via threads 613, to a standard bottle (e.g., a NALGENE® bottle—Nalge Corporation, Inc., Rochester N.Y.) via threads 614, or to some other water container closure utilizing threads or other closure fixing device, such as, but not limited to, snap closures and the like. With the "cap" installed on the appropriate water container, water is driven through the hydraulic circuit via a manually activated pump comprising an elastomer diaphragm 617 and a pump plunger 618. On the compression stroke, the enclosed volume 634 within the diaphragm 617 is reduced in size thereby forcing the contents of the chamber 634 to exit via an annular spacer 611 and then through the check valve/one-way seal 612 and subsequently through the other check valve/one-way seal 603. On the return, or suction, stroke of the pump plunger 618, fluid is drawn in to the chamber 634 via a port 610. The action of the check valve/one-way seal 612 precludes fluid from being drawn in to the chamber 634 from the annular cell 604. Due to suction in the hydraulic circuit, water is drawn from the water storage container through a suction port 606, through another check valve 607, through an annular filter 608 and in to a brine (salt solution) compartment 609. The brine compartment 609 houses, for example, common sodium chloride salt. As fluid enters the brine compartment 609, it mixes with the salt and dissolves to make a sodium chloride brine. As the fluid progresses through the annular brine compartment 609, it is filtered by the annular brine filter 608 and exits annular the brine compartment 609 at the exit port 610. Brine exits the exit port 610 into the annular spacer 611, down through the annular check valve/one-way seal 612 and into the annular cell chamber 604.

In an alternative embodiment, the cap embodiment comprises a single set of threads rather than a plurality of threads. In such an alternative embodiment, for example, adapters are provided for adapting the cap to containers using different cap closures, for example, but not limited to, different threads and/or snap closures. Of course, such adapters are not limited to threaded adapters for fitting onto the cap. In a preferred embodiment of this alternative embodiment, a single set of threads allows for a smaller cap.

Referring again to FIG. 24, the pump plunger 618 also acts as a mechanism to activate a switch 631 that allows charge to flow to the annular electrolytic cell 604. In an alternative embodiment, the electrical switch 631 is separate from the pump plunger 618. The electrical switch 631 has multiple activation positions for different volumes of water treated. For example, a one-quart container is activated at one switch position 633 and is activated for a two-quart container at another switch position 635. The system is de-activated at an "off/lock" position 632. Larger quantities of water to be treated require proportionally more energy applied to the annular cell 604. In the preferred embodiment of this alternative configuration, electrical power is supplied by at least one battery 629 through a power regulating circuit 630.

For military applications, access to the contents of the water container is optionally achieved via a nuclear/biological/chemical (NBC) straw that minimizes the opportunity for contamination of the contents of the container. Certain applications in the outdoor enthusiast market comprises a straw and reap benefits therefrom. According to the alternative cap embodiment of the present invention, an elastomer seal 620 provides a seal with the cathode 602. The hollow center 619 of the plunger and the cathode 602 provides a passage for a straw to the contents inside the water storage container. Further, the contents of the water storage container are sealed with the disinfection "cap" at a seal 615 in the case of a standard military canteen, and at a seal 616 in the case of an industry standard NALGENE® water container. Other sealing features common to the industry will be evident to those versed in the art.

Routine maintenance of this particular alternative cap embodiment optionally comprises replacement of at least one battery and salt. Of course, alternative cap embodiments are not limited to at least one battery as an energy source, such embodiments optionally comprise at least one energy source, such as, but not limited to, solar energy, mechanical energy, fuel energy, and the like. Referring to FIG. 24, batteries 629 (optionally comprising at least one battery) and salt in brine compartment 609 are accessible via removal of a housing 622 at threads 626. The brine compartment 609 is sealed with a thread housing 621 at a seal 627. Further, electronics 630 and the batteries 629 are sealed from the environment at the plunger 618 via a seal 628. Other sealing techniques for alternative configurations of the present invention are within the scope of the present invention and known to those versed in art of system packaging design.

Removal of the disinfection "cap" from the water storage container is achieved via unscrewing the complete assembly from the container. To preclude the housing 622 from rotating with respect to the thread housing 621 at the threads 626, a slip ring 623 interlocks the housing 622 with the thread housing 621 via ribbed grooves 624. The slip ring 623 is retained in the thread housing 621 via a detent groove 625. To access the batteries 629 and the brine compartment 609, the slip ring 623 is lifted out of the detent groove 625. With the slip ring 623 raised, the housing 622 is rotated at the threads 626 to disengage the housing 622 from the thread housing 621.

Of course, the cap embodiment is optionally configured to sizes smaller or larger depending on a variety of features, such as, number of thread sets, or other attachment mechanisms. For example, the inventive cap apparatus is optionally configured with a single set of threads to which a thread adapter fits. The thread adapter optionally comprises a non-thread side for attachment to a snap closure bottle or even to a pipe or tube. Likewise, the cap optionally comprises a closure mechanism other than threads to which an adapter fits, or the adapter optionally fits to a part of the cap other than the closure mechanism.

Figure 25:
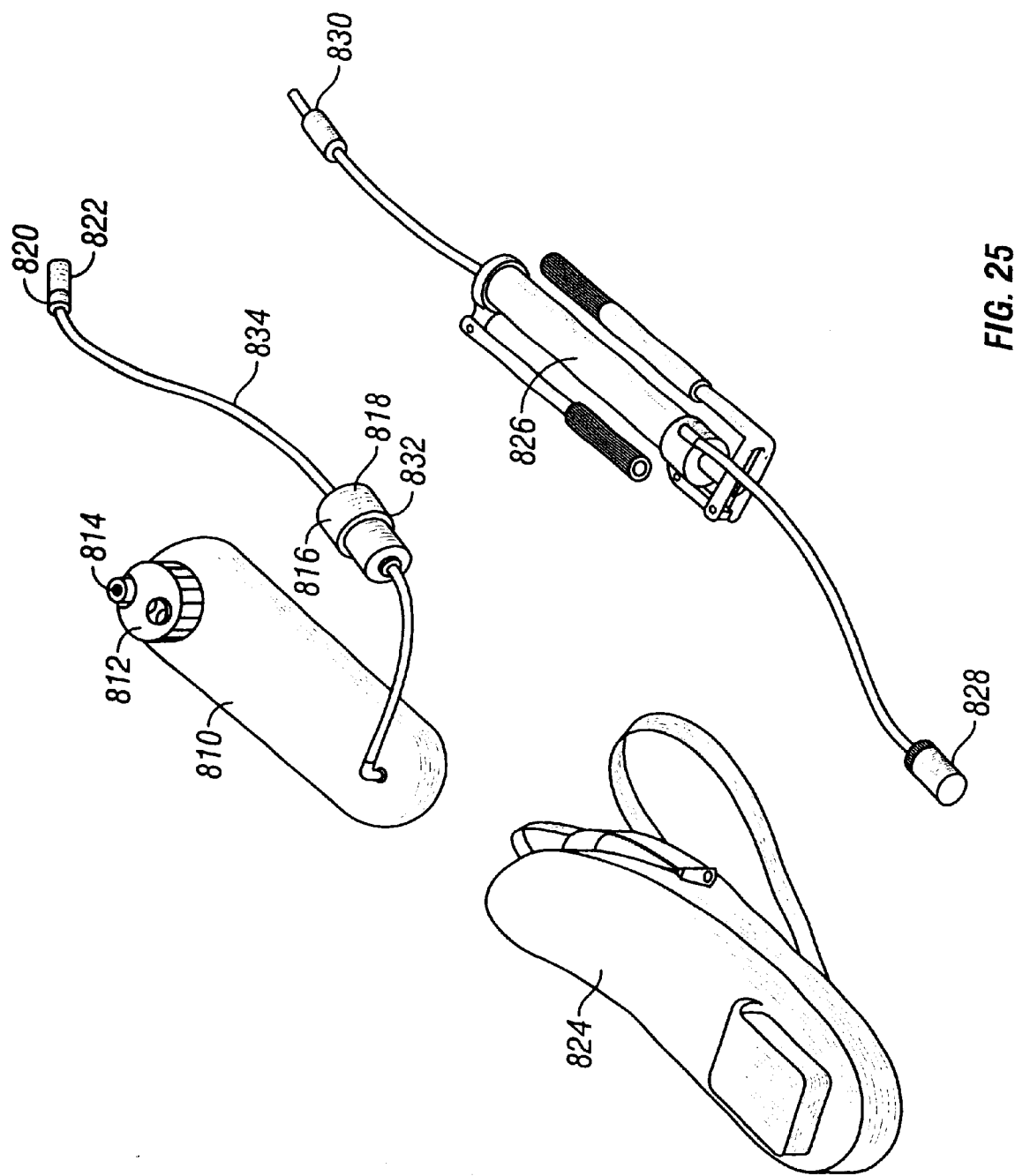
FIG. 25 is a diagram of a hydration bag embodiment of the present invention.

The present invention also comprises a comprehensive water treatment system to remove all sources of contaminants, remove ions from the water if the source water is brackish or seawater, and provide disinfection to inactivate all water borne pathogens, or microorganisms. The hydration system described herein and shown in FIG. 25 is, in one embodiment, intended for an individual user. However, the system is optionally configured for small groups of people and/or animals. In one embodiment, during operation, the user removes the disinfection cap 812 from the hydration bag 810. The hydration bag 810 is filled with raw water, or alternately dipped in a water source, until the bag is substantially full of water. The disinfection cap is activated to generate an oxidant disinfection solution. The hydration bag 810 is optionally shaken or mixed and then allowed to stand for 10 minutes for the disinfectant solution to inactive any microorganisms. The user then sucks water from the bite valve 822 which transfers water from the hydration bag 810 via roughing filter 816 and primary filter 818. In the event that the source water is high in total dissolved solids (TDS), the water is first passed through ion removal system integral to pump 826. From pump 826 water is transferred via nozzle 830 which is connected to disinfection cap 812 to fill port and check valve 814.

As shown in FIG. 25, one component of the system is the hydration bag 810. Hydration bags and/or personal hydration systems are known to one of ordinary skill in the art and commercially available. Personal hydration systems typically have a bag reservoir or another type of reservoir, which may be resilient or rigid. Bag and non-bag reservoir systems known in the art are within the scope of the present invention. Most of these hydration devices provide a means for drinking fluid stored in the device. For example, a long flexible hose 834 is optionally connected to the reservoir through an exit port at one end and terminates in a mouthpiece at the other end. The hose is typically long enough to allow the mouthpiece to be carried in the user's mouth to enable the user to draw water from the reservoir at will. Examples of hydration devices are disclosed in U.S. Pat. No. 5,727,714, entitled "Personal hydration device with improved exit valve," to Fawcett, issued Mar. 17, 1998; U.S. Pat. No. 5,060,833, entitled "Camel back," to Edison et al., issued Oct. 29, 1991; and U.S. Pat. No. 5,085,349, entitled "Resilient valve and dispensing system for bicyclists," to Fawcett, issued Feb. 4, 1992, the disclosures of the patents are hereby incorporated by reference.

One commercially available hydration bag, sold by Mountain Safety Research, Inc. (Seattle, Wash.), see, e.g., U.S. Pat. No. D352,359, comprises a durable, abrasion resistant 500 denier CORDURA® nylon (E. I. du Pont de Nemours and Co., Wilmington, Del.) outer layer bonded to a food-grade polyurethane inner layer. This bag is collapsible, has multiple grommets laced with webbing for easy hanging and carrying and a three-way cap for ease of drinking, filling and pouring. This bag has a dry weight of 5.4 ounces (153 grams) and a capacity of four liters.

Commercial hydration systems optionally comprise a variety of accessories, such as, but not limited to, bite valves, spigot valves, shower kits, and cases. Devices comprising radiation reflective and/or radiation absorbing surfaces and/or evaporative cooling surfaces are also known in the art and within the scope of the present invention.

Many of the commercially available bags have thermal seams around the edges. Outdoor campers and military personnel indicate that most hydration bags are subject to biofilm contamination that occurs primarily at the seams. Some hydration systems comprise antimicrobial agents to suppress growth of bacteria, algae, fungus, mold, and mildew. One commercially available agent, sold as HEALTHSHIELD™ (HealthShield Technologies, L.L.C., West Hartford, Conn.), comprises silver and a naturally occurring inorganic ceramic that permits a continuous, controlled release of ionic silver over an extended period of time. Such agents are optionally incorporated into materials such as, but not limited to, fibers, fabrics, molded plastics, plastic films, and coatings for metals. Of course other antimicrobial agents, for example, known in the art of marine paints or medicine, are useful in combination with the present invention. For example, but not limited to, a variety of metals have effective antimicrobial effect when in contact with water.

According to one embodiment of the present invention, HEALTHSHIELD™ is added to raw plastic in the injection molding process, which is incorporated in, for example, the hydration bag 810 (shown in FIG. 25) to mitigate the formation of biofilm. In addition, the oxidant produced in the disinfection cap is also available to eliminate biofilm. In one embodiment, the hydration bag 810 optionally comprises a blow-molded plastic that comprises, for example, ethyl vinyl acetate (AVE). The blow-molded configuration eliminates seams (as described above) which are a common biofilm initiation site. AVE is currently used in a new class of military canteen. Canteens made of AVE comprise characteristics such as being pliable, collapsible, resistant to bursting, and are resistant to nuclear, biological, and chemical (NBC) contaminants. Existing technology bags that are commercially available do not have as favorable NBC characteristics. In one embodiment, the thickness of the blow-molded bag is approximately 0.030 inches thick to provide sufficient time before NBC agents can penetrate the AVE material and contaminate the water in the container. Of course, other barriers are optionally integrated into the container material to slow penetration and/or a film and/or cover are optionally available. As mentioned, another positive feature of the blow-molded bag is the absence of seams that can be sites for initiation of biofilm growth. Yet another positive feature of the blow-molded bag is the ability of the bag to collapse when the user is sucking on the hydration bag discharge nozzle 820 and bite valve 822. Many hard water storage devices (such as commercially available field canteens) require a user to blow into the container in order to force water out.

In one embodiment, as shown in FIG. 25, to provide disinfection for the contents of the hydration bag, a disinfection cap 812 is incorporated as the cap of the hydration bag. The disinfection cap 812 comprises a sealing cover for the hydration bag and a mixed-oxidant disinfection system, for example, as described in other embodiments of the present invention. In one embodiment, the disinfection cap 812 utilizes common salt and commercially available batteries to produce an oxidant solution, preferably a mixed-oxidant solution. The oxidant solution has been demonstrated to inactivate highly resistant microorganisms such as *Giardia lamblia* and *Cryptosporidium parvum* oocysts. Studies show that these microorganisms are not affected by any appreciable extent by exposure to chlorine, iodine, bromine, or other conventional disinfection technologies.

As shown in FIG. 25, the disinfection cap comprises a check valve 814 in the drinking water spout. The check valve 814 optionally serves as sealing means to allow the introduction/removal of water when soldiers operate in an NBC environment. Because the hydration bag 810 (as shown) is collapsible, the operator does not have to overcome a vacuum as required with a typically rigid container.

In operation, the disinfection cap 812 is removed from the hydration bag 810 and the bag is, for example, but not limited to, manually filled with raw water from any source with total dissolved solids of less than, for example, approximately 1000 parts per million (ppm). The disinfection cap 812 is replaced on the hydration bag 810 and the production of mixed-oxidants is initiated in the disinfection cap 812. Water is then optionally mixed (shaken) and held in the bag for ten minutes to allow time for the mixed-oxidants to inactive microorganisms in the raw water. The water is then preferably sampled and analyzed for chlorine residual using chlorine test strips or other commonly known methods, which are optionally integrated into the cap or other part of the inventive system. To access water in the hydration bag 810 the operator bites the bite valve 822 and sucks water from the hydration bag 810 through roughing filter 816 and primary filter 818. Bite valve 822 plugs in to valve 820 which is, for example, compatible with the U.S. Military standard NBC valve. Roughing filter 816 is optionally housed in a plastic housing 832. In one embodiment, roughing filter 816 comprises a porous plastic molded material that seals to plastic housing 832 as well as primary filter 818. Primary filter 818 optionally comprises a carbon-based element that acts to remove particles larger than 1 micron. Because the construction of the primary filter 818 optionally comprises activated carbon, organic contaminants such as pesticides, insecticides, and other organic contaminants are removed from the water. In addition, primary filter 818 also optionally removes residual chlorine that remains in the hydration bag 810. In one embodiment, the complete assembly is optionally housed in an insulated bag 824 to help prevent freezing of the water in cold weather environments. The insulated bag 824 is, for example, carried over the shoulders of the user utilizing straps that are integral to the insulated bag 824. Of course, other methods of carriage and attachments to a body, vehicle, animal, etc., are within the scope of the present invention.

In situations where the untreated water source is high in total dissolved solids (TDS) such as brackish or seawater, a membrane based ion removal technology (i.e. reverse osmosis or other related technology) is optionally utilized with the appropriate fluid transfer pump 826 to provide water to the hydration bag 810. As shown in FIG. 25, the fluid transfer pump 826 is suitable for drawing water from a high TDS raw water source via a replaceable suction filter 828 comprising a porous plastic material. Water with TDS removed to an appropriate level for human consumption (i.e., less than approximately 1000 parts per million) is transferred out of the pump to discharge port 830. For U.S. military applications, discharge port 830 is optionally compatible with the standard NBC check valve, which is integral to standard issue U.S. military one-liter canteens. Likewise, check valve 814, which is housed in the drinking nozzle of disinfection cap 812 is optionally compatible with the pump discharge nozzle 830. To facilitate compatibility throughout the system, bite valve 822 is also optionally compatible with hydration bag discharge nozzle 820, which is optionally equivalent in configuration to the pump discharge nozzle 830. Pump discharge nozzle 830 and the hydration bag discharge nozzle 822 are likewise optionally compatible with the check valve fittings that are integral to the U.S. military NBC suit worn by soldiers in a hostile chemical or biological environment.

Figure 26:
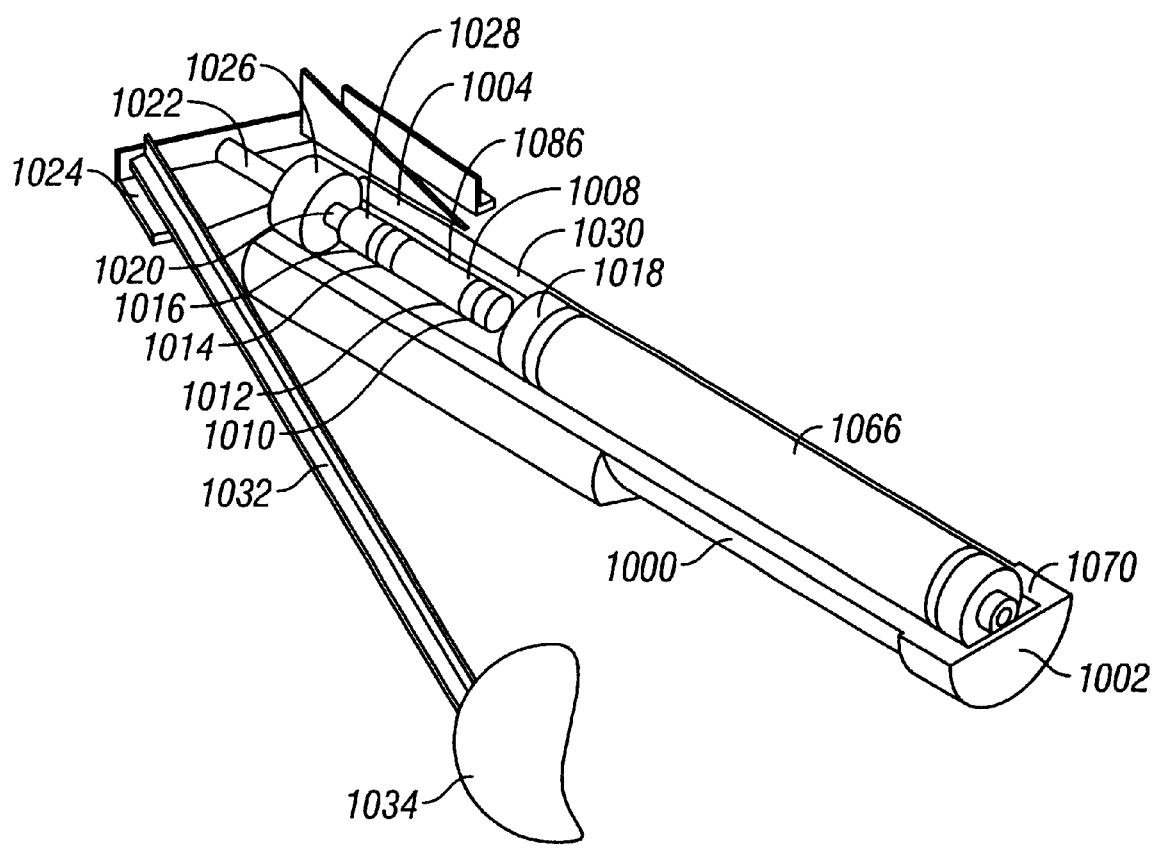
FIG. 26 is a diagram of a pump embodiment of the present invention.

A more detailed description of a pump follows with reference to the embodiment shown in FIG. 26. This particular embodiment of the present invention relates to a reverse osmosis hand held pump with pressure recovery and in-line components for easy fabrication. As mentioned, removal of impurities from a drinking water supply is a major factor in reducing health risks to the human population. High levels of total dissolved solids (TDS) in water, such as dissolved salts in seawater, make the water unfit for drinking because of the ion imbalance in the human system. Most drinking water in the world today comes from ground or surface water sources and potable water from these sources is produced at small and large municipal drinking water treatment plants. A very small percentage of drinking water is produced from de-salination facilities. There are many settings in which large systems are not practical. For example, campers, military personnel, and disaster relief situations require small man-portable systems that can treat water from just about any water source to produce potable water. To be effective in such remote settings, a system must be capable of repeated operation with, for example, little operator skill, no external power sources, and/or very little maintenance.

Thus, a comprehensive water filtration system comprises the capability for both conventional filtration as well as desalination. Conventional filtration can remove particulates that cause turbidity such as dirt, silt, sand, and larger organisms such as Giardia and Cryptosporidium. Reverse osmosis (RO) technology is particularly useful in such a system to remove ions from such sources as seawater. At sea water concentrations of 35,000 milligrams per liter (mg/L), the system must be effective enough to remove ions to levels less than 1000 mg/L. While sodium and chloride are the two ions of concern in seawater, the system must be able to remove other ions as well. All of these ions are collectively known as TDS.

As described herein, an embodiment of the present invention optionally comprises an efficient valve mechanism integral to a piston and shaft for retentate discharge. An embodiment of the present invention optionally comprises a two component filtration system comprising a water pump mechanism and a reverse osmosis filter for reducing the level of total dissolved solids in water, preferably resulting in potable water. In one embodiment, the pump mechanism comprises a pressure recovery feature that reduces the total force required to overcome osmotic pressure in the reverse osmosis membrane. For reverse osmosis operation, an embodiment of the pumping mechanism comprises a spring device for storing energy on the suction stroke such that the force for operation will be averaged over the suction and pressure stroke, rather than all of the force being applied on the pressure stroke. This mechanism reduces the peak pump force nominally by half when used to reduce TDS in seawater.

In one embodiment, the inventive system is portably configured for ease of carriage in the field. In such an embodiment, the dimensions of the system, in storage configuration, are approximately 2 inches wide by approximately 2 inches deep by approximately 15 inches in length, with a total weight of approximately one to five pounds and preferably two to three pounds when dry.

Referring to FIG. 26, the pump mechanism comprises housing 1000, which is optionally fabricated from any of several materials known by one of ordinary skill in the art of pump and cylinder manufacturing, for example, but not limited to, glass or fiber reinforced injection molded plastic. As shown, the cylinder comprises end cap 1002 which is attached to the end of the cylinder by conventional threads or other suitable locking mechanism known in the art. A benefit of this particular embodiment is the in-line configuration of the RO element and the pump piston. The in-line configuration reduces the injection molding tooling inexpensive and cost of pump housing parts. This configuration also minimizes post mold fabrication processes.

In another embodiment, the pump housing comprises cast aluminum, titanium, steel, or other suitable material that is compatible with high TDS water and high pressure. The handle end of the pump housing incorporates a check valve 1004 on the inlet stream and comprises a poppet, disc, or other sealing mechanism known in the art. Alternative embodiments of the check valves comprise springs made of material compatible with the fluid being transferred, for example, but not limited to, stainless steel. The at least one spring provides positive sealing of the check valve in any orientation of the pump. Inlet check valve 1004 allows fluid to enter pump chamber 1018 during the suction stroke and prevents water from exiting through the port on the compression stroke. Water entering through inlet check valve 1004 of the pump mechanism preferably comprises a flexible tube and/or a strainer to filter large particles from the water stream prior to entry into pump chamber 1018. Traveling in the pump housing 1000 is piston 1008 comprising injection molded plastic, cast or machined metals, or any combinations thereof, whose materials are compatible with the fluid being pumped, for example, water, with or without TDS. Piston 1008 incorporates seals 1010, 1012, 1014, and 1016, which isolate pump chamber 1018 from retentate chamber 1020 and retentate rejection annulus 1086. The seals are oriented in the piston ring grooves in such a manner to ensure positive sealing of the different chambers. In an alternative embodiment, the seals comprise piston rings or other sealing technology commonly known by those versed in the art. The piston 1008 is moved in and out of the pump housing 1000 by means of the piston shaft 1022. Force on the piston shaft 1022 is applied by force (for example, but not limited to, by hand, by foot, by other body part, etc., including pulling, pushing, sitting and/or standing force) applied by a pump jack mechanism described below.

An alternative embodiment of the present invention comprises a piston shaft force generating mechanism consisting of reciprocating motion driven by a power generating device such as, but not limited to, petroleum based fuel driven engines, electric motors, or any other power generating device.

As shown in FIG. 26, piston shaft 1022 is sealed to retentate chamber 1020 by means of the shaft seal 1024 with sealing means previously discussed. Shaft seal 1024 is housed in cylinder cap 1026 attached to pump housing 1000. Alternately, quick-change end cap 1026 and piston shaft 1022 allow changes of the recovery ratio (permeate to feed water ratios). This is optionally achieved by changing the piston shaft 1022 diameter. Changing piston shaft 1022 diameter optionally necessitates changing housing end cap 1026 so that the correct bore and seal 1024 match the piston shaft 1022 diameter.

Referring to the embodiment shown in FIG. 26, as force is applied axially to piston shaft 1022 in the right direction, the right end of piston shaft 1022 forms a seal with piston 1008 via seal ring 1028. Seal ring 1028 consists of an o-ring or plastic material. The purpose of seal ring 1028 is to isolate retentate in retentate chamber 1020 from escaping through ported holes in piston 1008, through retentate annular chamber 1086 and out the retentate discharge port when piston 1008 is traveling rightward (as shown) to compress the water in pump chamber 1018. Piston seals 1012 and 1014 are spaced on piston 1008 to eliminate interference with the retentate discharge port when piston 1008 travels to, for example, but not limited to, ends of the pump housing.

Pressure recovery in the pump occurs as pressure is generated in pump chamber 1018, discharged through reverse osmosis element 1066, and returns through the retentate return passage machined in the housing 1000 to retentate pump chamber 1020. In general, the difference in unit volume of pump pressure chamber 1018 to retentate chamber 1020 is defined by the volume of the pump shaft 1022. The ratio of pump shaft diameter 1022 to the diameter of housing 1000 defines the recovery ratio of reverse osmosis filter element 1066. The recovery ratio of reverse osmosis filter element 1066 is defined as the ratio of the volume of permeate (finished water) that is expelled to the feed water volume that is generated in one pump stroke in pump chamber 1018. Further, by the principal of conservation of mass, the feed water volume that enters the reverse osmosis element generated in one pump stroke is the sum of the permeate volume expelled plus the retentate volume expelled from the left end of the reverse osmosis element. By further explanation, RO element 1066 operates by applying a pressure exceeding the osmotic pressure across the membrane. As the high TDS feed water moves from right to left across RO element 1066, permeate (low TDS) water is expelled in RO chamber 1070. As low TDS permeate is forced through the osmotic membrane, the TDS concentration of the feed water increases toward the right end of RO element 1066. At the right end (as shown) of the RO element 1066, the high TDS solution is referred to as retentate. There is effectively little flow resistance from the left end of the RO membrane (feed side) to the retentate side, thereby, little pressure drop from the feed side to the retentate side. Pressure recovery in the pump occurs because the high retentate pressure in chamber 1020 acting on the annular area (piston 1008 cross section area minus shaft 1022 cross section area) on the back side of piston 1008 offsets the pressure in pump chamber 1018. Due to conservation of mass, the permeate volume produced in one stroke of the pump is equivalent to the volume of the pump shaft 1022 as it enters the fixed volume of the pump housing.

When piston 1008 has traveled to the most extreme right position of pump cylinder 1000, force on piston shaft 1022 is applied in the opposite direction to move piston 1008 to the left. With piston 1008 moving to the left, new feed water is drawn into pump chamber 1018 via inlet port 1004. As shown in this embodiment, as force on piston shaft 1022 is applied axially to the left, the right end of piston shaft 1022 is lifted off of shaft seal 1028. Opening shaft seal 1028 causes retentate in retentate chamber 1020 to be expelled through central port in piston 1008 to the retentate annular chamber 1086 and out the retentate port. Piston shaft 1022 is retained in piston 1008 via a locking means. Adequate space is provided in the left retaining end (as shown) of piston 1008 to allow piston shaft 1022 to be lifted off of piston seal 1028 thereby allowing retentate to escape while captivating piston 1008 to piston shaft 1022.

The aforementioned pump further optionally comprises a reverse osmosis filter system. Reverse osmosis filters are efficient filter systems for removing very small particles including ions such as, but not limited to, sodium and chloride. In order to drive high TDS water through the RO membrane, the osmotic pressure of the water must be overcome. In one embodiment, this system comprises a conventional spiral wound design RO filter element. Other embodiments of the RO filter element comprise a ceramic membrane, carbon membrane monotubes, or other RO elements known to those versed in the design of RO elements. High TDS feed water at a pressure exceeding the osmotic pressure flows in to one end of the cylindrical filter element. As the water flows longitudinally through the length of the filter element, the water runs across the surface of the spiral wrapped membrane to the other end of the filter element. As the water flows across the membrane surface, the ions are rejected and water molecules flow through the membrane. As the water flows longitudinally through the filter element, the water on the feed water side of the membrane surface increases in ion concentration (higher TDS). The higher TDS water coming out of the far end of the RO element is referred to as retentate. The purified water going through the membrane element is referred to as permeate. The ratio of permeate out of the RO element to the feed water into the RO element is referred to as recovery ratio.

The reverse osmosis filter assembly as shown in FIG. 26 optionally comprises a separate pressure chamber with o-ring sealed porting to isolate the inlet feed stream from the retentate rejection stream and the permeate product stream. The reverse osmosis filter element 1066 is optionally changeable by means of, for example, an o-ring sealed threaded connection, or twist and lock detente type engaging mechanism. As shown in FIG. 26, an optional circular seal 1030 on the outside of RO element 1066 and inside cylinder housing 1000 prevents retentate water from returning to the feed side of the RO filter element.

To achieve the mechanical advantage, commonly known pump jack mechanisms are optionally employed to force, for example, pump shaft 1022 in and out of the pump housing 1000. As shown in FIG. 26, the lever arm 1032 length for obtaining the mechanical advantage corresponds approximately to the overall length of the pump housing 1000. The end of the lever arm 1032 is optionally fitted with a large surface area pad 1034 to reduce the point source load on, for example, the human anatomy. The pad 1034 is optionally contoured to be conformal with the diameter of the pump housing 1000 to facilitate compact storage.

Of course, a disinfection apparatus, such as those described herein, is optionally incorporated with a pump. For purposes of efficiency, disinfectant generated by the disinfection apparatus is contacted with filtered water of the pump. In addition, the disinfection apparatus is optionally powered by energy used to drive the pump. The disinfection apparatus optionally comprises a pump housing end cap, a piston, an internal component of a piston, an internal component of a pump handle, an internal component positioned within a filter, a pump housing side cap or component, and the like.

Conventional water filtration using a micron filter typically does not require significant differential pressure to force the water through the filter element. Typical pressures are less than 100 pounds per square inch (psi). However, for reverse osmosis membranes, the pressure to drive the water across the membrane is a function of the TDS in the water. The pressure force required can be significant, for example, approximately several hundred psi. Most hydraulic jack mechanisms have a pressure stroke and a return stroke. The pressure stroke requires force and the return stroke is usually very low force that is associated with friction in the pump device. In an embodiment of the present invention, the pump jack mechanism incorporates an energy storage device to store up energy in the return stroke. The stored energy is then released on the pressure stroke to ease the force required by the operator in the pressure stroke. Under ideal conditions at a given TDS level, the stored energy is approximately half of the total force required to drive water through the RO membrane. Likewise, the peak force required of the operator to operate the pump in the power (pressure) stroke is reduced by half.

The above-described embodiments of the present invention generally refer to an arrangement in which the cathode is a solid or tubular electrode within an outer body that acts as the anode and reaction chamber. However, it is obvious to those skilled in the art and from the preceding discussion that the cathode and anode can be reversed. Likewise, there may be multiple anodes and/or cathodes utilized in accordance with the present invention.

The above-described embodiments of the present invention generally utilize a reaction chamber comprising a cylindrical outer body with a concentric cathode electrode placed therein. However, it is obvious to those skilled in the art and from the preceding discussion that any chamber arrangement, which guarantees that the charge passes through the salt solution, may be utilized.

The above-described embodiments of the present invention optionally comprise at least one RO membrane wherein the at least one RO membrane is manufactured through a process comprising printing of a spacing material directly on a membrane. Such a membrane is referred to herein as a "printed membrane" and it is understood that the term "printing" comprises a variety of printing techniques, such as, but not limited to, lithography, direct printing and other techniques known in the art. The printing is of thickness shown to optimize the performance of the RO unit, is thinner than the thinnest of the current industry standard feed spacers (currently 11 mils thick), and is as thin as approximately 1.5 mils. Printed membranes and methods of making the same are described in U.S. Provisional Patent Application, Serial No. 60/230,895, entitled "Reverse Osmosis Membrane and Process For Making Same," to Herrington et al., filed Sep. 5, 2000. The method and apparatus of Serial No. 60/230,895 are applicable to any membrane technology including reverse osmosis, nano-filtration, ultra-filtration, microfiltration, and particle filtration. One of ordinary skill in the art of membrane technology would understand that the invention disclosed in Serial No. 60/230,895 is useful for a variety of membrane applications and devices, including a variety of those described herein. The invention disclosed in Serial No. 60/230,895 is also useful in processes wherein heating, reaction, and/or other processes are involved with or without a filtration process. Thus, for example, a spacer comprising a catalyst is useful as a catalytic bed, again, with or without filtration. In other words, the scope of the present invention comprises the technology of the invention disclosed in Serial No. 60/230,895, for example, the apparatus and method for filtering materials and/or contacting materials, particularly, but not limited to, a fluid and a solid, especially wherein a specific flow field is desired or desirable. The invention of Serial No. 60/230,895 is particularly suited to further miniaturization and portability of inventive systems described herein. The entire specification of Serial No. 60/230,895 is incorporated herein by reference.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A portable hydration system comprising:
   at least one oxidant generating electrolytic cell;
   an electrolyte;
   a pump;
   a container; and
   a bag for carriage of said pump, container, and oxidant generating electrolytic cell.

2. The portable hydration system of claim 1 wherein said bag comprises at least one shoulder strap.

3. The portable hydration system of claim 1 wherein said pump comprises:
   a housing;
   a piston;
   at least one filter; and
   a pressure recovery mechanism.

4. The portable hydration system of claim 3 wherein said pump housing comprises at least one substantially cylindrical cavity for housing said piston and said filter.

5. The portable hydration system of claim 3 wherein said filter comprises a reverse osmosis filter.

6. The portable hydration system of claim 3 wherein said filter comprises a printed membrane.

7. The portable hydration system of claim 3 wherein said oxidant generating electrolytic cell is housed within said pump housing.

8. The portable hydration system of claim 3 wherein said oxidant generating electrolytic cell is positioned on said pump housing.

9. The portable hydration system of claim 3 wherein said filter comprises a micron filter.

10. The portable hydration system of claim 3 wherein said at least one filter comprises a reverse osmosis filter and a roughing filter combination.

11. The portable hydration system of claim 10 additionally comprising a valve interposed between said reverse osmosis filter and said roughing filter for separate or concurrent operation of the filters.

* * * * *